US006476868B1

United States Patent
Kaji et al.

(10) Patent No.: US 6,476,868 B1
(45) Date of Patent: *Nov. 5, 2002

(54) IMAGE PICKUP APPARATUS PROVIDED WITH ENLARGEMENT PROCESS MEANS FOR ENLARGING IMAGE SIGNALS OUTPUT FROM AN IMAGE PICKUP DEVICE

(75) Inventors: Toshio Kaji; Hiroyuki Shimizu; Yukihiro Adachi, all of Yokohama; Kenji Kyuma, Soka; Kunihiko Yamada, Tanashi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/419,241

(22) Filed: Apr. 10, 1995

(30) Foreign Application Priority Data

| Apr. 11, 1994 | (JP) | 6-096978 |
| Apr. 11, 1994 | (JP) | 6-096979 |
| Apr. 12, 1994 | (JP) | 6-073645 |
| Apr. 12, 1994 | (JP) | 6-098021 |
| Apr. 12, 1994 | (JP) | 6-098025 |
| Jun. 17, 1994 | (JP) | 6-159392 |

(51) Int. Cl.⁷ ............................... H04N 5/225
(52) U.S. Cl. ................. 348/333.12; 348/333.02; 348/240
(58) Field of Search ................. 348/207, 211, 348/212, 213, 240, 358, 333, 334, 341, 143, 169, 333.01, 333.02, 333.12; H04N 5/262

(56) References Cited

U.S. PATENT DOCUMENTS

| 4,574,314 A | | 3/1986 | Weinblatt | |
| 4,737,832 A | | 4/1988 | Kyuma | |
| 4,774,581 A | | 9/1988 | Shiratsuchi | |
| 4,857,751 A | | 8/1989 | Hatanaka et al. | |
| 4,991,020 A | | 2/1991 | Zwirn | |
| 5,073,828 A | | 12/1991 | Yamada et al. | |
| 5,223,934 A | | 6/1993 | Hong | |
| 5,396,287 A | * | 3/1995 | Cho | 348/211 |
| 5,420,632 A | * | 5/1995 | Yamagiwa | 348/240 |
| 5,557,328 A | * | 9/1996 | Ishihama et al. | 348/358 |
| 5,557,358 A | * | 9/1996 | Mukai et al. | 348/333 |
| 5,568,183 A | * | 10/1996 | Cortjens et al. | 348/211 |
| 5,570,156 A | * | 10/1996 | Arai et al. | 348/334 |

FOREIGN PATENT DOCUMENTS

| JP | 4-46472 | 2/1992 |
| JP | 4-96580 | 3/1992 |
| JP | 5-161054 | 6/1993 |

* cited by examiner

Primary Examiner—Tuan Ho

(57) ABSTRACT

An image processing apparatus provided with an electronic zooming device for electronically enlarging the image around a selected position in the image area, and a display control circuit for displaying an area to be enlarged, in the image area, prior to the image enlargement in the electronic zooming operation.

32 Claims, 34 Drawing Sheets

PRIOR ART
FIG. 2A
PRIOR ART
FIG. 2B
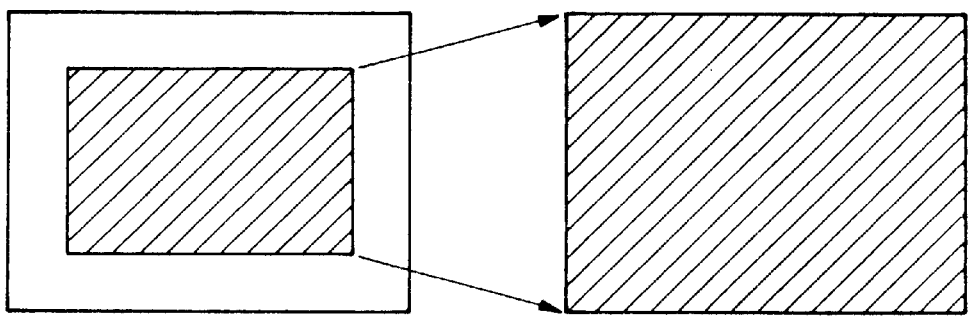
PRIOR ART
FIG. 2C
PRIOR ART
FIG. 2D
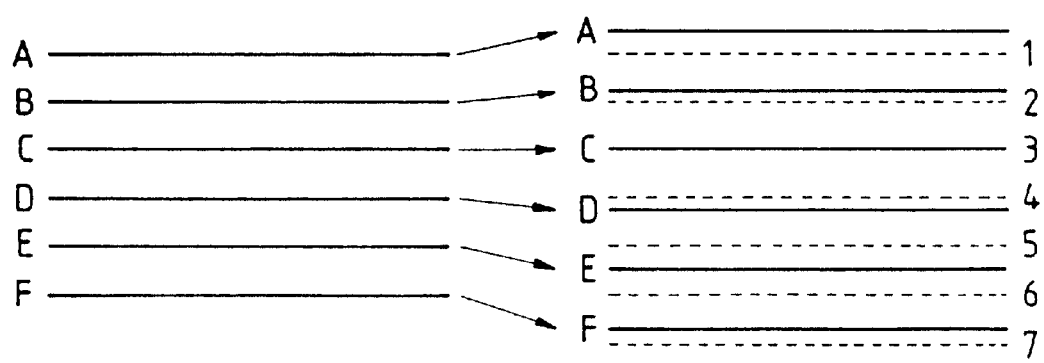

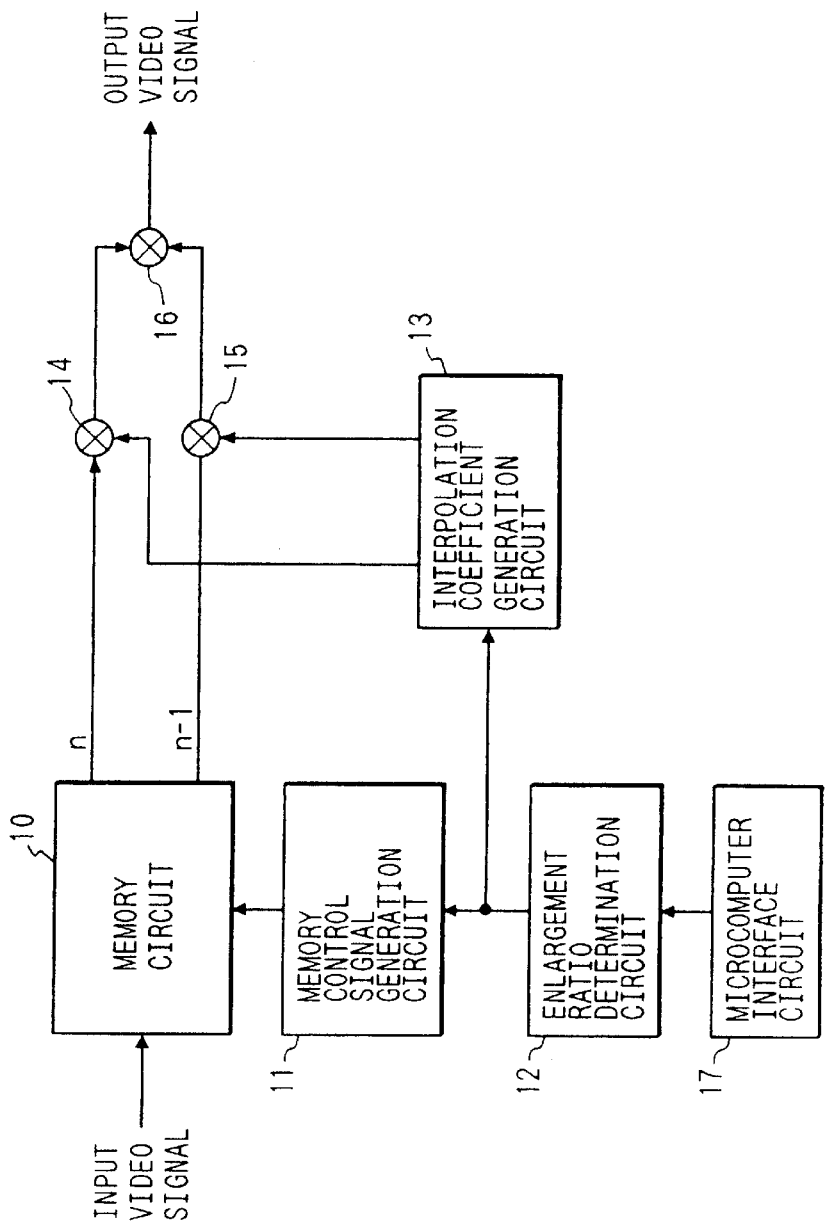

27 — ENLARGEMENT STANDBY

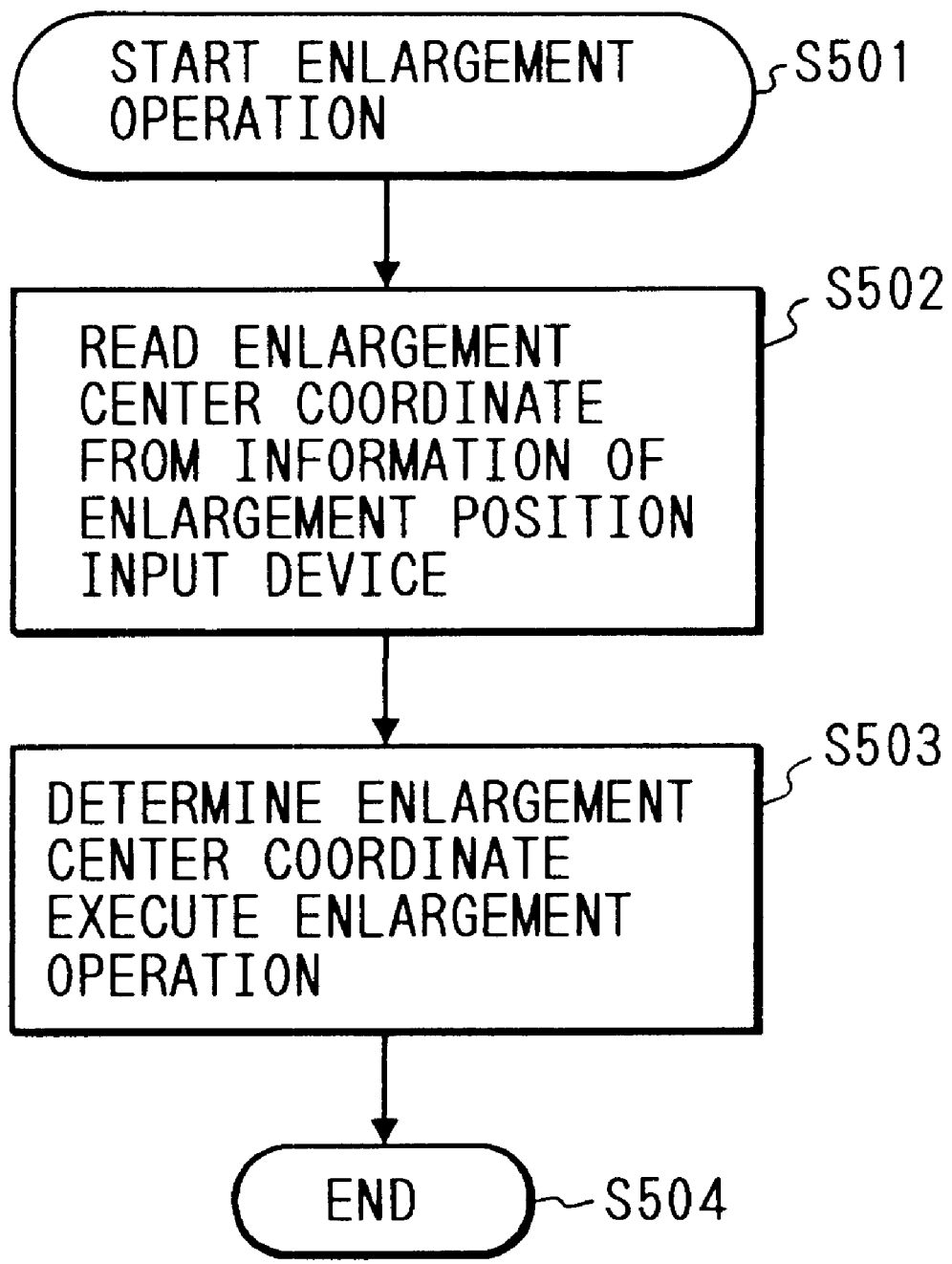

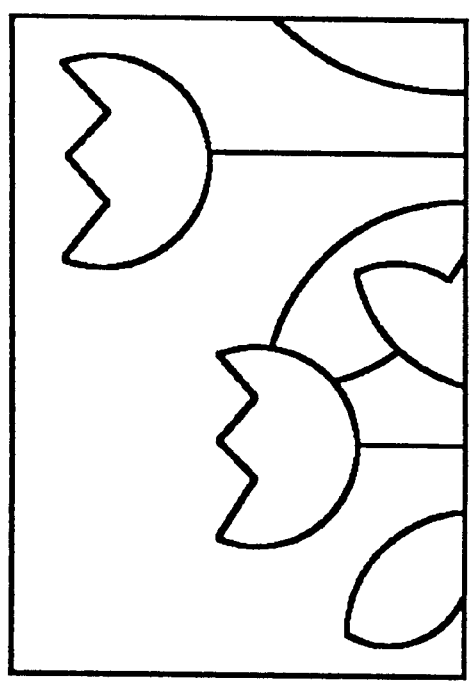
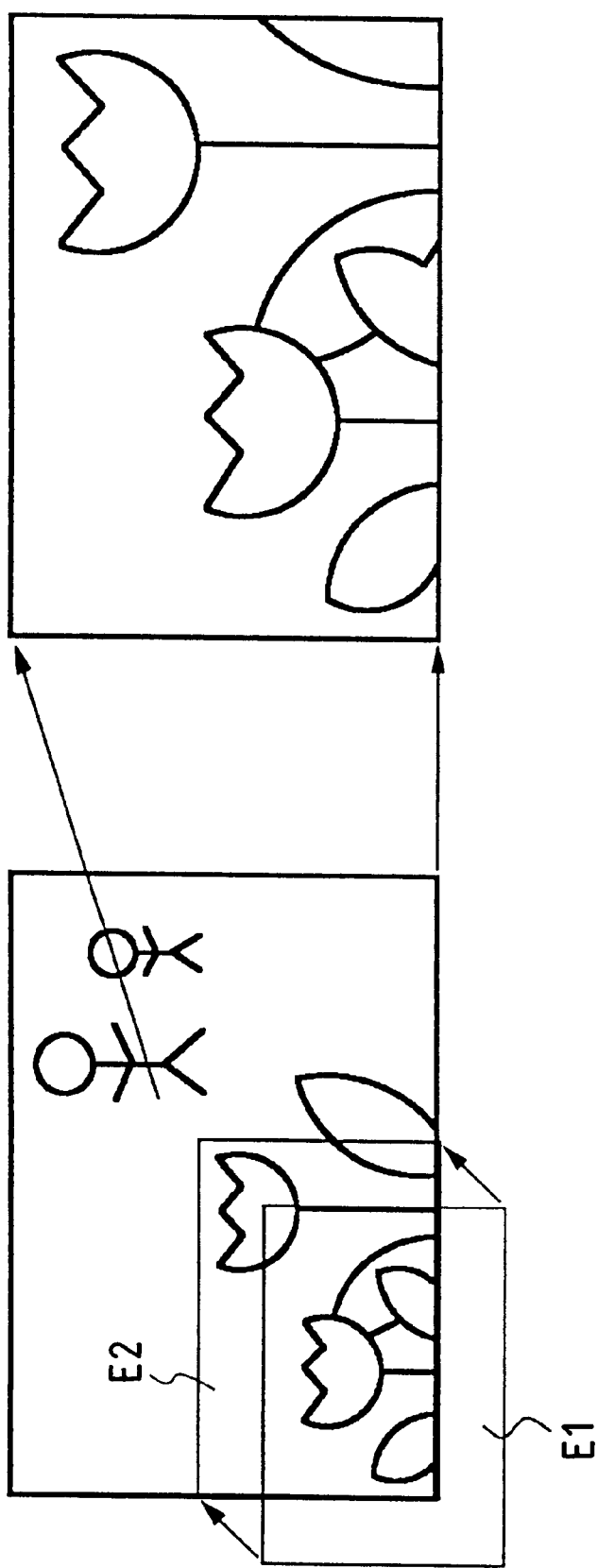
FIG. 27A
FIG. 27B

IMAGE PICKUP APPARATUS PROVIDED WITH ENLARGEMENT PROCESS MEANS FOR ENLARGING IMAGE SIGNALS OUTPUT FROM AN IMAGE PICKUP DEVICE

BACKGROUND OF THE INVENTION

1. Field of the Invention

The present invention relates to an image processing apparatus with enlarging function for electronic enlargement of a designated area within the image field.

2. Related Background Art

In the field of image pickup device capable of digital processing of image signals, there have been proposed electronic image magnification enlarging means such as the so-called electronic zooming function for electronically zooming up the object in a similar manner as in the optical zooming, and the electronic close-up function for instantaneously enlarging a part of the image, obtained from an image pickup device, to a predetermined magnification (for example doubled or tripled size).

In the following there will be explained, with reference to FIG. 1, such conventional electronic image magnification enlarging means. FIG. 1 is a block diagram of a video camera, for explaining such conventional image magnification enlarging means, wherein shown are a lens 1 for forming the image of an unrepresented object; an image pickup device 2 for converting the optical signals, inputting from the lens 1, into electrical signals; an analog-to-digital (A/D) converter 3 for converting the photoelectrically converted analog signals into digital signals; a first camera signal processing circuit 4 for applying predetermined processes, such as gamma processes separately on the color signals and luminance signal, on the signals obtained by A/D conversion in the A/D converter 3; an enlargement process circuit (electronic image magnification enlarging means) 5 for effecting an enlargement process on the image signals output from the first camera signal processing circuit 4; a second camera signal processing circuit 6 for applying a predetermined process, such as the addition of synchronization signals, to the image signal output from the enlargement process circuit 5; a digital-to-analog (D/A) converter 7 for converting the digital signals, output from the second camera signal processing circuit 6, into analog signals; an enlargement process execution switch 8 for enabling the photographer to input an execution command signal for the enlargement of the image signals by the enlargement process circuit 5; and a microcomputer 9 for controlling the entire video camera.

In the video camera of the above-explained configuration, the light from an object is focused, through the lens 1 and an unrepresented diaphragm (iris) mechanism, on the image pickup device 2 and is converted into electrical signals. The output electrical signals are supplied, for example through a correlated double sampling (CDS) circuit (not shown), to the A/D converter 3 for conversion into digital signals. Thus converted digital signals are supplied to the first camera signal processing circuit 4 for predetermined processes, and supplied, either directly or after an enlargement process in the enlargement process circuit 5, to the second camera signal processing circuit 6. After a predetermined process therein, the signals are converted into analog signal in the D/A converter 7 and output to an unrepresented video cassette recorder or the like.

The enlargement process by the enlargement process circuit 5 is executed by an execution command signal, which is input by the actuation of the enlargement process execution switch 8 by the photographer and is received by the microcomputer 9.

In the following there will be explained, with reference to FIGS. 2A to 2D, an example of image enlargement by linear interpolation. In case an original image (hatched area) in FIG. 2A is enlarged as shown in FIG. 2B, the relationship of the scanning lines in the original image (FIG. 2A) and the enlarged image (FIG. 2B) becomes as shown in FIGS. 2C and 2D. For converting the enlarged image in FIG. 2B into the standard television signals, it is necessary to prepare scanning lines of interpolated signals 1 to 7, represented by broken lines, from scanning lines A to F, represented by solid lines in FIG. 2D. Such broken-lined scanning lines can be obtained by the addition of the solid-lined scanning lines weighted according to the distances thereof. Such linear interpolation, applied in the vertical and horizontal directions, enables enlargement of the original image with an arbitrary rate of enlargement.

FIG. 3 is a block diagram showing an example of the enlargement process circuit 5, wherein shown are a memory circuit 10 for storing the image signals received from the first camera signal process circuit 4 (cf. FIG. 1) and outputting the signals of an n-th scanning line designated by a memory readout control signal and the signals of an (n−1)-th scanning line, preceded by a 1H period; a memory control signal generation circuit 11 for generating a memory control signal for controlling the data write-in and read-out of the memory circuit 10; an enlargement ratio determination circuit 12 for determining the ratio and position of enlargement in the enlargement process by the enlargement process circuit 5; an enlargement coefficient generation circuit 13 for generating an interpolation coefficient according to the ratio of enlargement determined by the enlargement ratio determination circuit 12; a first multiplier 14 for multiplying the signals of the n-th scanning line from the memory circuit 10 with the interpolation coefficient from the interpolation coefficient generation circuit 13; a second multiplier 15 for multiplying the signals of the (n−1)-th scanning line from the memory circuit 10 with the interpolation coefficient from the interpolation coefficient generation circuit 13; an adder 16 for adding the output signals of the first multiplier 14 and of the second multiplier 15; and a microcomputer interface circuit 17 for receiving the information on the enlargement ratio and enlargement position, output from the microcomputer 9 (cf. FIG. 1).

From the memory circuit 10 storing the input image signals, there are read the signals of the n-th scanning line and those of the (n−1)-th scanning line in response to the memory control signals generated from the memory control signal generation circuit 11. At the same time the interpolation coefficient generation circuit 13 generates the interpolation coefficients, corresponding to the distances between the interpolated scanning line and the n-th and (n−1)th scanning lines. Then the first and second multipliers 14, 15 effect multiplications of the signals of the n-th and (n−1)-th scanning lines respectively with the interpolation coefficients and the multiplied signals are added by the adder 16 to provide linearly added signals.

The enlarged image signals can be obtained by the linear interpolation explained above.

In such conventional configuration, however, the position of enlargement of the image obtained from the image pickup device is determined in advance, and it has been difficult for the photographer to arbitrarily select the position of enlargement.

Also the photographer is unable to arbitrarily determine the center position of the image enlargement and the image angle, and is unable to know, in advance, the area of the enlarged image.

SUMMARY OF THE INVENTION

In consideration of the above-mentioned drawbacks of the prior art, a first object of the present invention is to provide an image pickup device which enables the photographer, in simple manner, to arbitrarily select the position of execution of the image enlargement process such as the electronic zooming function or the electronic close-up function on the image area.

The above-mentioned object can be attained, according to a preferred embodiment of the present invention, by an image processing apparatus provided with enlargement process means for enlarging the image signals output from an image pickup device, comprising execution position selecting means for selecting the position of execution of the enlargement process by the enlargement process means.

The foregoing object can be attained, according to another preferred embodiment of the present invention, by an image processing apparatus provided with enlargement process means for enlarging the image signals output from an image pickup device, comprising execution position selecting means for selecting the position of execution of the enlargement process by the enlargement process means, and display means for displaying the state of selection by the execution position selecting means.

Also the foregoing object can be attained, according to another preferred embodiment of the present invention, by an image processing apparatus provided with enlargement process means for enlarging the image signals output from an image pickup device, comprising execution position selecting means for selecting the position of execution of the enlargement process by the enlargement process means, display means for displaying the state of selection by the execution position selecting means, and switching means for selectively switching an operative state or a non-operative state of the enlargement process means, wherein the display means displays the state of selection of the execution position selecting means at least when the switching means switches the enlargement process means to the non-operative state.

Also the foregoing object can be attained, according to another preferred embodiment of the present invention, by an image processing apparatus provided with enlargement process means for enlarging the image signals output from an image pickup device, comprising position selecting means for selecting the position of execution of the enlargement process by sid enlargement process means, display means for displaying the state of selection by the position selecting means, switching means for selectively switching an operative state or a non-operative state of the enlargement process means, and storage means for storing the information on selection by the position selecting means, wherein the display means displays the state of selection by the position selecting means at least when the switching means switches the enlargement process means to the non-operative state, and the position selecting means is adapted to operate based on the information on selection by the position selecting means, stored in the storage means, and the information on selection by the position selecting means is not stored in the storage means when the switching means switches the enlargement process means to the operative state.

Also the foregoing object can be attained, according to another preferred embodiment of the present invention, by an image processing apparatus provided with enlargement process means for enlarging the image signals output from an image pickup device, comprising position selecting means for selecting the position of execution of the enlargement process by the enlargement process means, display means for displaying the state of selection by the position selecting means, first switching means for selectively switching an operative state or a non-operative state of the enlargement process means, storage means for storing the information on selection by the position selecting means, and second switching means for selectively switching an operative state or a non-operative state of the position selecting means, wherein the display means is adapted to display the state of selection by the position selecting means at least when the second switching means switches the position selecting means to the operative state and the first switching means switches the enlargement process means to the non-operative state; the position selecting means is adapted to operate based on the information on selection of the position selecting means, stored in the storage means, when the first switching means switches the enlargement process means to the operative state; the state of selection of the position selecting means is not stored in the storage means when the first switching means switches the enlargement process means to the operative state; and a predetermined value is stored in the storage means when the second switching means switches the position selecting means to the non-operative state.

Also the foregoing object can be attained, according to another preferred embodiment of the present invention, by an image processing apparatus in which the aforementioned position selecting means is composed of viewpoint detecting means for detecting the position of the viewpoint of the photographer at the phototaking operation, the aforementioned execution position selecting means is composed of a tracking ball, a joy stick or a touch panel, and the aforementioned display means is composed of an electronic view finder.

Thus the position of execution of the enlargement process by the enlargement process means can be selected by the manipulation of the position selecting means by the photographer, and the state of the selection can be displayed by the display means.

Also the position of execution of the enlargement process by the enlargement process means can be selected by the manipulation of the position selecting means by the photographer, while the state of the selection can be displayed by the display means, and the state of selection by the position selecting means is displayed on the display means at least when the switching means switches the enlargement process means to the non-operative state.

The foregoing object can also be attained, according to another preferred embodiment of the present invention, by an image processing apparatus provided with enlargement process means for enlarging the image signals output from an image pickup device, comprising execution position selecting means for selecting the position of execution of the enlargement process by the enlargement process means, and enlargement ratio selecting means for selecting the enlargement ratio of the enlargement process by the enlargement process means.

Also the foregoing object can be attained, according to another preferred embodiment of the present invention, by an image processing apparatus provided with enlargement process means for enlarging the image signals output from an image pickup device, comprising execution position selecting means for selecting the position of execution of the enlargement process by the enlargement process means, enlargement ratio selecting means for selecting the enlargement ratio of the enlargement process by the enlargement process means, and display means for displaying the state of selection by the execution position selecting means and the enlargement ratio selecting means.

Another object of the present invention is to provide an image processing apparatus capable of so controlling the enlargement ratio or the enlargement position as that the image after the enlargement process does not overflow the image area.

Still another object of the present invention is to provide an image pickup device capable, at an image enlargement process, of causing the detection areas for auto focusing and auto exposure to follow the enlarged image, thereby enabling to maintain a satisfactory phototaking state during the image enlargement process.

Still other objects of the present invention, and the features thereof, will become fully apparent from the following description, which is to be taken in conjunction with the attached drawings.

BRIEF DESCRIPTION OF THE DRAWINGS

FIGS. 2A to 2D are views illustrating an electronic image enlarging process;

FIG. 3 is a block diagram of an enlargement process circuit in the image pickup device shown in FIG. 1;

FIG. 21 is a flow chart showing the image enlarging process of the video camera shown in FIG. 20;

FIGS. 27A and 27B are views showing an example of determination of the center of image enlargement in case the center of image enlargement is so designated that the enlarged area overflows the image area, and the result of such image enlargement;

FIGS. 39A, 39B, 40A and 46B are views showing the function of the twelfth embodiment of the present invention.

DETAILED DESCRIPTION OF THE PREFERRED EMBODIMENTS

Now the present invention will be clarified in detail by preferred embodiments thereof shown in FIGS. 4 to 15.

Figure 1:
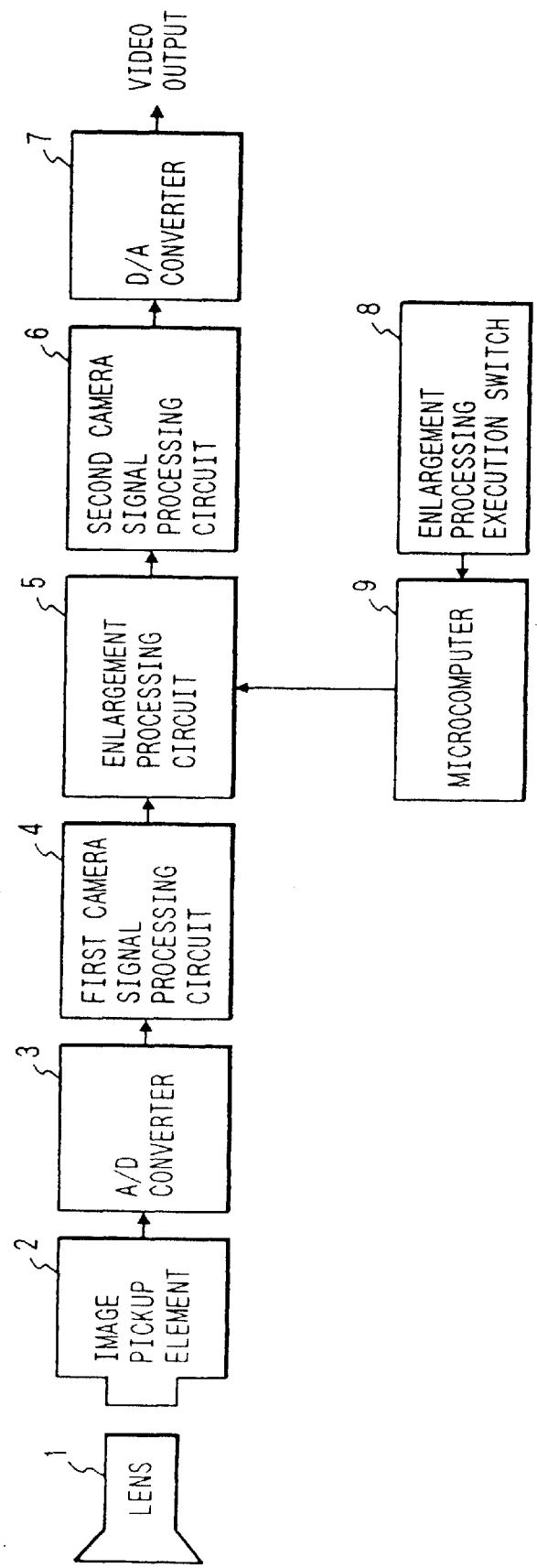
FIG. 1 is a block diagram of a conventional image pickup device.
Figure 4:
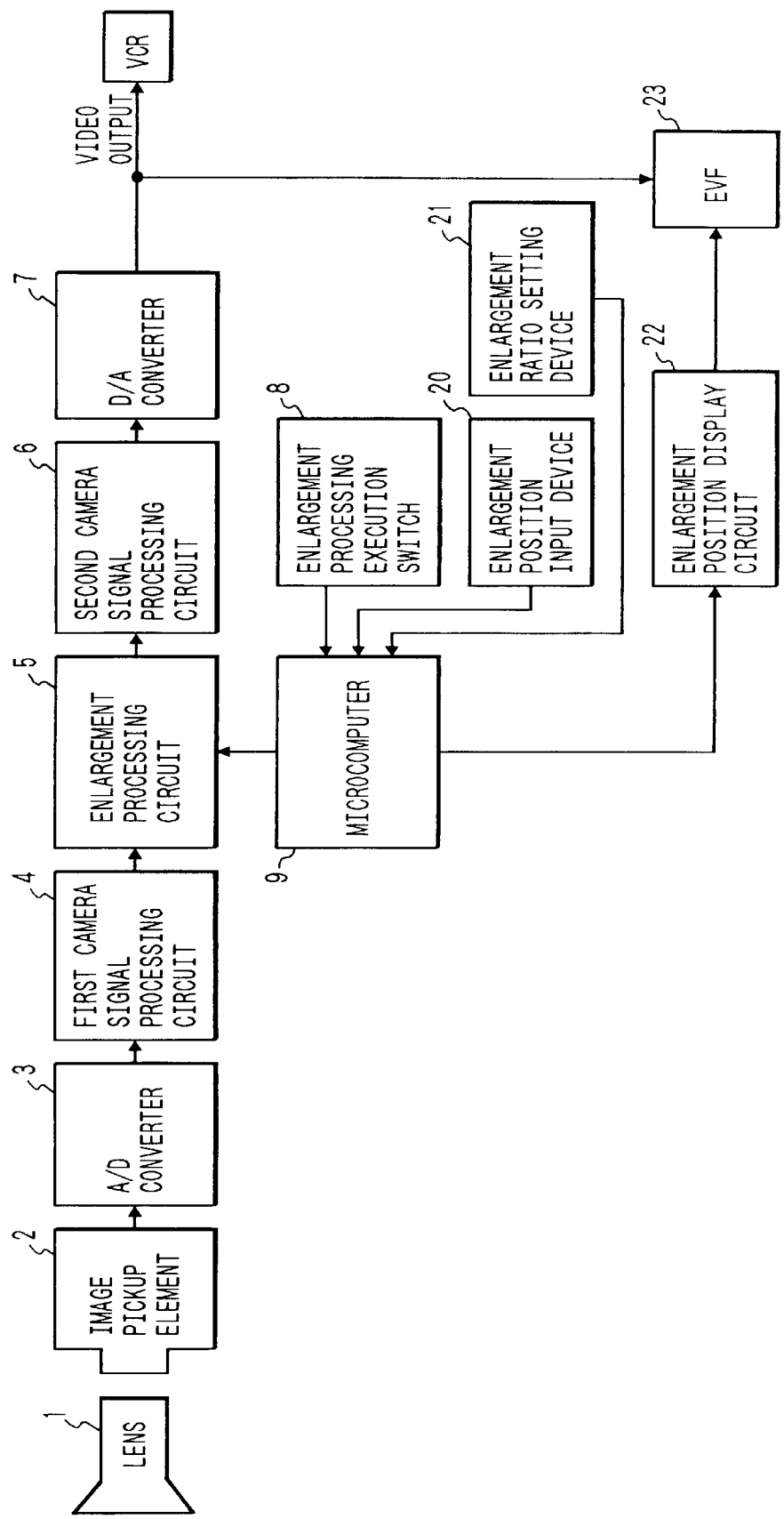
FIG. 4 is an image pickup apparatus constituting a first embodiment of the present invention.

At first a first embodiment of the present invention will be explained with reference to FIGS. 4 to 6. FIG. 4 is a block diagram of an image pickup apparatus constituting a first embodiment of the present invention, wherein components same as those of the conventional configuration shown in FIG. 1 are represented by same numbers. The configuration shown in FIG. 4 is different, from that shown in FIG. 1, in the addition of an enlargement position input device (means) 20, an enlargement ratio setting device 21 for setting the enlargement ratio, an enlargement position display circuit 22 and an electronic view finder (EVF) 23 constituting the display means.

The enlargement position input device 20 is provided for enabling the photographer to input positional information indicating the position of execution of the enlargement process by the enlargement process circuit 5. The enlargement ratio setting device 21 is provided for enabling the photographer to input the enlargement ratio, at the enlargement process by the enlargement process circuit 5. The enlargement position display circuit 22 displays the positional information, input from the enlargement position input device 20, on the image area of the electronic view finder (EVF) 23. The EVF 23 constitutes monitor means for the photographer to monitor output image signals output from the D/A converter 7 and an anticipated enlargement position signal output from the enlargement position display circuit 22.

Figure 5:
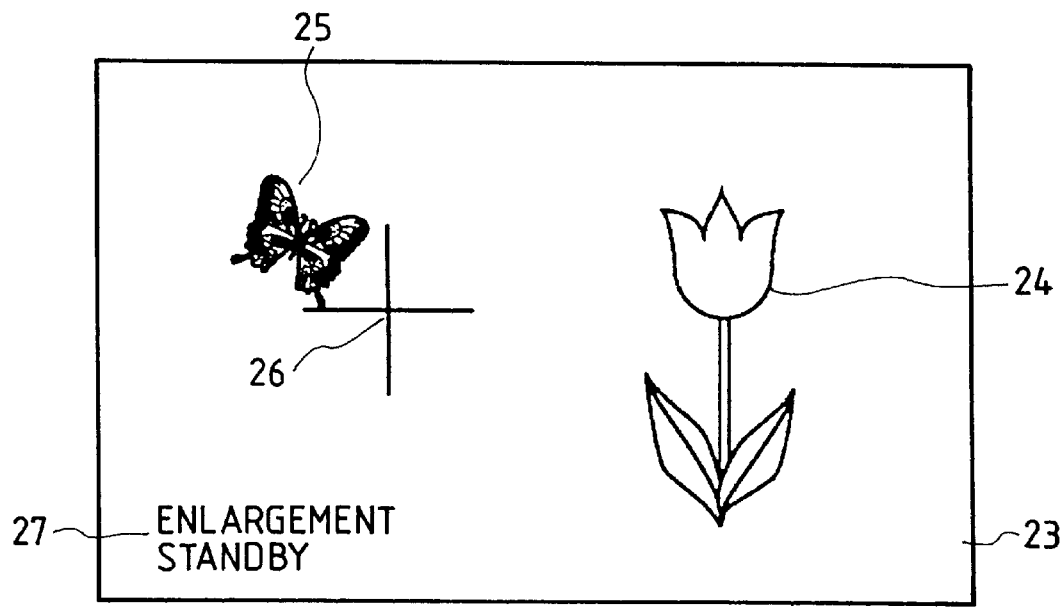
FIG. 5 is a view showing an example of display of an EVF image in an enlargement stand-by state in the image pickup apparatus.

FIG. 5 shows an example of display of the image area of the EVF 23 (EVF image) when the position of execution of the enlargement is input by the enlargement position input device 20 and the enlargement ratio is input by the enlargement ratio setting device 21. On the EVF image 23, there are displayed original images 24, 25, a cross-shaped mark 26 indicating the anticipated enlargement position and a message 27 indicating a stand-by state for the enlargement process. The mark 26 can be arbitrarily moved on the EVF image area 23 by the manipulation of the enlargement position input device 20.

Figure 6:
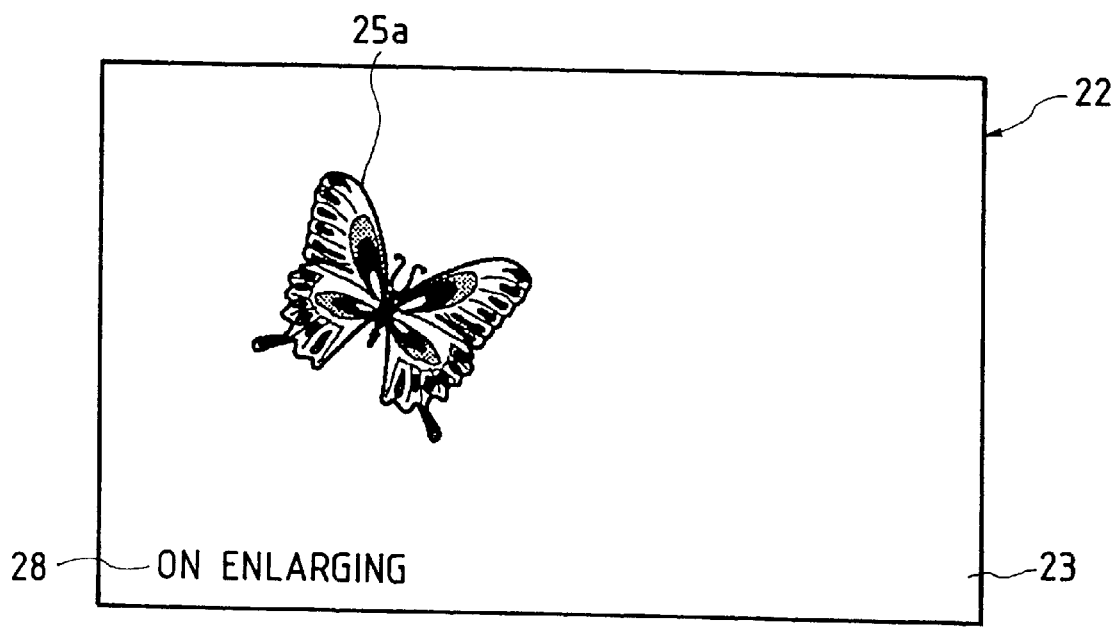
FIG. 6 is a view showing an example of display of an EVF image in the course of image enlargement in the image pickup apparatus.

FIG. 6 shows an example of display of the EVF image 23, in the course of execution of the enlargement process. There are shown an enlarged image 25a, displayed on the EVF image area 23 by the enlargement process, and a message 28 indicating that the enlargement process is in progress.

The photographer at first confirms the center position of the area to be enlarged, by observing the mark 26 displayed on the EVF image area 23 based on the anticipated enlargement position signal from the enlargement position display circuit 21, then determines the position of execution of enlargement by moving the mark 26 to a desired position through the manipulation of the enlargement position input device 20, and actuates the enlargement process execution switch 8 to execute the enlargement process.

Figure 7:
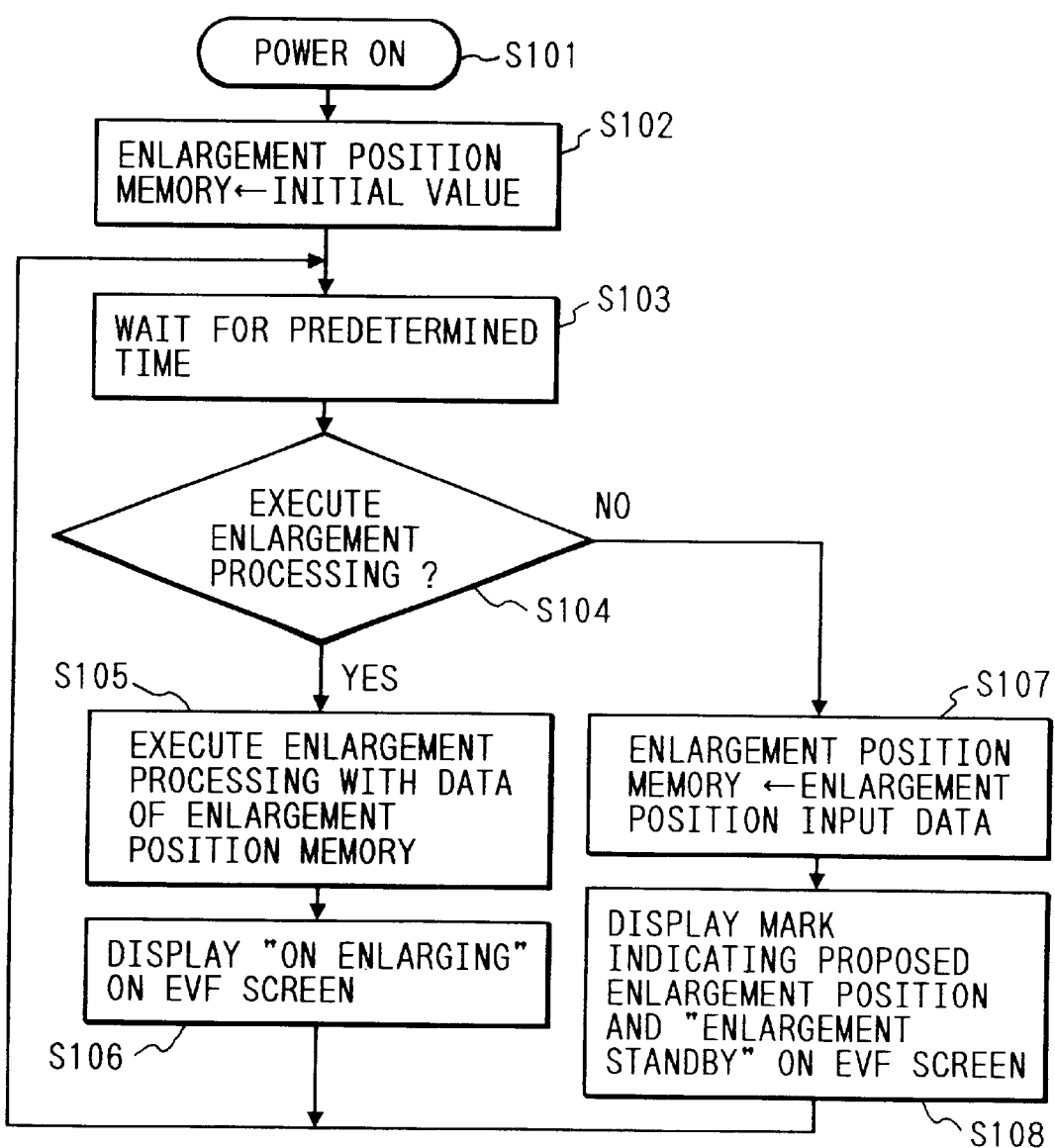
FIG. 7 is a flow chart showing the function of the image pickup apparatus.

In the following there will be explained, with reference to FIGS. 4 and 7, the control sequence of the microcomputer 9 for executing the actual enlargement process, in response to the above-explained operations of the photographer. FIG. 7 is a flow chart showing the control sequence of the microcomputer 9.

Referring to FIG. 7, at first a step S101 turns on the power supply to activate the microcomputer 9. Then a step S102 stores initial data of a predetermined enlargement position in an enlargement position memory of the microcomputer 9, and a step S103 waits for a predetermined time. After the lapse of the predetermined waiting time, a step S104 discriminates whether a signal for executing the enlargement process has been input from the enlargement process execution switch 8, and the sequence proceeds to a step S105 or S107 respectively if the signal has been input or not.

The step S105 provides the enlargement process circuit 5 with information on the enlargement position and enlargement ratio, based on the data stored in the enlargement position memory in the step S102. Then a step S106 displays a message 28, indicating that the enlargement process is in progress, on the EVF image area 23 as shown in FIG. 6 and erases the mark 26 shown in FIG. 5 from the EVF image area, and the sequence returns to the aforementioned step S103.

On the other hand, the step S107 prepares enlargement position information from the signal input from the enlargement position input device 20 and stores the information in the enlargement position memory. Then a step S108 prepares an anticipated enlargement position signal, based on the enlargement position information, stored in the enlargement position memory, then sends the information to the enlargement position display circuit 21 and displays the mark 26 indicating the anticipated enlargement position and the message 27 indicating an enlargement stand-by state on the EVF image area 23 as shown in FIG. 5, and the sequence then returns to the step S103.

The enlargement position input device 20 can be any device enabling the photographer to designate a two-dimensional position, but can be composed, for example, of a known device such as a tracking ball, a joy stick or a touch panel.

Figure 8:
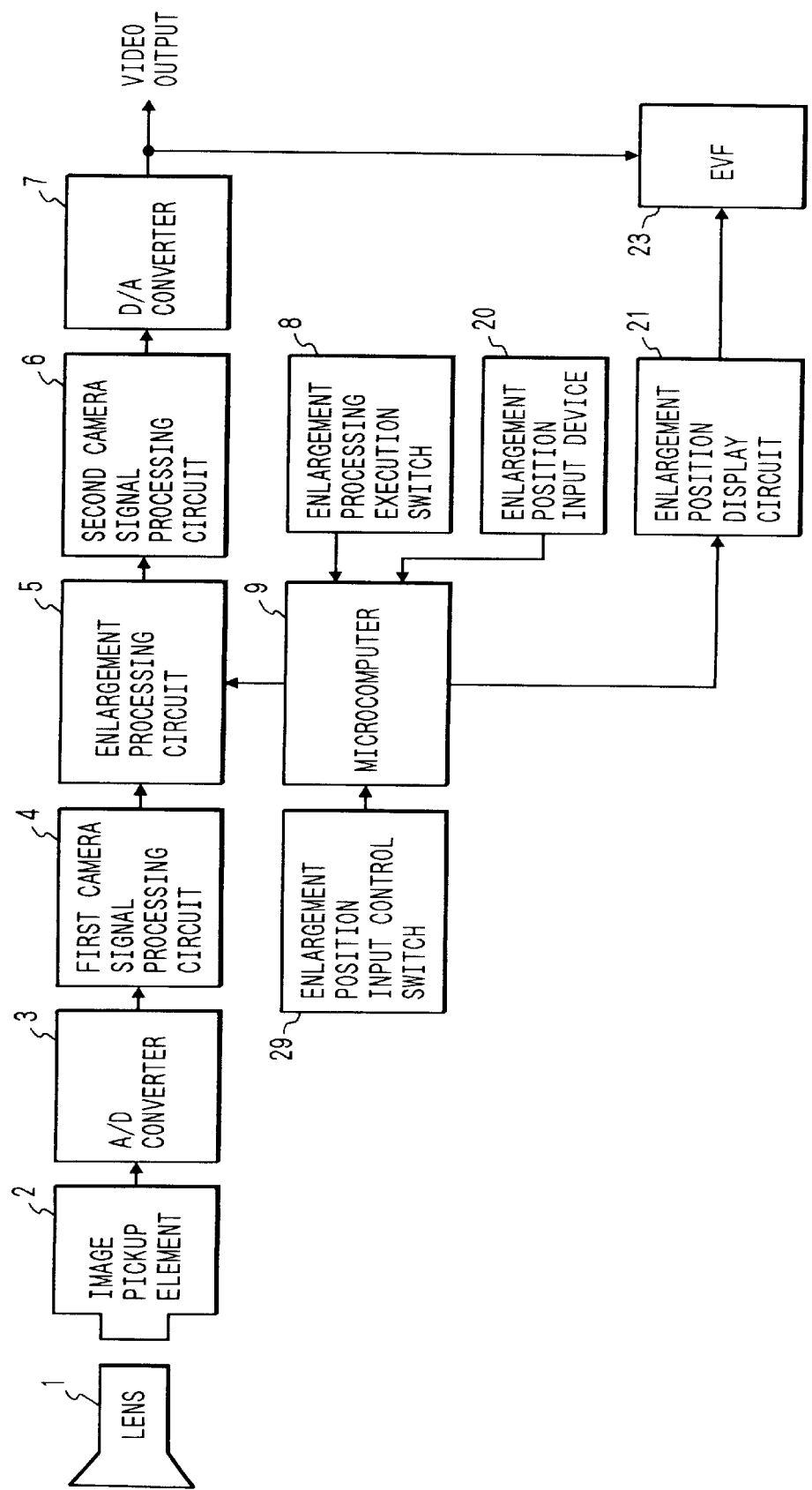
FIG. 8 is a block diagram of an image pickup apparatus constituting a second embodiment of the present invention.
Figure 9:
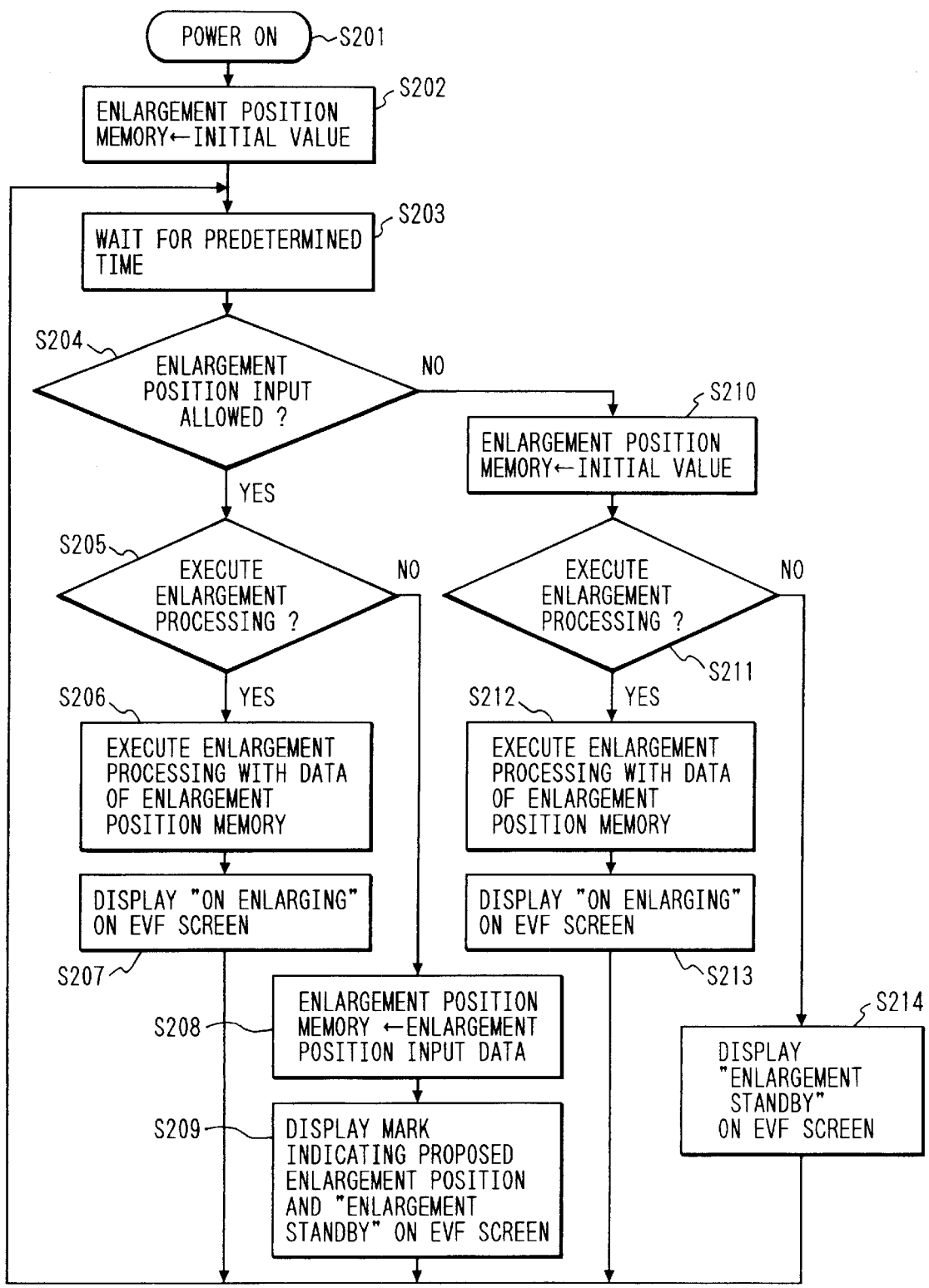
FIG. 9 is a flow chart showing the function of the image pickup apparatus.

In the following a second embodiment of the present invention will be explained with reference to FIGS. 8 to 10. FIG. 8 is a block diagram of an image pickup apparatus constituting the second embodiment of the present invention, wherein components same as those of the first embodiment shown in FIG. 4 are represented by same numbers. The configuration shown in FIG. 8 is different from that in FIG. 4, in the addition of an enlargement position input control switch 29, which selects a state enabling the input by the enlargement position input device or a state disabling such input.

In the present embodiment, the photographer at first actuates the enlargement position input control switch 29 to enable the input from the enlargement position input device 20. Secondly the photographer confirms the center position of the area to be enlarged, by observing the mark 26 displayed on the EVF image area 23 based on the anticipated enlargement position signal from the enlargement position display circuit 21, then determines the position of execution of the enlargement process at a desired position through the manipulation of the enlargement position input device 20, and actuates the enlargement process execution switch 8 to execute the enlargement process. In case the enlargement process is executed by the enlargement process execution switch 8 while the input from the enlargement position input device 20 is inhibited by the enlargement position input control switch 29, the enlargement process is executed at a predetermined position.

In the following there will be explained the control sequence of the microcomputer 9 for executing the actual enlargement process in response to the above-explained operations of the photographer, with reference to FIG. 8 and also to FIG. 9, which is a flow chart showing the control sequence of the microcomputer 9.

At first a step S201 turns on the power supply to activate the microcomputer 9. Then a step S202 stores initial data of a predetermined enlargement position in an enlargement position memory of the microcomputer 9, and a step S203 waits for a predetermined time. After the lapse of a predetermined waiting time, a step S204 discriminates whether the input from the enlargement position input control switch 29 is "enable", and the sequence proceeds to a step S205 or S210 respectively if the input is "enable" or "disable".

The step S205 discriminates whether a signal for executing the enlargement process has been input from the enlargement process execution switch 8, and the sequence proceeds to a step S206 or S208 respectively if the signal has been input or not.

The step S206 provides the enlargement process circuit 5 with the enlargement position information and the enlargement ratio, based on the data stored in the enlargement position memory in the step S202. Then a step S207 displays the message 28, indicating that the enlargement process is in progress, on the EVF image area 23 as shown in FIG. 5 and erases the mark 26 from the EVF image area, and the sequence then returns to the step S203.

On the other hand, the step S208 prepares the enlargement position information based on the signal input from the enlargement position input device 20 and stores the information in the enlargement position memory. Then a step S209 prepares an anticipated enlargement position signal based on the enlargement position information stored in the enlargement position memory, then sends the signal to the enlargement position display circuit 21 and displays the mark 26 indicating the anticipated enlargement position and the message 27 indicating the enlargement stand-by state on the EVF image area as shown in FIG. 5, and the sequence then returns to the step S203.

Also the step S210 inputs the initial data preset in the enlargement position memory. Then a step S211 discriminates whether the signal for executing the enlargement process has been input from the enlargement process execution switch 8, and the sequence proceeds to a step S212 or S214 respectively if the signal has been input or not.

The step S212 provides the enlargement process circuit 5 with the enlargement position information and the enlargement ratio based on the data stored in the enlargement position memory in the foregoing step S202. Then a step S213 displays the message 28, indicating that the enlargement process is in progress, on the EVF image area 23 as shown in FIG. 5, and erases the mark 26 from the EVF image area 23, and the sequence returns to the foregoing step S203.

Figure 10:
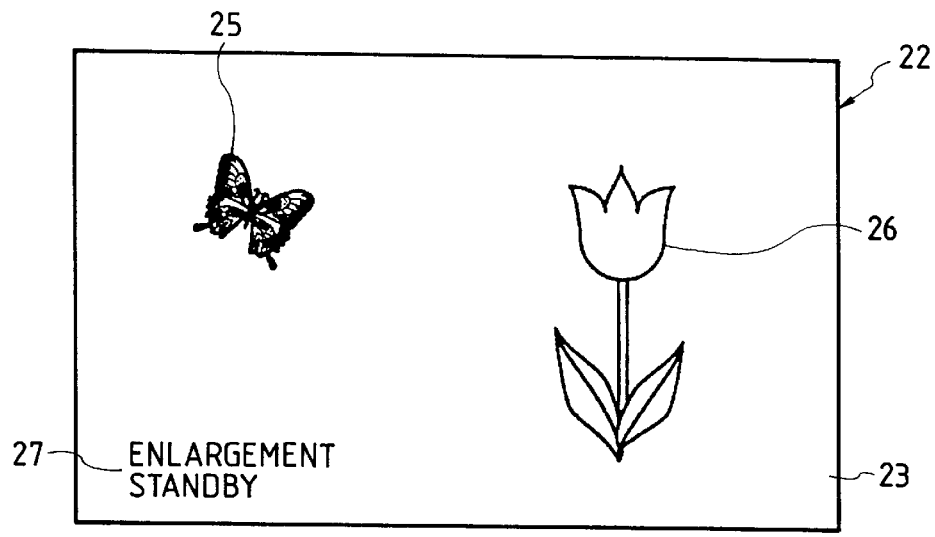
FIG. 10 is a view showing an example of display of an EVF image in an enlargement stand-by state of the image pickup apparatus.

On the other hand, the step S214 displays the message 27 indicating the enlargement stand-by state on the EVF image area 23 as shown in FIG. 10, and the sequence returns to the step S203. In FIG. 10, numerals correspond to those in FIG. 5.

In the following there will be explained a third embodiment of the present invention, with reference to FIGS. 11 to 15. This embodiment utilizes, as the enlargement position input device 20 in the foregoing first embodiment, the detection of position of the viewpoint of the photographer in the observation of the EVF 23 at the phototaking operation, wherein a signal obtained by the detection is utilized as the enlargement position input information. In the present embodiment, a parallel light beam from a light source is projected onto a frontal part of the eye of the observer (photographer), and the axis of the viewpoint is determined from the image positions of the cornea and pupil, obtained from the reflected light.

In the following there will be explained, with reference to FIGS. 11 and 12, an example of the method for detecting the position of the viewpoint.

Figure 11:
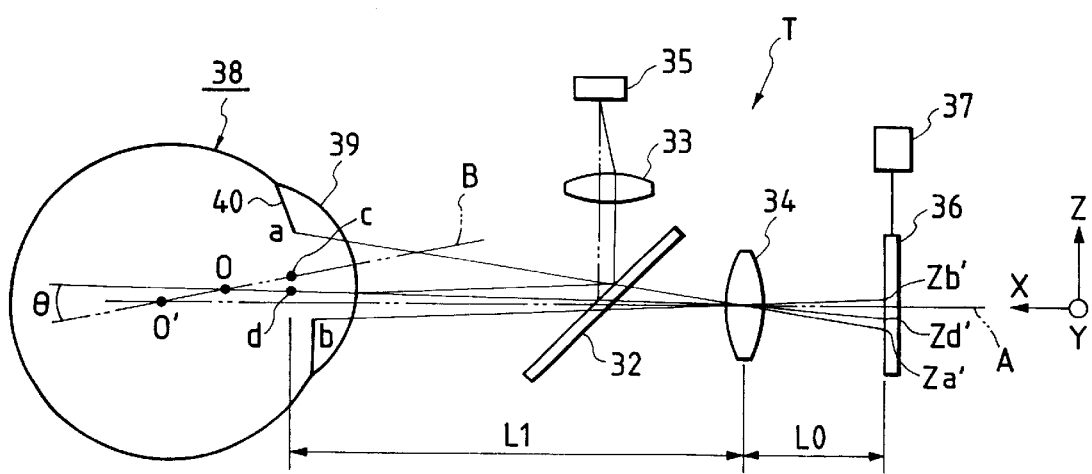
FIG. 11 is a schematic view of an optical system of a viewpoint detecting device in an image pickup apparatus constituting a third embodiment of the present invention.

FIG. 11 is a schematic view showing the optical system of a viewpoint detecting device (viewpoint detecting means) T, wherein shown are a half mirror 32, a light projecting lens 33, a light receiving lens 34, a light source 35 composed for example of a light-emitting diode, positioned at the focal plane of the light projecting lens 33 and adapted to emit infrared light which is not perceivable by the observer, a photosensor array 36, a viewpoint process circuit 37, an eyeball 38 of the observer, a cornea 39 and an iris 40.

Figure 12:
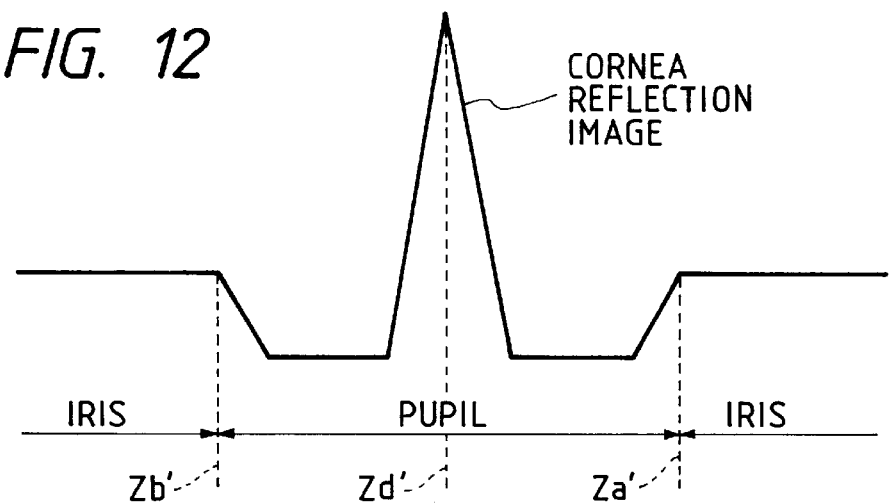
FIG. 12 is a chart showing the intensity of output signals from a photosensor array in the optical system of the viewpoint detecting device shown in FIG. 11.

FIG. 12 shows the intensity of the output signal from the photosensor array 36.

Referring to FIG. 11, the infrared light emitted from the light source 35 is converted into a parallel light beam by the light projecting lens 33, then reflected by the half mirror 32 and illuminates the cornea 39 of the eyeball 38. A part of the infrared light, reflected on the surface of the cornea 39, is transmitted through the half mirror 32 and the light receiving lens 34, and forms images of end portions a, b of the iris 40 at positions Za', Zb' on the photosensor array 36. When the rotation angle $\theta$ of the axis B of the eyeball 38 with respect to the optical axis A of the light receiving lens 34 is small, the Z-coordinate Zc of the center c of the iris 40 can be represented by the Z-coordinates Za, Zb of the end portions a, b of the iris 40, as shown in the following equation (1):

$$Zc=(Za+Zb)/2 \tag{1}$$

Also the rotation angle $\theta$ of the axis B of the eyeball 38 substantially satisfies the following equation (2), wherein Zd is the Z-coordinate of the corneal reflected image d, and oc is the distance from the center o of curvature of the cornea 39 to the center c of the iris 40:

$$oc \times \sin\theta = Zc-Zd \tag{2}$$

The Z-coordinate Zd of the position d of the corneal reflected image coincides with the Z-coordinate Z of the center o of curvature of the cornea 39. Consequently the rotation angle $\theta$ of the axis B of the eyeball 38 can be determined by detecting, in the viewpoint process circuit 37, the positions of specific points (corneal reflected image and ends a, b of the iris 40) projected on the photosensor array 36 as shown in FIG. 12. Consequently the equation (1) can be re-written as an equation (3):

$$\beta \times oc \times \sin\theta = (Za'-Zb')/2-Zd' \tag{3}$$

wherein $\beta$ is the magnification determined by a distance L1 between the Z-coordinate Zd of the position d of the corneal reflected image and the light receiving lens 34 and by a distance L0 between the light receiving lens 34 and the photosensor array 36, and is substantially constant in ordinary cases.

In the following there will be explained the detecting operation of the viewpoint detecting device T with reference to FIGS. 13 and 14, which are respectively a flow chart of the viewpoint detecting sequence and a view showing the corneal reflected image on the photosensor array 36. In FIG. 14, 40, Za', Zb' and Zd' have the same meanings as explained before; c' indicates the center of the pupil; Yb' and Ya' indicate coordinates of the upper and lower ends of the pupil circle; and Yd' indicates Y-coordinate of the corneal reflected image.

Figure 13:
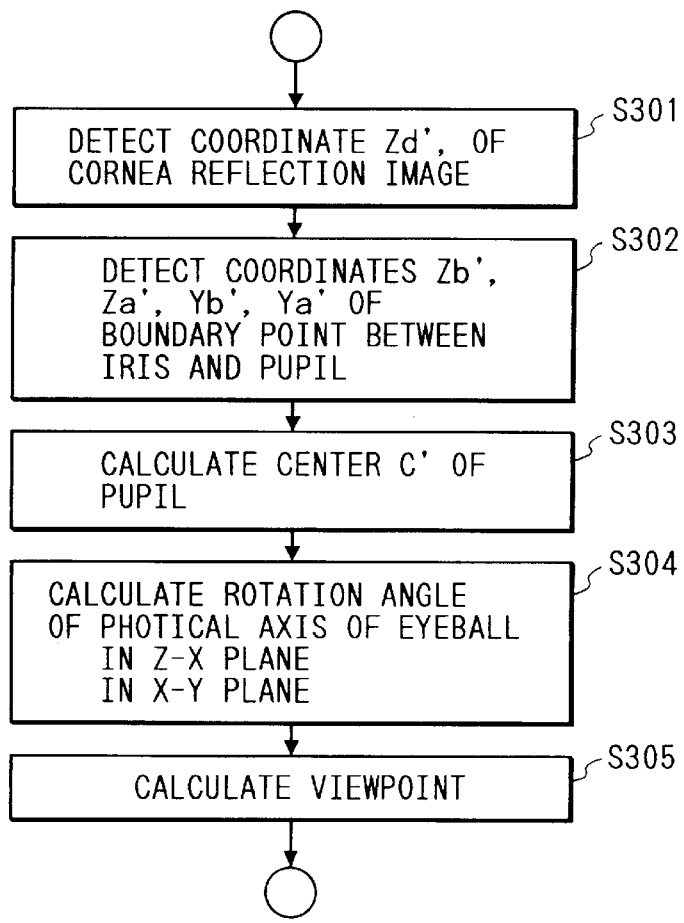
FIG. 13 is a flow chart showing the function of the image pickup apparatus.
Figure 14:
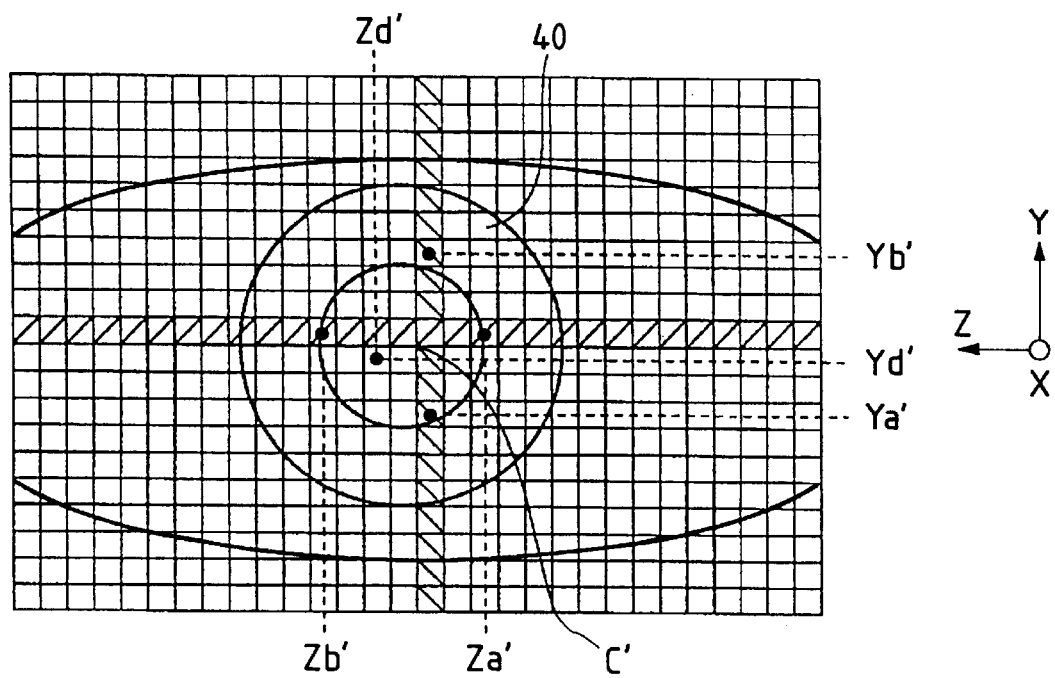
FIG. 14 is a view showing a corneal reflected image on the photosensor array in the image pickup apparatus.

Referring to FIG. 13, a step S301 detects the coordinate Zd' of the corneal reflected image shown in FIG. 14. Then a step S302 detects the coordinates Zb', Za', Yb', Ya' of the boundary points between the iris 40 and the pupil. A next step S303 calculates the center c' of the pupil based on the data detected in the foregoing step S302. Then a step S304 calculates the rotation angle $\theta$ of the axis B of the eyeball 38, based on the data calculated in the step S303. The rotation angle is calculated each in the Z-X plane (horizontal direction) and in the X-Y plane (vertical direction). A next step S305 calculates the position of the viewpoint, based on the values of the rotation angle θ calculated in the step S304.

Figure 15:
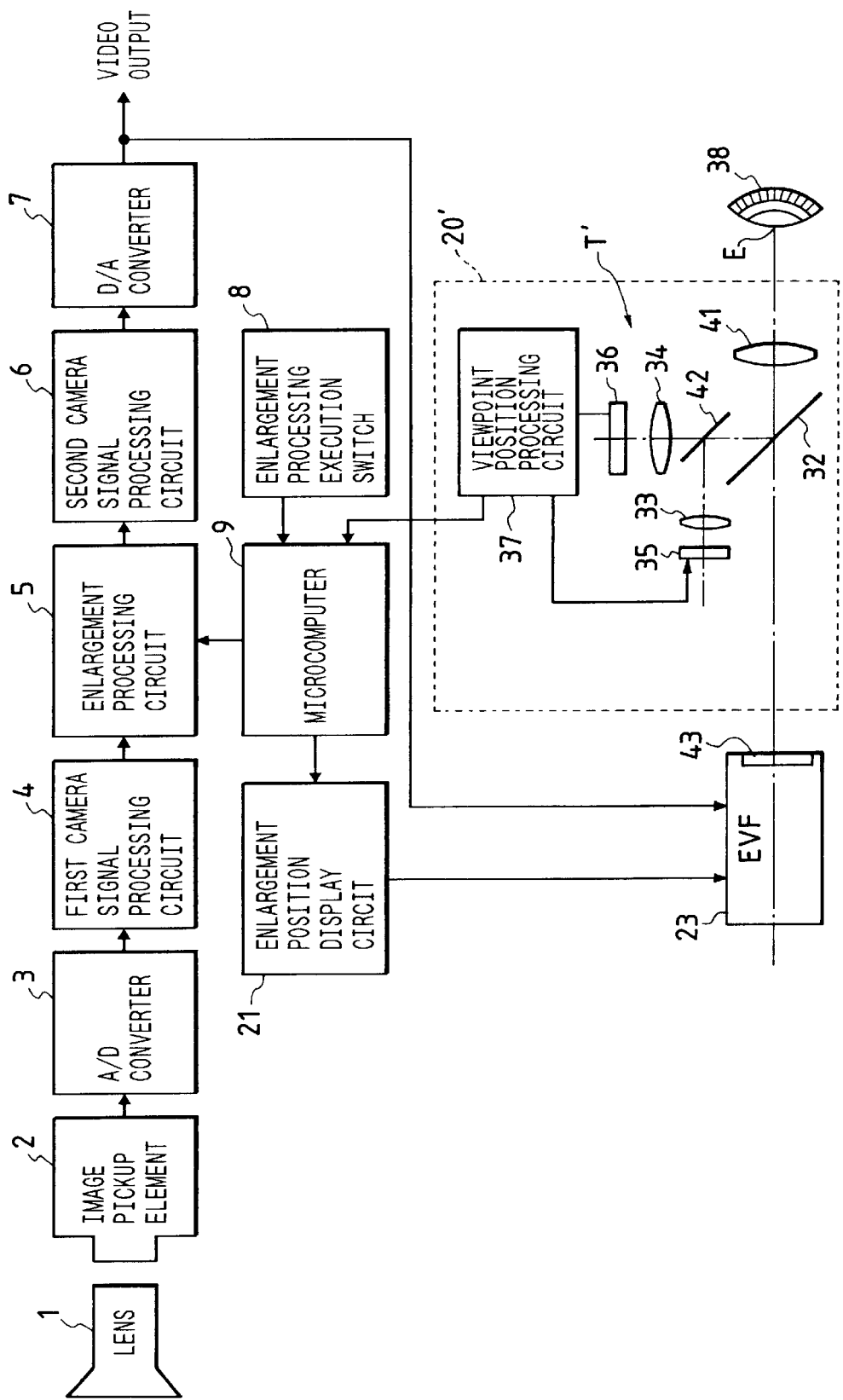
FIG. 15 is a block diagram of the image pickup apparatus.

FIG. 15 is a block diagram of an image pickup apparatus in which the above-explained viewpoint detecting device T is employed as the enlargement position input device, wherein components same as those in the first embodiment shown in FIG. 4 are represented by same numbers. The configuration shown in FIG. 15 is different, from that in FIG. 4, in the structure of the enlargement position input device. In the present embodiment, the enlargement position input device 20' consists of a viewpoint detecting device T', having the optical system of the detecting device T shown in FIG. 11 and further provided with an eyepiece lens 41 and an infrared projecting second half mirror 42. In FIG. 15, there is further shown an EVF image area 43. Other parts of the enlargement position input device 21' of the present invention, being same as those in the optical system of the viewpoint detecting device T in FIG. 11, are represented by corresponding number and will not be explained further.

Referring to FIG. 15, the infrared light emitted from the light source 35 is transmitted by the light projecting lens 33, then reflected by the second half mirror 42 and the first half mirror 32, and reaches the eyeball 38. The reflected light from the eyeball 38 is reflected by the first half mirror 32 and reaches the photosensor array 36 through the light receiving lens 34. On the other hand, a phototaken image displayed on the EVF image area 43 reaches the eyeball 38 through the first half mirror 32 and the eyepiece lens 41. Thus the position of the viewpoint is detected while the photographer confirms the image on the EVF image area 43. The viewpoint process circuit 37 processes the output signal of the photosensor array 36 according to the viewpoint detecting method explained above, and provides the microcomputer 9 with an input signal indicating the enlargement position desired by the photographer. The microcomputer 9 effects control in a similar manner as in the foregoing first embodiment, whereby the image enlargement can be achieved at a desired position within the image area. In FIG. 15, enlargement indicates the optical axis.

As explained in the foregoing, the image pickup apparatus of the above-explained embodiment allows the photographer to select, in simple manner, the position of execution of enlargement process such as by electronic zooming function or electronic close-up function, on the image area.

In the following there will be explained a fourth embodiment of the present invention.

The circuit configuration of the fourth embodiment is similar to that of the first embodiment shown in FIG. 4 and will not, therefore, be explained further. The fourth embodiment is different, from the first embodiment, in the processing algorithm in the microcomputer 9 and in the mode of image display.

In the present embodiment, at the enlargement process of a specified area having the center at a designated position within the image area, there is at first displayed the area to be enlarged there is then displayed the manner of enlargement of the area in the course of execution of the enlargement process. Thus the photographer can easily recognize the execution of the enlargement process.

Figure 16:
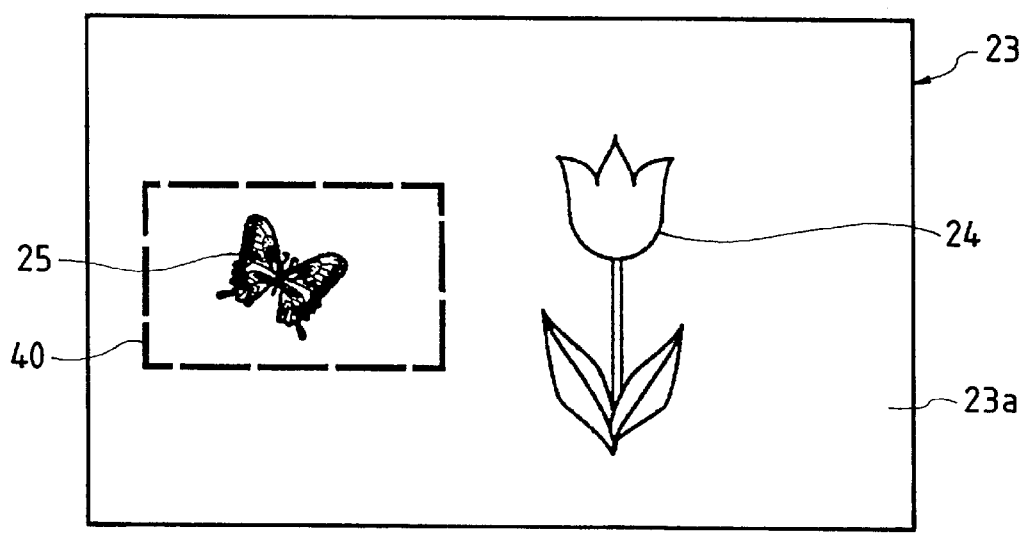
FIG. 16 is a view showing an example of display of an EVF image in an enlargement stand-by state of an image pickup apparatus constituting a fourth embodiment of the present invention.

FIG. 16 shows an example of display on the EVF image area 23 when the position of execution of enlargement is input by the enlargement position input device 20 and the enlargement ratio is input by the enlargement ratio setting device 21. In FIG. 16 there are shown, in the EVF image area 23a, original images 24, 25 and a frame 40 indicating the image area to be enlarged.

Figure 17A:
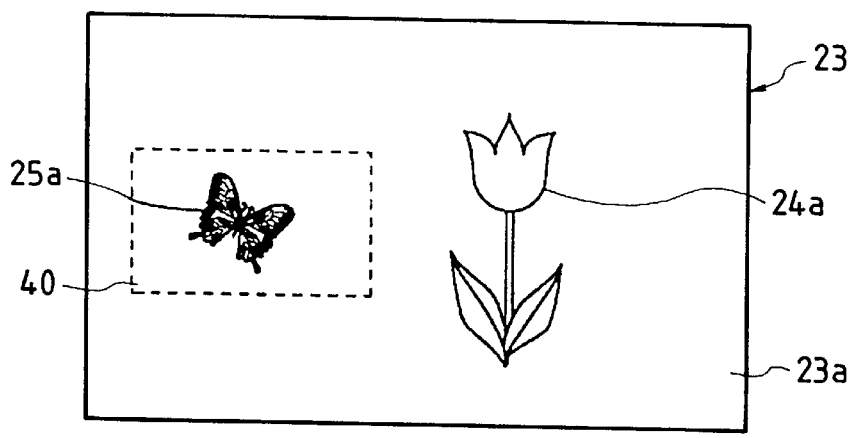
FIGS. 17A to 17C are views showing examples of display of the EVF image in the course of execution of enlargement in the fourth embodiment of the present invention.
Figure 17B:
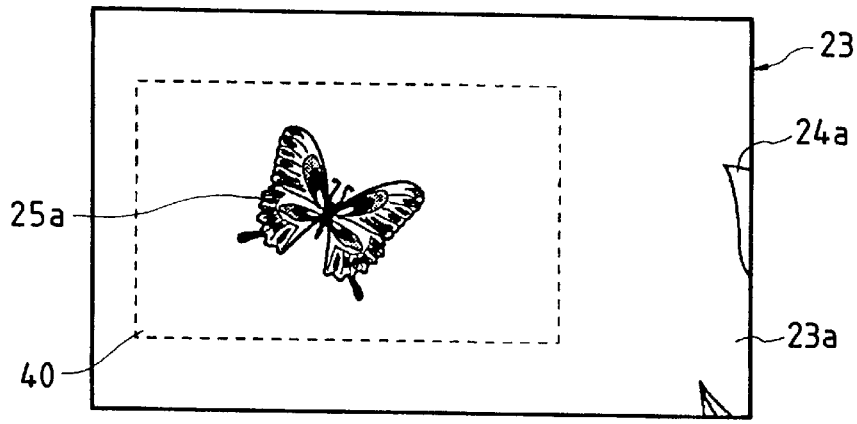
Figure 17C:
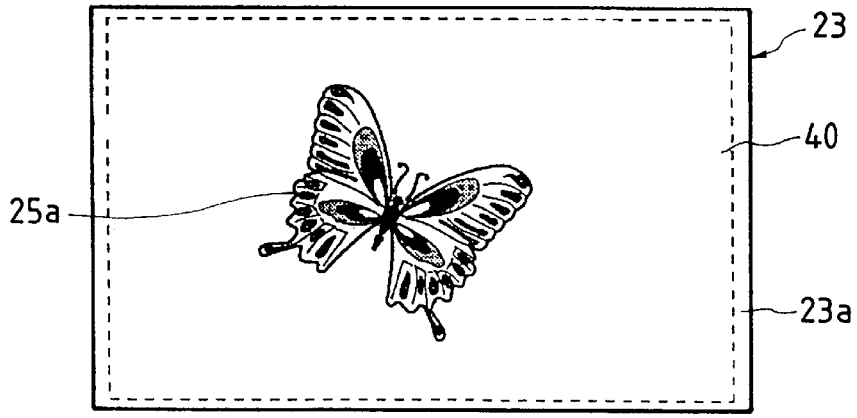

FIGS. 17A to 17C show an example of display on the EVF image area 23a in the course of enlargement process. In these drawings, there are shown enlarged images 25a, 24a displayed on the EVF image area 23a after enlargement, and a similarly enlarged image frame 40a. FIGS. 17A to 17C illustrate the progress of the image enlargement process, wherein the frame 40 indicating the image area to be enlarged gradually expands from FIG. 17A to FIG. 17C. It is also possible to display the image frame 40 only prior to the enlargement process and to erase it in the course of enlargement.

Figure 18:
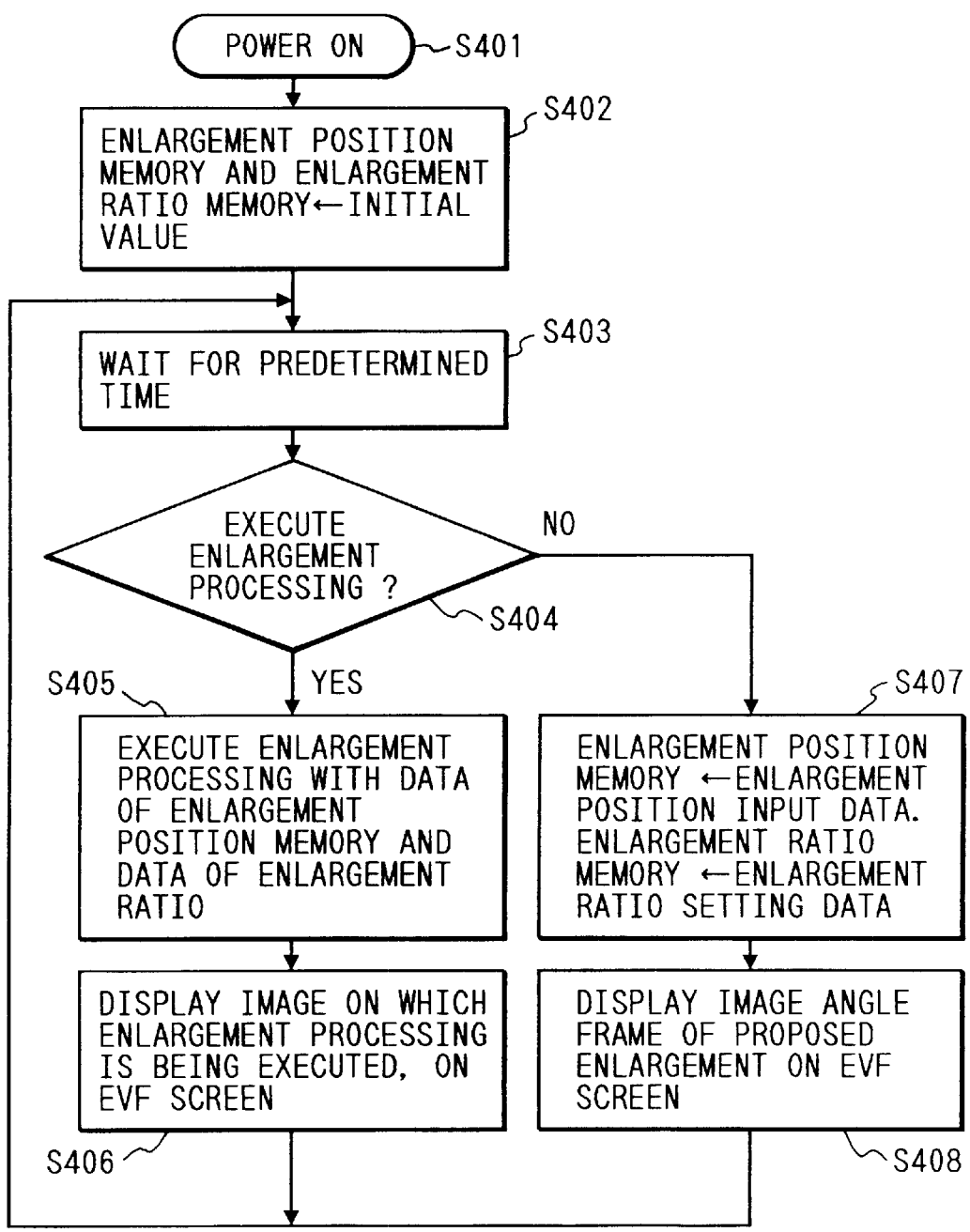
FIG. 18 is a flow chart showing the function of the embodiment.

In the following there will be explained, with reference to FIGS. 4 and 18, the control sequence of the microcomputer 9 for executing the actual enlargement process in response to the above-explained operations of the photographer. FIG. 18 is a flow chart showing the control sequence of the microcomputer 9.

Referring to FIG. 18, a step S401 turns on the power supply to activate the microcomputer 9. Then a step S402 stores initial data of the enlargement position and the enlargement ratio, set by the enlargement position input device 20 and the enlargement ratio setting device 21, respectively in an enlargement position memory and an enlargement ratio memory in the microcomputer 9, and a step S403 waits for a predetermined time. After the lapse of a predetermined waiting time, a step S404 discriminates whether a signal for executing the enlargement process has been input from the enlargement process execution switch 8, and the sequence proceeds to a step S405 or S407 respectively if the signal has been input or not.

The step S405 provides the enlargement process circuit 5 with the enlargement position information and the enlargement ratio information, respectively stored in the enlargement position memory and the enlargement ratio memory in the aforementioned step S402, whereby an enlarged image is output and recorded for example in a connected video cassette recorder. A next step S406 displays the image in the course of execution of the enlargement process in continuous manner as shown in FIGS. 17A to 17C, and the sequence then returns to the step S403, and FIGS. 17A to 17C show an example of the display on the EVF image area 23 at this image output. FIG. 17A shows the initial state of the image enlargement while FIG. 17B shows a state in which the original images 24, 25 are respectively being enlarged, and FIG. 17C shows the end state of image enlargement. As the image frame 40, indicating the image area to be enlarged, is displayed, the photographer can clearly know which portion of the image is to be enlarged.

On the other hand, the step S407 prepares enlargement position data and enlargement ratio data, based on the signals input from the enlargement position input device 20 and the enlargement ratio setting device 21, and stores the data respectively in the enlargement position memory and the enlargement ratio memory. Then a step S408 prepares an image frame signal indicating the image area to be enlarged, based on the enlargement position data and the enlargement ratio data respectively stored in the enlargement position memory and the enlargement ratio memory and sends the signal to the enlargement position display circuit 22, thereby displaying the anticipated enlargement image frame 40 on the EVF image area 23a as shown in FIG. 16, and the sequence then returns to the step S403.

The enlargement position input device 20 can be any device enabling the photographer to designate a two-dimensional position, but can be conveniently composed, for example, of known track ball, joy stick or tough panel.

In the following there will be explained a fifth embodiment of the present invention, which utilizes, as the enlargement position input device 20 in the foregoing first and fourth embodiments, a detection signal indicating the viewpoint of the photographer in the observation of the EVF 23 at the phototaking operation, the detection signal serving as the enlargement position input information, and the circuit configuration of the present embodiment is similar to that shown in FIG. 15. In the present embodiment, the axis of the viewpoint is determined by projecting a parallel light beam from a light source onto the frontal part of the eye of the observer (photographer) and utilizing the image positions of the corneal reflected image and the pupil, obtained from the light reflected from the eye. The method of detecting the viewpoint is same as already explained in the foregoing with reference to FIGS. 11 to 14.

As explained in the foregoing, the image pickup apparatus of the above-explained embodiment enables the photographer to select, in simple manner, the position of execution of the enlargement process and the enlargement ratio for example of the electronic zooming function or the electronic close-up function on the display image area, so that the photographer can securely know, in advance, the image area to be enlarged. As the position of execution of the enlargement process can be determined by the detection of the visual axis (line of sight) of the operator, the operator can set the position of execution of the enlargement process by merely watching the displayed image, without any other cumbersome operation, whereby splendid operability can be attained.

The operability can be similarly improved also in case a joy stick or a track ball is employed.

In the following there will be explained a sixth embodiment of the present invention, which can avoid, at the image enlargement process, loss of a part of the image, resulting from overflow of the enlarged image portion beyond the entire image display area.

Figure 19:
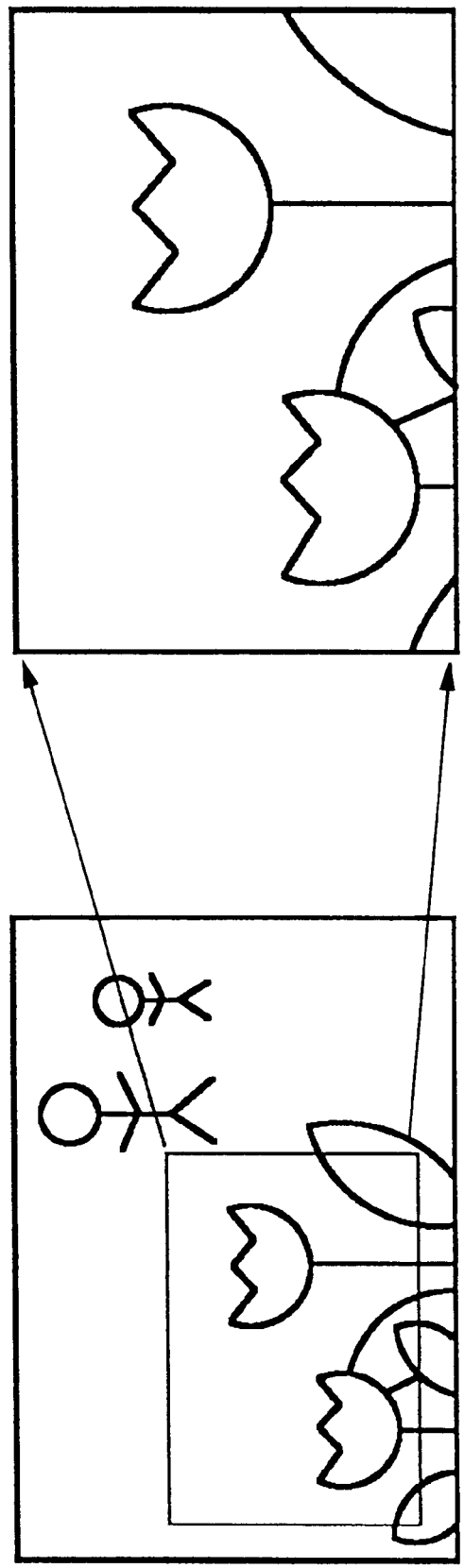
FIG. 19 is a view showing an example of enlargement process for image magnification.

As explained in the foregoing, the present invention enables, as shown in FIG. 19, to enlarge a predetermined image area, having an arbitrary center position, within the image area, to the entire image area with a predetermined enlargement ratio, according to the enlargement process and the linear interpolation already explained in relation to FIGS. 2A to 2D and 3.

Figure 20:
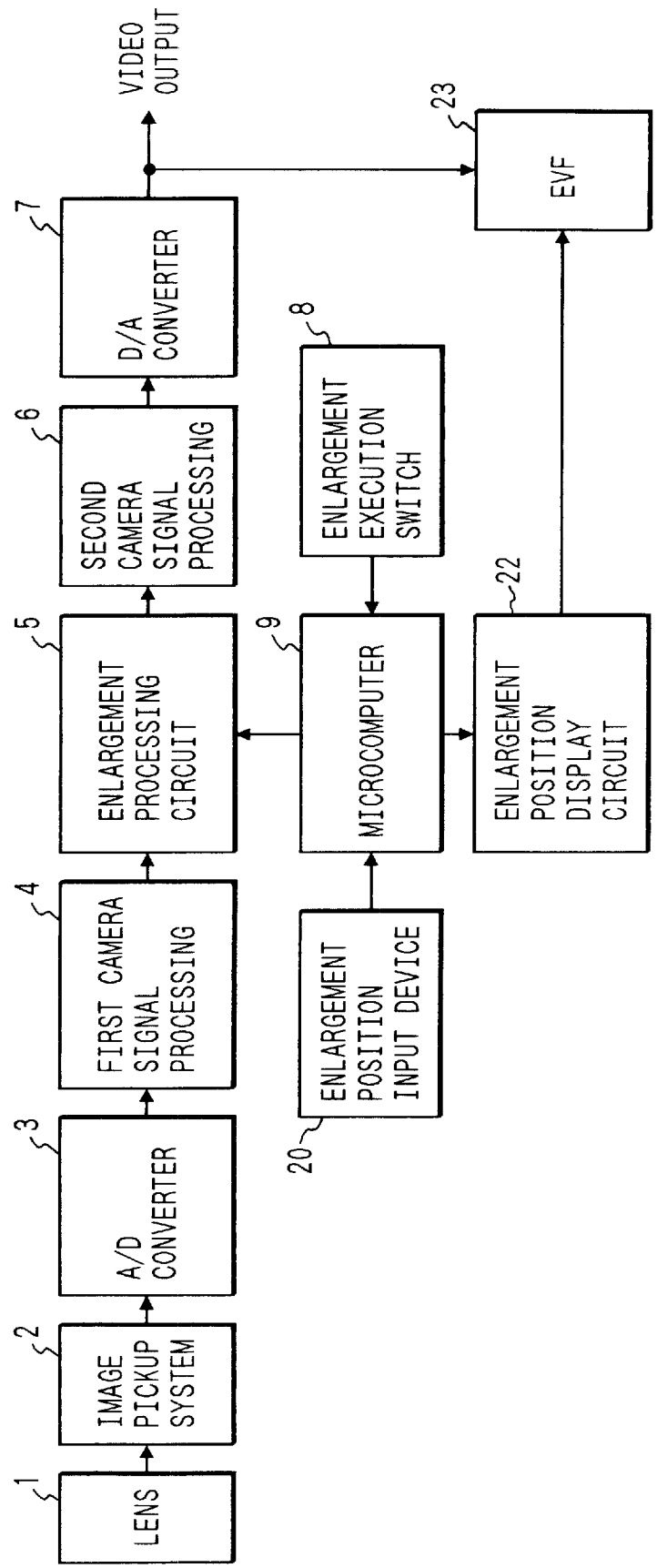
FIG. 20 is a schematic block diagram of a video camera provided with image enlarging function.

FIG. 20 is a block diagram of a video camera capable of enlargement process. Although the configuration shown in FIG. 20 can be understood from those of the foregoing embodiment, it is illustrated again in FIG. 20 for facilitating the following description and understanding. The numbers in FIG. 20 correspond to those in FIG. 4.

FIG. 20 is a block diagram of a video camera provided with electronic image enlarging means, wherein the light coming from the lens 1 is converted by the image pickup system 2, including a CCD. into electrical signals, which are then converted into digital signals by the A/D converter 3. The signals are then transmitted by the first camera signal process circuit 4, the enlargement process circuit 5 of which details are shown in FIG. 11, and the second camera signal process circuit 6, and are converted by the D/A converter 7 into image signals of NTSC or PAL format and output.

The enlargement process circuit 5 is controlled by the microcomputer 9, to which connected are the enlargement process execution switch 8 and the enlargement position input device 20, for inputting data of the center position of the image enlargement into the microcomputer.

The microcomputer 9 provides the enlargement process circuit 5 with the information on the position of enlargement and the enlargement ratio on the image area.

On the other hand, similar information is transmitted to the enlargement position display circuit 22, which displays the information on the electronic view finder (EVF) 23. At the same time the EVF 23 displays the output image information, so that the operator can confirm, through the EVF 23, the center, area and extent of image enlargement within the phototaken image.

FIG. 21 is a flow chart showing the outline of the function of the microcomputer 9 shown in FIG. 20. In response to the actuation of the enlargement process execution switch 8, microcomputer 9 initiates the enlarging operation (step S501). When the enlargement center position data are input by the enlargement position input device 20, the microcomputer 9 reads the data (step S502), and executes the enlarging operation with a predetermined enlargement ratio around the enlargement center position (step S503), whereupon the sequence is terminated (step S504).

Figure 22B:
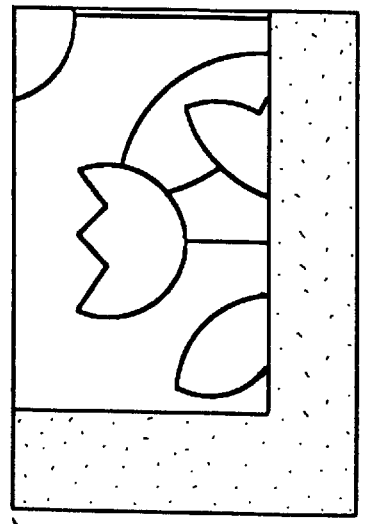
FIGS. 22A and 22B are views showing drawbacks encountered in the image enlarging device in the apparatus shown in FIG. 20.
Figure 22A:
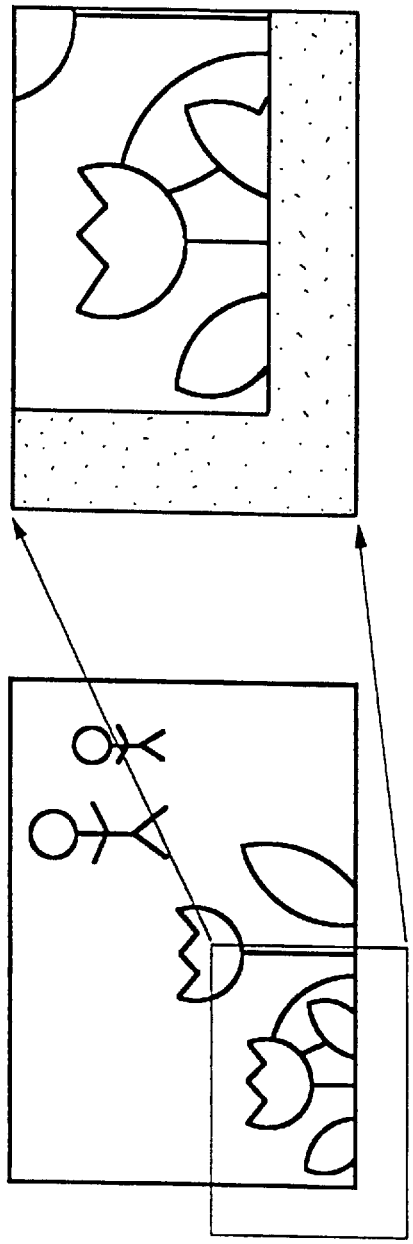

However, in effecting the image enlargement by the image enlarging means (enlargement process circuit 5) with the center at a certain point on the image area, if the center of enlargement is selected distant from the center of the image area, the area to be enlarged may overflow the image areas as shown in FIG. 22A, depending on the selected center position, and such overflowing portion may be displayed as a solid black area, as shown in FIG. 22B, thus giving unpleasant impression.

The present embodiment is realized in consideration of such background and is to prevent, in effecting electronic image enlargement with the center at a certain point within the phototaken image area, enlarged display of an image portion not containing the image information.

The above-mentioned object can be attained, according to a preferred embodiment of the present invention, by an image pickup apparatus comprising enlarged display means for electronically enlarging and displaying a phototaken image; input means for inputting an enlargement center position; memory means for memorizing a selectable area for the enlargement center position in order that the area outside the phototaken image is not subjected to the enlargement; discrimination means for discriminating whether the enlargement center position input by the input means is within the selectable area memorized in the memory means; and control means for causing, in case the discrimination means identifies that the input enlargement center position is within the selectable area, the enlarged display means to effect the enlarged display process with the center at the input enlargement center position, but, in case the discrimination means identifies that the input enlargement center position is outside the selectable area, the enlarged display means to effect the enlarged display process with the center at a point, within the selectable area, closest to the input enlargement center position.

The input means can be composed, for example, of a mouse, a track ball, a joy stick, a touch panel, or a visual axis detecting device.

Also according to the present embodiment there is provided a configuration comprising enlarged display means for electronically enlarging and displaying a phototaken image; input means for inputting an enlargement center position; memory means for memorizing a selectable area for the enlargement center position in order that the area outside the phototaken image is not subjected to the enlargement; discrimination means for discriminating whether the enlargement center position input by the input means is within the selectable area memorized in the memory means; and control means for causing, in case the discrimination means identifies that the input enlargement center position is within the selectable area, the enlarged display means to effect the enlarged display process with the center at the input enlargement center position, but, in case the discrimination means identifies that the input enlargement center position is outside the selectable, area, for limiting the enlargement center position to a predetermined position within the selectable area and causing the enlarged display means to effect the enlarged display process with the center at the predetermined position.

It is thus rendered possible to prevent the enlarged display of a portional area not containing the image information, by causing, in case the discrimination means identifies that the enlargement center position input by the input means is within th selectable area memorized in the memory means, the enlarged display means to effect the enlarged display process with the center at the input enlarged center position, but, in case the discrimination means identifies that the input enlargement center position is outside the selectable area, the enlarged display means to effect the enlarged display process with the center at a position, within the selectable area, closest to the input enlargement center position.

It is also rendered possible to prevent the enlarged display of a portional area not containing the image information, by causing, in case the discrimination means identifies that the enlargement center position input by the input means is within the selectable area memorized in the memory means, the enlarged display means to effect the enlarged display process with the center at the input enlarged center position, but, in case the discrimination means identifies that the input enlargement center position is outside the selectable area, by limiting the enlargement center position to a predetermined position within the selectable area and causing the enlarged display means to effect the enlarged display process with the center at the predetermined position.

The sixth embodiment of the present invention will not be explained in detail with reference to FIGS. 23 to 28.

Figure 23:
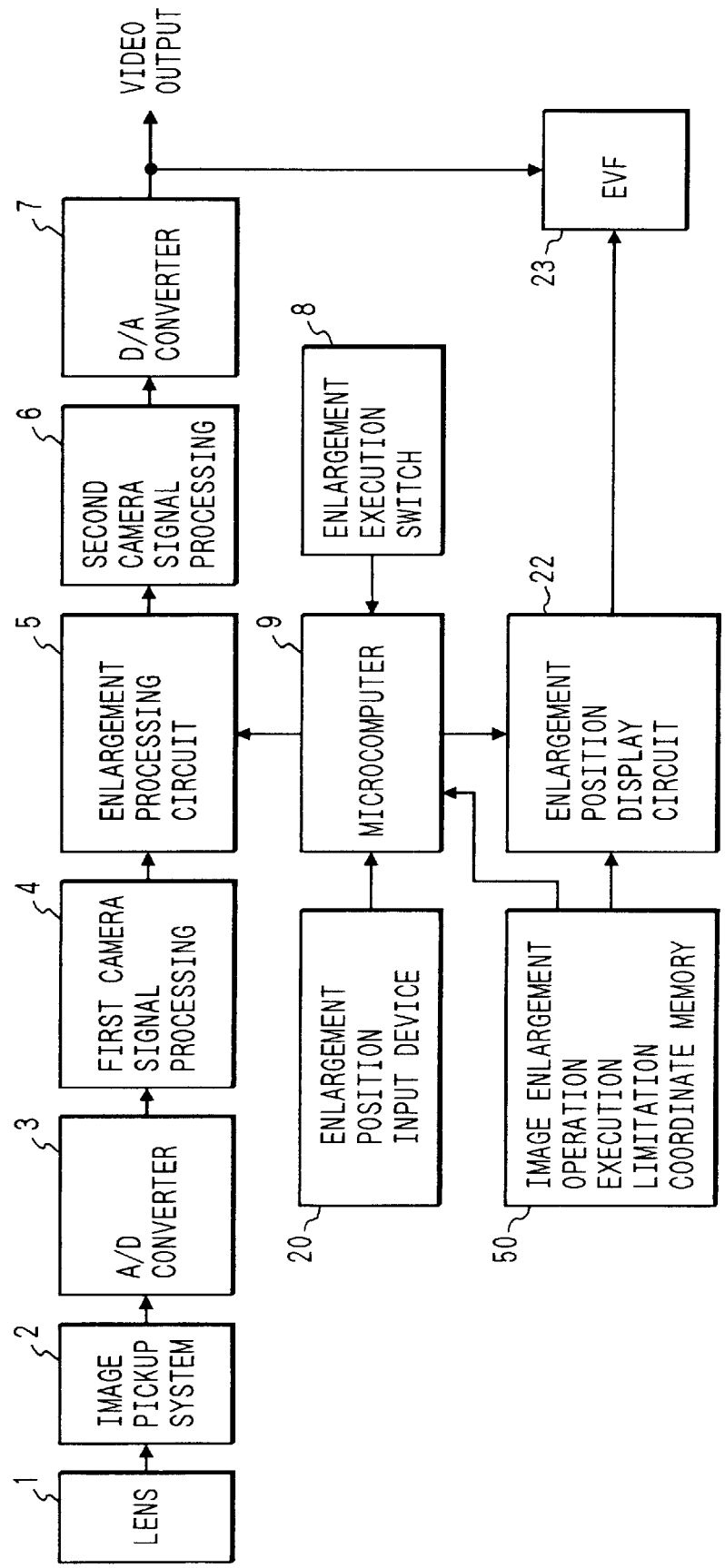
FIG. 23 is a block diagram of a sixth embodiment of the present invention.

FIG. 23 is a schematic block diagram of a video camera utilizing an image pickup apparatus constituting the sixth embodiment of the present invention.

Referring to FIG. 23, the light from the lens 1 is converted, in an image pickup system 2 including a CCD, into electrical signals, which are then converted into digital signals by the A/D converter 3. The signals are transmitted by the first camera signal process circuit 4, the enlargement process circuit 5 of which details are shown in FIG. 3, and the second camera signal process circuit 6, and converted by the D/A converter 7 into image signals of NTSC or PAL format for output.

The enlargement process circuit 5 is controlled by the microcomputer 9, to which connected are, in addition to the enlargement process circuit 5, an enlargement process execution switch 8, an enlargement position input device 20 for inputting the coordinate data of the center position for image enlargement, a coordinate memory 50 for limiting the execution of the image enlargement, and an enlargement position display circuit 22.

When the execution switch 8 is turned on, the microcomputer 9 determines the enlargement center coordinate, based on the coordinate data of the center position of the image enlargement input from the enlargement position input device 20 and the coordinate data for limiting the execution of the image enlargement read from the coordinate memory 50, and provides the enlargement process circuit 5 with the information on the enlargement center position and the enlargement ratio on the image area.

The microcomputer 9 transmits similar information to the enlargement position display circuit 22, which displays the information on the electronic view finder (EVF) 23. At the same time the EVF 23 displays the output image information, so that the operator can confirm, through the EVF 23, the center, area and extent of image enlargement within the phototaken image.

Figure 24:
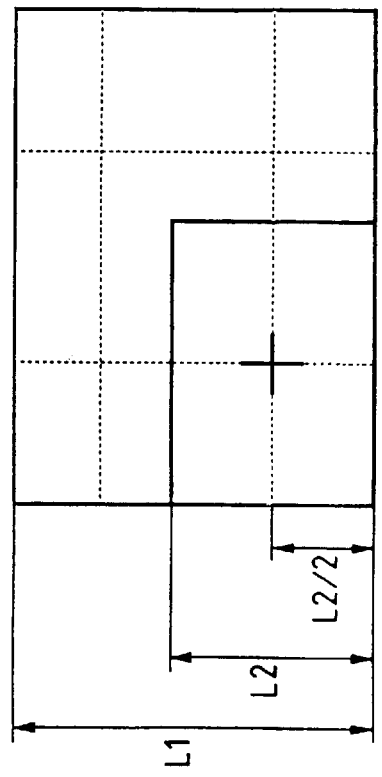
FIG. 24 is a view showing the center of image enlargement and the area of enlargement.

In the following there will be explained the principle of enlargement process in the present embodiment. FIG. 24 shows the center position and range of enlargement. In the vertical direction, the enlargement area has a vertical range L2, with the center thereof (enlargement center position) located at L2/2 from the lower end of the image area, and a similar relation exists also in the horizontal direction. Therefore, in order to avoid formation of a signal-free black area, as shown in FIG. 22B, at the image enlargement, the movable range of the enlargement center position has to be so limited that the area to be enlarged does not overflow the image area.

Figure 25:
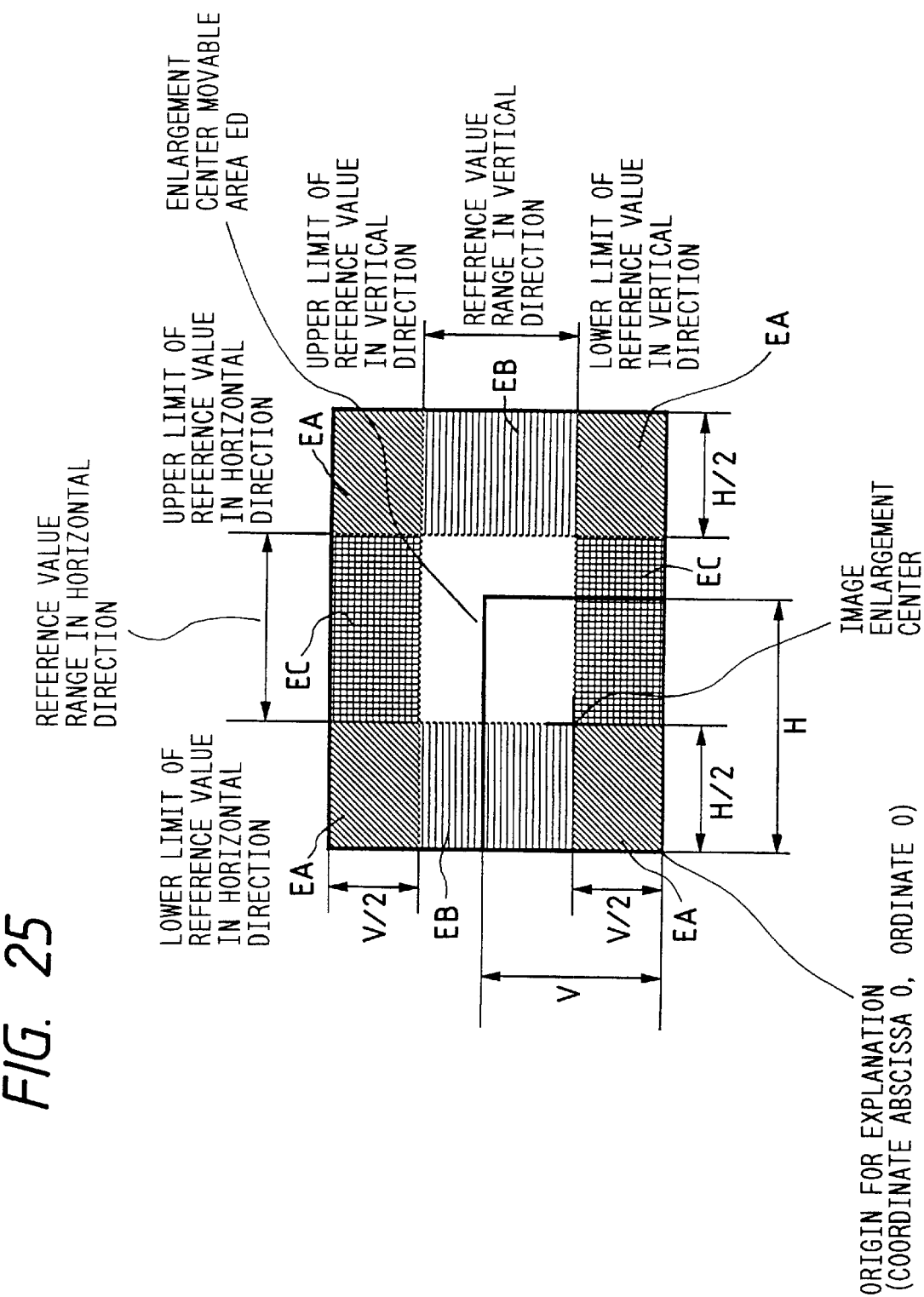
FIG. 25 is a view showing the method of determination of the center of image enlargement.

In FIG. 25, the original point of the coordinate system is assumed to be at the lower left corner of the image area, for the purpose of explanation. In order that the area to be enlarged does not overflow the image area, the enlargement center position has to be limited within a central white area (enlargement center movable area) ED, as already explained in relation to FIG. 24. Therefore, when the enlargement center is selected outside the area, the aberration in the center of enlargement from the actual enlargement operation has to be made least conspicuous. For this reason, if the enlargement center is selected within an area EA, the enlargement process is executed with the center at the upper or lower limit coordinate of the movable area ED, closest to the selected enlargement center.

If the enlargement center is selected within an area EB, the X-coordinate (in the horizontal direction) of the enlargement center is fixed at the maximum coordinate of the movable area in the horizontal direction. On the other hand, the coordinate of the enlargement center is not varied in the vertical direction (Y-coordinate).

Also if the enlargement center is selected within an area EC, the Y-coordinate of the enlargement center is fixed at the maximum or minimum coordinate of the movable area in the vertical direction, but, the coordinate of the enlargement center is not varied in the horizontal direction.

In summary, if the center of image enlargement is selected outside the movable area ED for the enlargement center, the enlargement process is executed with the center at a position, in the movable area ED, at the shortest distance from the selected enlargement center.

The above-explained principle can minimize the movement of the enlargement center at the execution of the enlargement process regardless of the selection of the enlargement center in any position within the image area, thereby enabling smooth switching between an ordinary display image and an enlarged image without unpleasant signal-free portion.

Figure 26:
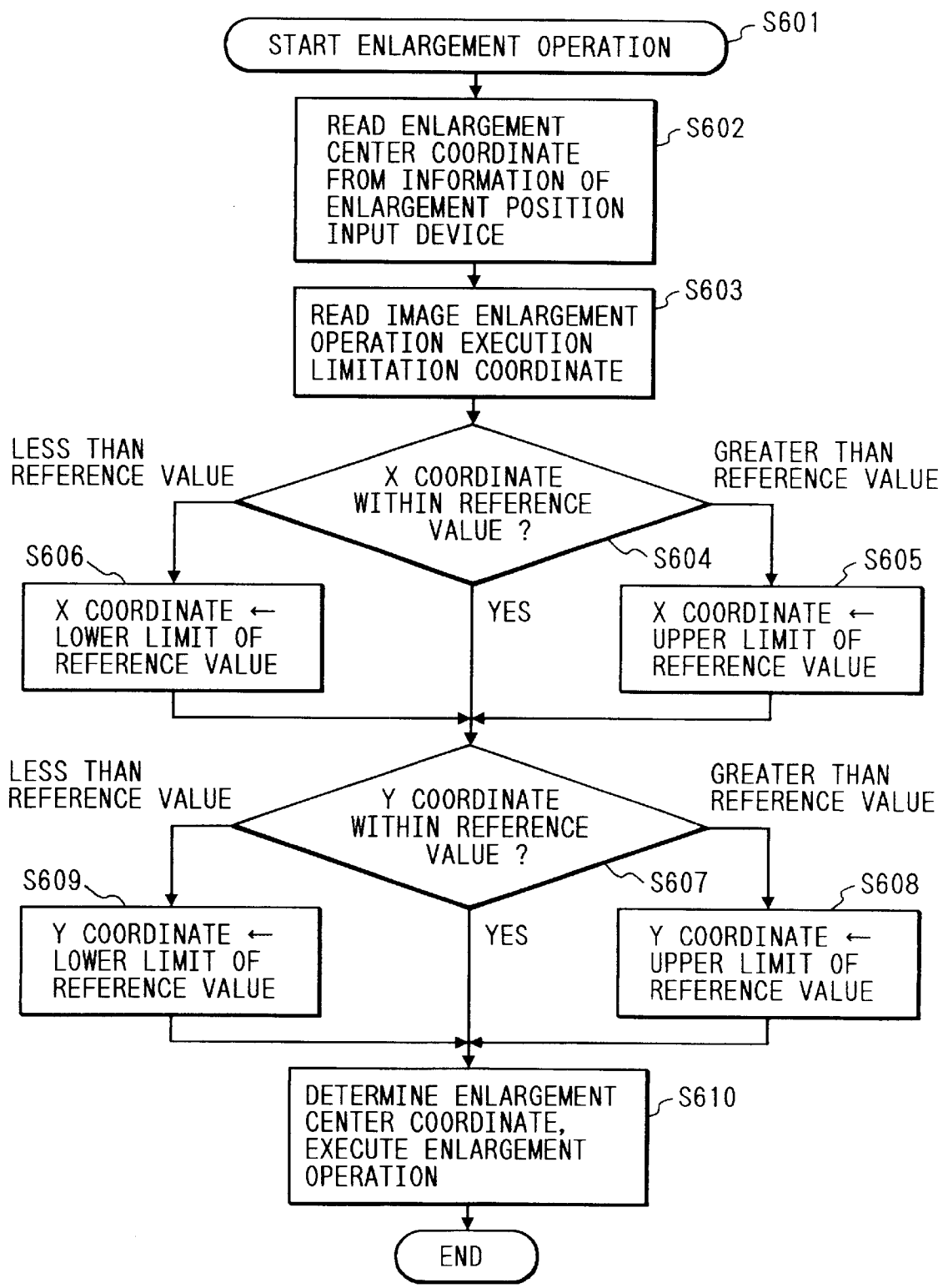
FIG. 26 is a flow chart showing the process for determining the center of image enlargement.

The above-explained operations will be explained with reference to a flow chart shown in FIG. 26. When the enlargement process execution switch 8 is actuated, the microcomputer 9 initiates the enlargement process (step S601), and reads the coordinate data of the enlargement center when it is designated by the enlargement position input device 20 (step S602).

Then the microcomputer 9 reads the coordinate data for limiting the image enlargement execution from the coordinate memory 50 and sets the coordinate data in enlargement center position register for execution (not shown) (step S603), and discriminates whether the X-coordinate of the designated enlargement center is within the specified range of the coordinate limiting the image enlargement process (step S604). If within the specified range, the sequence proceeds to a step S607.

On the other hand, if the designated enlargement center is larger than the specified range, the X-coordinate of the enlargement center position register is changed to the upper limit value of the X-coordinates limiting the image enlargement process (step S605) and the sequence proceeds to the step S607. If the designated enlargement center is smaller than the specified range, the X-coordinate of the enlargement center position register is changed to the lower limit value of the X-coordinates limiting the image enlargement process (step S606) and the sequence proceeds to the step S607.

The step S607 discriminates whether the Y-coordinate of the designated enlargement center is within the specified range of the coordinate limiting the image enlargement process. If within the specified range, the sequence proceeds to a step S610.

On the other hand, if the designated enlargement center is larger than the specified range, the Y-coordinate of the enlargement center position register is changed to the upper limit value of the Y-coordinates limiting the image enlargement process (step S608), and the sequence proceeds to the step S610. If the designated enlargement center is smaller than the specified range, the Y-coordinate of the enlargement center position register is changed to the upper limit value of the Y-coordinates limiting the image enlargement process (step S609), and the sequence proceeds to the step S610.

The step S610 executes the enlargement process by providing the enlargement process circuit 5 with the coordinate data of the actual enlargement center from the enlargement center position register. The enlargement process circuit 5 executes the enlargement process with a predetermined enlargement ratio and with a center indicated by the coordinate data of the actual enlargement center.

Through the above-explained procedure, even in case the enlargement center is designated at such position that the enlargement area overflow the image area as exemplified by E1 in FIG. 27A, the enlargement process is executed with a center, within the coordinate range limiting the image enlargement process, closest to the designated enlargement center as shown by E2 in FIG. 27A, so that the formation of a signal-free black image portion can be avoided as shown in FIG. 27B.

The enlargement position input device 20 can be any device enabling the operator to designate a two-dimensional position, including a mouse, a track ball, a joy stick or a touch panel well known in the art.

Figure 28:
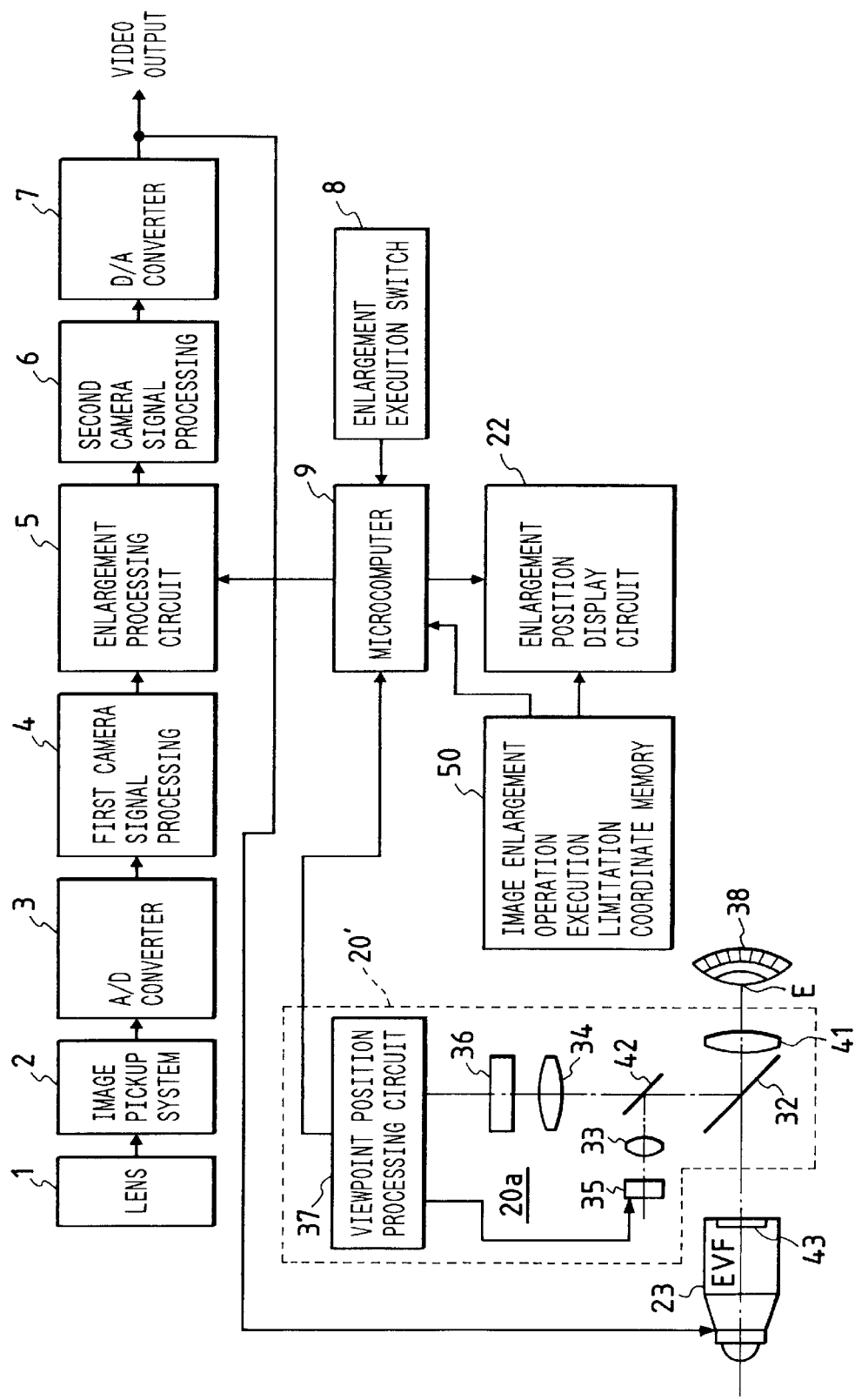
FIG. 28 is a schematic block diagram of a video camera utilizing an image pickup device constituting a seventh embodiment of the present invention.

FIG. 28 is a schematic block diagram of a video camera utilizing an image pickup apparatus constituting a seventh embodiment of the present invention, which utilized, as the enlargement position input device 20, a viewpoint detecting device 20' for detecting the viewpoint of the operator in observing the EVF 23, wherein the viewpoint detected by the detecting device 20' is input as the information on the position of the enlargement center.

In the viewpoint detecting device 20a, a parallel light beam from a light source is projected onto the frontal part of the eyeball of the observer, and the visual axis is determined utilizing the image position of the pupil and the corneal reflected image, obtained by the light reflected from the cornea. The detecting device will not be explained further as it has already been explained in relation to FIGS. 11 to 14.

The viewpoint detecting device 20' shown in FIG. 28, for detecting the viewpoint of the observer based on the center detecting method explained in the foregoing, is provided, in addition to the components of the detecting optical system shown in FIG. 11, with an eyepiece lens 41, an infrared light projecting half mirror 42 and a finder image area 43.

Referring to FIG. 28, the infrared light emitted from the light source 35 is transmitted by the light projecting lens 33, then reflected by the half mirrors 42, 32 and reaches the eyeball 38. The reflected light from the eyeball 38 is reflected by the half mirror 32, then transmitted by the light receiving lens 34 and reaches the photosensor array 36. On the other hand, the phototaking image displayed on the finder image area 43 reaches the eyeball 38 through the half mirror 32 and the eyepiece lens 41.

Thus the position of the viewpoint can be detected while the operator confirms the image on the view finder 23. The viewpoint position process circuit 37 determines the viewpoint by processing the output signal from the photosensor array 36 according to the aforementioned detecting method, and sends the viewpoint, as an input signal representing the position of the enlargement center desired by the operator, to the microcomputer 9, which effects the process explained in the first or sixth embodiment thereby enlarging an arbitrary area, desired by the operator on the image area, with a predetermined enlargement ratio.

As explained in the foregoing, the present embodiment limits the center position of the enlargement display process to a certain specified area within the image area, thereby preventing enlarged display of a black portion not containing image information and minimizing the unnatural displacement of the image center at the shift from the ordinary image display state to the enlarged display state.

Figure 29:
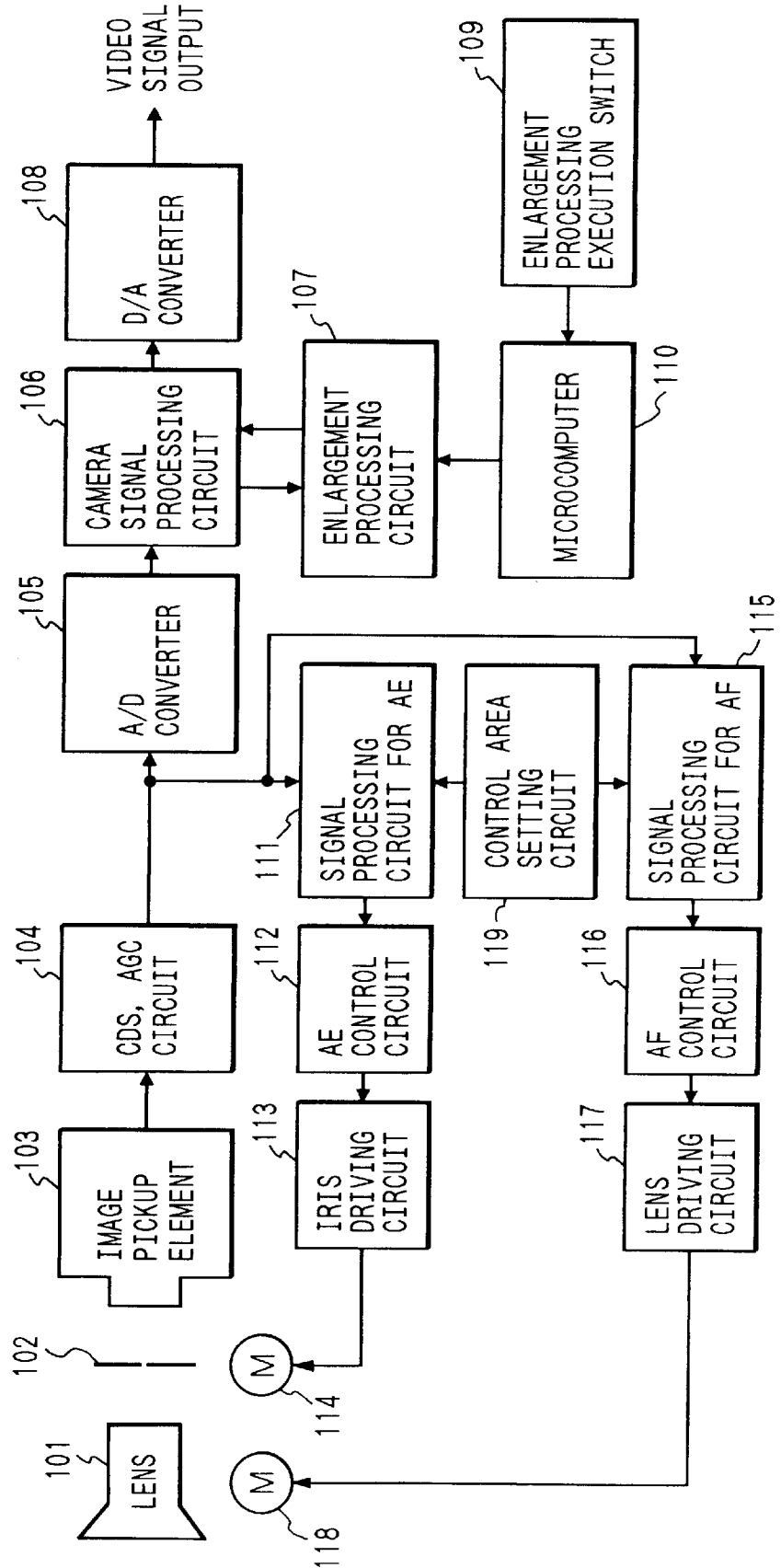
FIG. 29 is a block diagram of a video camera provided with an electronic image magnification varying device.

Now, prior to the description of an eighth embodiment, there will be given an explanation, with reference to FIG. 29, on electronic image magnification enlarging means. FIG. 29 is a block diagram of a video camera for explaining conventional electronic image magnification enlarging means, wherein shown a lens 101 for forming the image of an unrepresented object; an iris (diaphragm) mechanism 102 such as an IG meter for regulating the amount of incident light from the lens 101; an image pickup device 103 for converting the light, inputting through the iris mechanism 102, into electrical signals by photoelectric conversion; a CDS/AGC circuit 104 for effecting sampling and gain control on the photoelectrically converted signals from the image pickup device 103; an analog-to-digital (A/D) converter 105 for converting the analog signals from the CDS/AGC circuit 104 into digital signals; a camera signal process circuit 106 for effecting a predetermined process on the A/D converted signals from the A/D converter 105, for example gamma correction on each of the color signals and the luminance signal; an enlargement process circuit (electronic image enlarging means) 107 for enlarging the image signals output from the camera signal process circuit 105; a digital-to-analog (D/A) converter 108 for converting the digital signals from the camera signal process circuit 107 into analog signals; an enlargement process execution switch 109 for the operator to input an execution command signal for the enlargement process of the image signals by the enlargement process circuit 107; a microcomputer 110 for controlling the entire video camera; an AE signal process circuit 111 for effecting predetermined signal processing for automatic exposure (AE) control; an AE control circuit 112 for effecting AE control based on the signal output from the AE signal process circuit 111; an iris driving circuit 113 for driving the iris mechanism 102; an iris motor 114 constituting the drive source for the iris mechanism 102; an AF signal processing circuit 115 for effecting predetermined process for AF (auto focusing) control; an AF control circuit 116 for effecting AF control based on the signal output from the AF signal processing circuit 115; a lens drive circuit 117 for driving the lens 101; a lens motor 118 constituting the drive source for the lens 101; and a control area setting circuit 119 for setting the control areas for AE and AF.

An exposure control mechanism (phototaking auxiliary means) is constituted by the iris mechanism 102, AE signal processing circuit 111, AE control circuit 112, iris drive circuit 113 and iris motor 114. Also an auto focus control mechanism (phototaking auxiliary means) is constituted by the lens 101, AF signal processing circuit 115, AF control circuit 116, lens drive circuit 117 and lens motor 118.

In the video camera of the above-explained configuration, the light from the object is focused on the image pickup device 103 through the lens 101 and the iris mechanism 102, and output as electrical signals, which are subjected to sampling and gain control in the CDS/AGC circuit 104 and converted into digital signals by the A/D converter 105. The digital signals are subjected to a predetermined process in the camera signal process circuit 106, and then supplied to the D/A converter 108 either directly or after an enlargement process in the enlargement process circuit 107. The analog signals obtained in the D/A converter 108 are output for example to an unrepresented video cassette recorder.

The enlargement process by the enlargement process circuit 107 is executed by the execution command signal for the enlargement process, input by the manipulation of the execution switch 109 by the operator and received by the microcomputer 110.

In the following there will be given an explanation on the enlargement process, such as the electronic zooming, to be executed by the enlargement process circuit 107 with the center at the position of execution based on the positional information input by the enlargement position input device 111. The positional information obtained in the enlargement position input device 111 is supplied to the microcomputer 110. On the other hand, if the enlargement process execution switch 109 is actuated by the operator for effecting the electronic zooming operation, the corresponding input signal is detected and supplied to the microcomputer 110, which identifies the center position and the enlargement ratio of the electronic zooming from these information and sends the necessary signals to the enlargement process circuit 107 thereby causing the circuit 107 to effect the electronic zooming operation.

Now there will be explained the functions of the AE control mechanism and the AF control mechanism, assisting the phototaking operation. For the AE control, the signals from the CDS/AGC circuit 103 are subjected to weighing and integration in the AE signal processing circuit 111 and supplied to the AE control circuit 112, which activates the iris drive circuit 113 to drive the iris mechanism 102 through the iris motor 114, thereby achieving exposure control. The AE control area, being fixed by the control area setting circuit 119, does not vary even after the enlargement process.

For the AF control, the AE signal processing circuit 115 determines the detecting area position for focusing in the control area setting circuit 119, and detects the variation in time of the high-frequency component signal of the object. The AF control circuit 116 activates the lens drive circuit 117 so as to maximize the amplitude of the signal, whereby the lens 101 is moved by the lens motor 118 to the optimum focus state. Also in this operation, the AF control area, eing fixed by the control area setting circuit 119, does not vary even after the enlargement process.

In the above-explained configuration, however, the position of enlargement of the image obtained from the image pickup device (position of execution of image enlargement) is predetermined and cannot be arbitrarily selected by the operator. Also in case the enlargement process, such as the electronic zooming or electronic close-up, is executed with the center at the predetermined position of execution, the centers of the AE and AF control areas become different from the center of the image signals, so that optimum AE and AF controls cannot be achieved for the object actually displayed in the image area of the EVF 113 and unnecessary controls may be conducted by the influence of the objects outside the enlarging area.

The present embodiment, attained in consideration of the foregoing situation, is to provide an image pickup apparatus enabling the operator to easily select the position of execution of the enlargement process, such as by the electronic zooming function or by the electronic close-up function, in the image area and also enabling, even in the enlarged image after the enlargement process by the electronic zooming or close-up function, optimum exposure or focusing control for the object desired by the operator, according to the positional information and the enlargement ratio input by the enlargement position input device.

The above-mentioned object can be attained, according to the present embodiment, by an image pickup apparatus comprising electronic image magnification enlarging means for electronically enlarging the image magnification, enlargement position input means for inputting the positional information indicating the position of enlargement process by the electronic image magnification enlarging means, phototaking assisting means for assisting the phototaking operation of the operator, and control area setting means for setting control areas for the phototaking assisting means, wherein, at the execution of the enlargement process by the electronic image magnification enlarging means, the control areas for the phototaking assisting means are optimized by the control area setting means, according to the positional information input by the enlargement position input means.

For attaining the above-mentioned object, the phototaking assisting means is preferably exposure control means, focus control means, white balance control means and/or antivibration control means.

Also for attaining the object, there are preferably provided an electronic view finder and viewpoint detecting means for detecting the position of the viewpoint of the operator on the image area of the electronic view finder at the phototaking operation, as the enlargement position input means.

Also for attaining the object, it is preferable to provide display means for displaying the positional information, from the viewpoint detecting means, on the image area of the electronic view finder and not to display the positional information by the display means in the course of execution of the enlargement process by the electronic image magnification enlarging means.

In the course of execution of the enlargement process by the electronic image magnification enlarging means, the control areas for the phototaking assisting means are optimized by the control area setting means, according to the positional information input by the enlargement position input means.

In the following the eighth embodiment of the present invention will be explained with reference to FIGS. 30, 31A and 31B.

Figure 30:
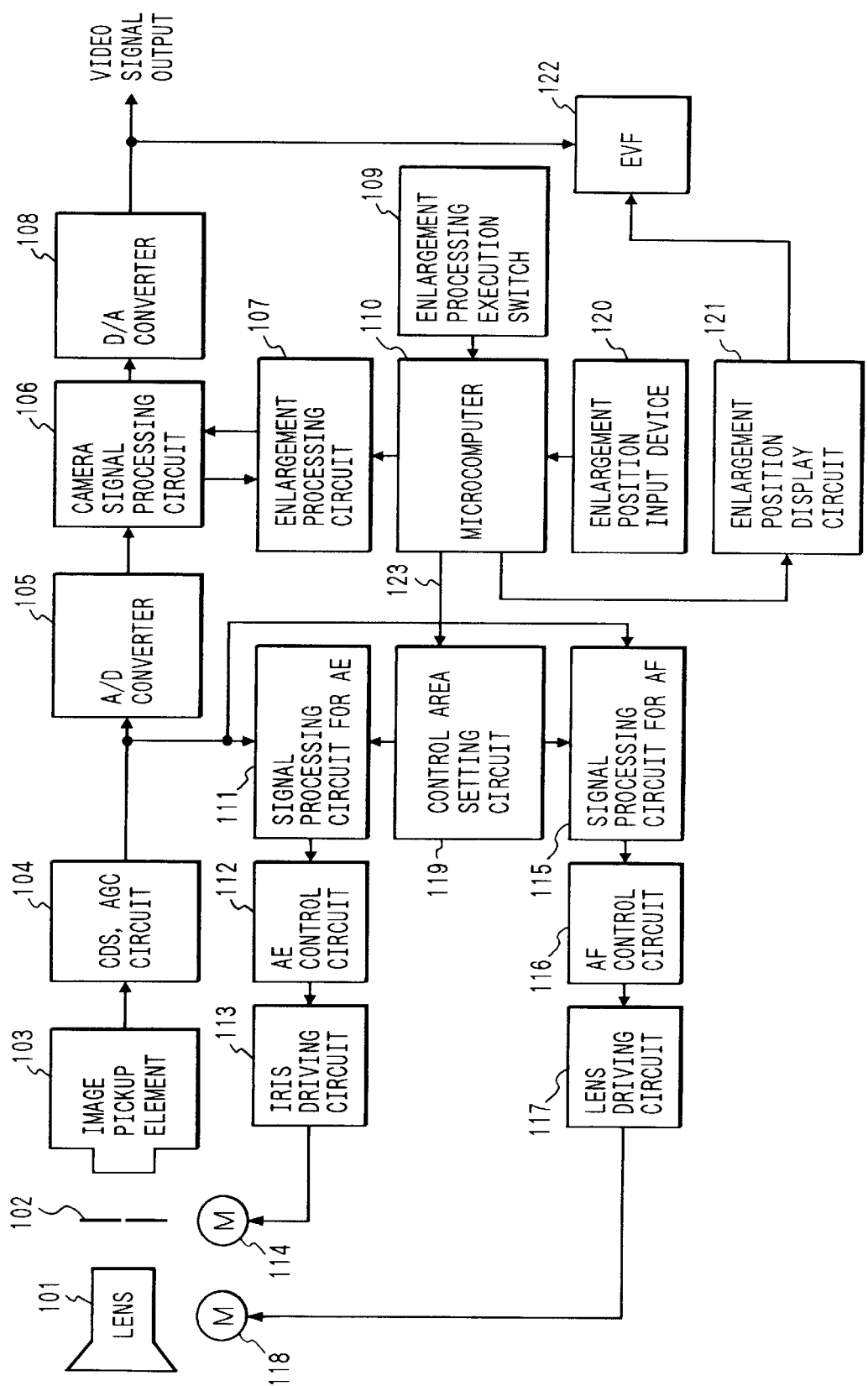
FIG. 30 is a block diagram of an image pickup apparatus constituting an eighth embodiment of the present invention.

FIG. 30 is a block diagram of an image pickup apparatus constituting the eighth embodiment of the present invention, whereby components same as those in FIG. 29 are represented by same numbers. The configuration shown in FIG. 30 is different from that in FIG. 29 in the addition of an enlargement position input device 120, an enlargement position display circuit 121 and an electronic view finder (EVF) 122 and in that the microcomputer 110 is connected to the control area setting circuit 119 through a signal line 123 whereby the control area setting circuit 119 can arbitrarily set the control areas of the exposure mechanism and the auto focusing mechanism, according to the information from the microcomputer 110.

The enlargement position input device 120 is provided for the operator to input the positional information indicating the position of execution of the enlargement process by the enlargement process circuit 105. The enlargement position display circuit 121 serves to display the positional information from the enlargement position input device 120 on the image area of the EVF 122. The EVF 122 constitutes the monitor means for enabling the operator to monitor the image signals from the D/A converter 107 and the anticipated enlargement position signal from the enlargement position display circuit 121.

Figure 31B:
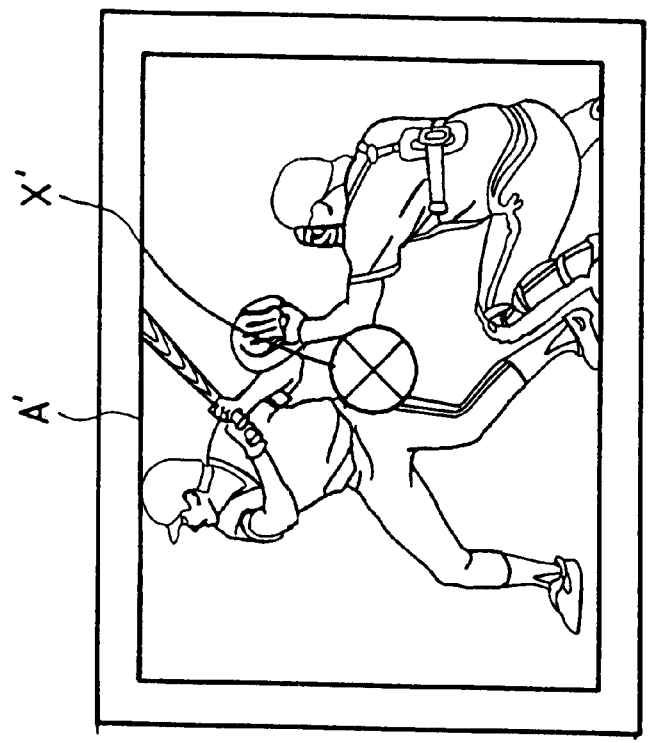
FIGS. 31A and 31B are views showing examples of display of an EVF image in the image pickup apparatus.
Figure 31A:
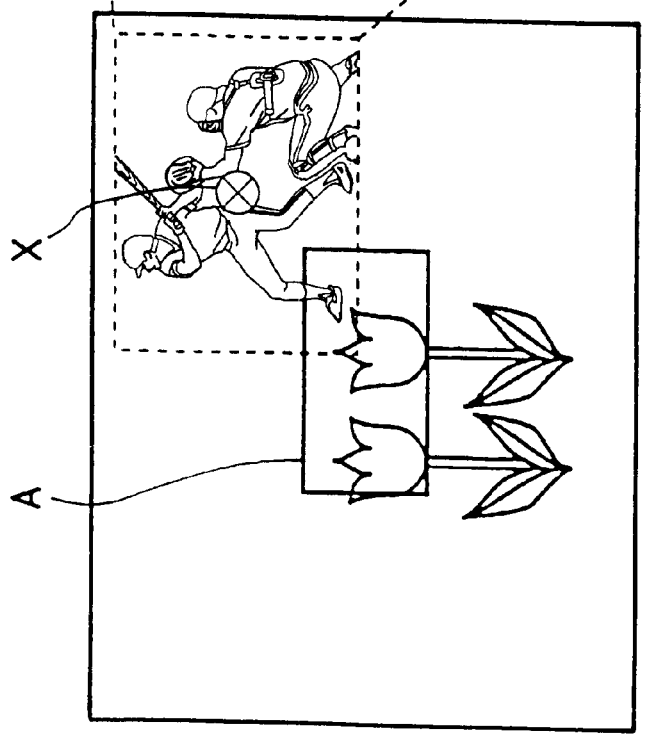

FIGS. 31A and 31B illustrate the relationship between the image observed on the image area of the EVF 122 of the present embodiment and the control area for example for AE or AF function.

In case of taking an image as shown in FIG. 31A under AE control with center-weighted light metering, the weighted frame A for light metering is at the center of the image area. In case the operator effects the electronic image magnification enlargement by the enlargement process circuit 107 with the center at a position X, the position X is input by the enlargement position input device 120. Then the enlargement ratio is set and the enlargement process execution switch 109 is actuated, whereupon the necessary information is transmitted to the enlargement process circuit 107 by the microcomputer 110 to execute the enlargement process.

On the other hand the information is also transmitted by the microcomputer 110 to the control area setting circuit 119, whereby the weighted frame A for light metering is so moved as to the position X at the center, and the display on the EVF 122 in the course of execution of the electronic image magnification enlarging process by the enlargement process circuit 107 assumes a state shown in FIG. 31B, wherein A' indicates the weighted frame for light metering after the movement, and X' indicates the center of enlargement after the movement.

Also the distance measuring frame for AF control moves similarly as the weighted frame A for light metering. Thus, even in the course of execution of the electronic image magnification enlarging process, the AE and AF control areas are positioned at the center of the enlarged area, so that optimum controls can be achieved for the actually aimed object.

The enlargement position input device 120 can be any device enabling the operator to designate a two-dimensional position, but can be advantageously composed, for example, of a track ball, a joy stick or a touch panel already known in the art.

In the following there will be explained, with reference to FIG. 32, a nineth embodiment of the present invention, which utilizes, as the enlargement position input device 120 in the eighth embodiment, a device for detecting the viewpoint of the operator in observing the EVF 122 and utilizing the signal of the detection as the enlargement position input information. In the present embodiment, a parallel light beam is projected onto the frontal part of the eye of the observer (operator), and the visual axis is determined utilizing the image position of the pupil and the corneal reflected image obtained from the reflected light from the cornea.

The viewpoint detecting device will not be explained further, as it is same, in configuration and function, as already explained in relation to FIGS. 11 to 14.

Figure 32:
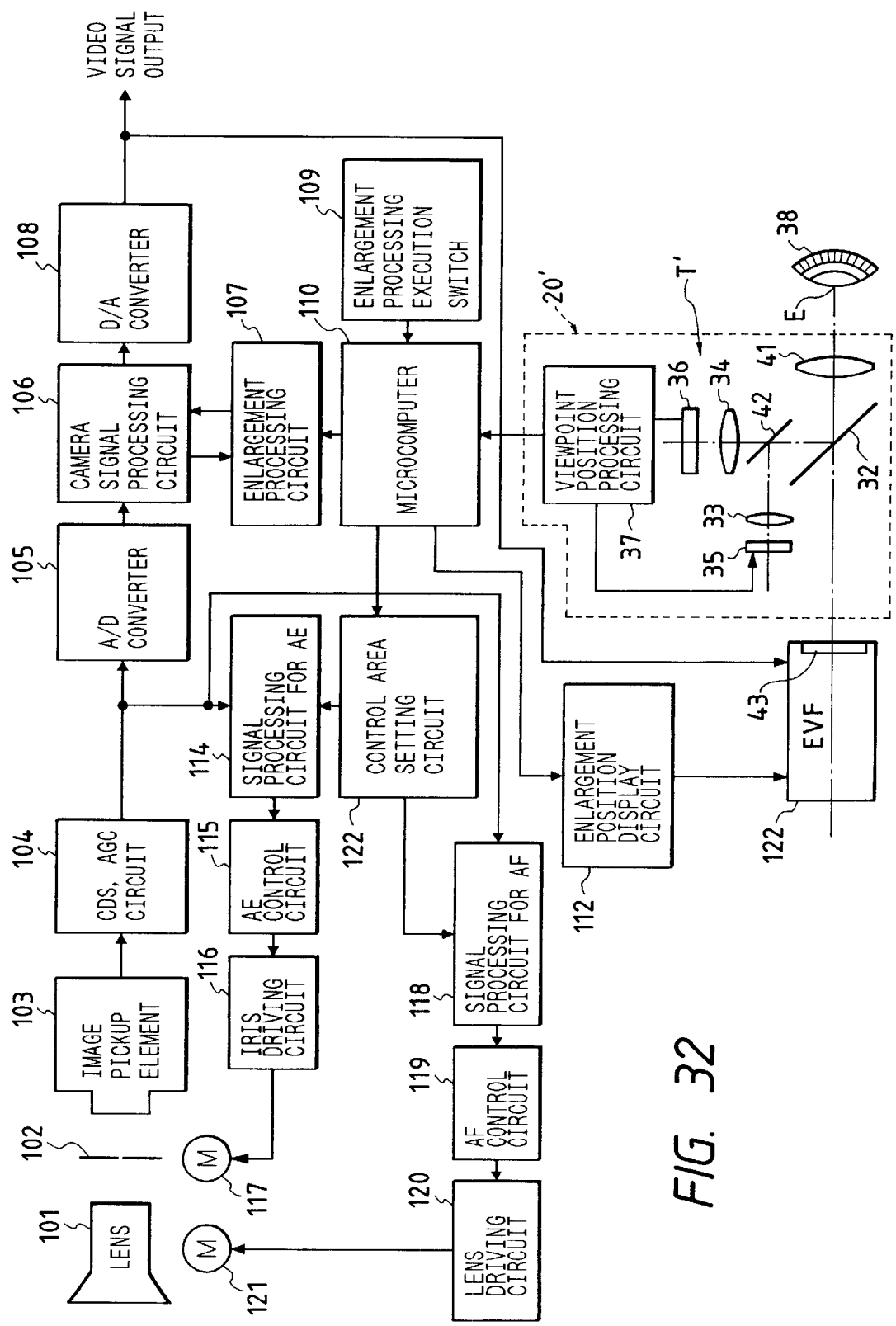
FIG. 32 is a block diagram of an image pickup apparatus constituting a nineth embodiment of the present invention.

FIG. 32 is a block diagram of an image pickup apparatus utilizing the above-mentioned viewpoint detecting device as the enlargement position input device, wherein components same as those in FIG. 30 are represented by same numbers. The configuration in FIG. 32 is different from that in FIG. 30, in the structure of the enlargement position input device. More specifically, the enlargement position input device 20' of the present embodiment consists of a viewpoint detecting device T', obtained by adding an eyepiece lens 41 and a second half mirror 42 for infrared light projection, to the optical system of the viewpoint detecting device T shown in FIG. 11. In FIG. 32, there is further shown the image area 43 of the EVF 22. Other parts of the enlargement position input device 20' of the present embodiment, being same as in the optical system of the viewpoint detecting device T in FIG. 11, are represented by corresponding numbers and will not be explained further.

Referring to FIG. 32, the infrared light emitted from the light source 35 is transmitted by the light projecting lens 33, then reflected by the second half mirror 42 and the first half mirror 32 and reaches the eyeball 38. The reflected light from the eyeball 38 is reflected by the first half mirror 32 and reaches the photosensor array 36 through the light receiving lens 34. On the other hand, the phototaken image displayed on the EVF image area 43 reaches the eyeball 38 through the first half mirror 32 and the eyepiece lens 41. Thus the viewpoint is detected while the operator confirms the image on the EVF image area 43. The viewpoint processing circuit 37 processes the output signal of the photosensor array 36 according to the viewpoint detecting method explained in the foregoing, and provides the microcomputer 10 with an input signal indicating the enlargement position desired by the operator. The microcomputer 10 effects control in a similar manner as in the foregoing first embodiment, thereby enlarging an image at a position desired by the operator. In FIG. 32, enlargement indicates the optical axis.

In the following there will be explained a function for assisting the phototaking operation when the electronic image magnification enlarging means featuring the present invention is in operation, for example a function to cause the AE or AF control mechanism to track the position of the viewpoint.

When a viewpoint tracking mode is adopted by an unrepresented tracking mode switch, the viewpoint detecting device T' detects the viewpoint, which is the point watched by the operator and which moves according to the movement of the eye thereof, and the positional information of the viewpoint is transmitted continuously to the microcomputer 110. According to the information from the microcomputer 110, the control area setting circuit 119 moves the AE and AF control areas. For example, when the AE control is conducted with the center-weighted light metering as shown in FIG. 31A, the weighting frame A freely moves within the EVF image area 43 following the movement of the eye of the operator, thereby achieving viewpoint-weighted light metering. If the enlargement process execution switch 109 for executing the electronic zooming is actuated at a certain position, for example the position X in FIG. 31A, of the viewpoint, the image signals are enlarged around the position X, whereby an image as shown in FIG. 31B can be observed on the EVF image area 43.

On the other hand, when the enlargement process execution switch 109 is actuated as explained above, the microcomputer 110 provides the control area setting circuit 119 with the optimum control area information according to the position of execution of image enlargement and the enlargement ratio in the electronic zooming, and, in the course of execution of electronic zooming, the control area is fixed in such state, such as the light metering frame A' in FIG. 31B. In this state the viewpoint detecting device T' continues detection of the viewpoint based on the coordinates prior to the execution of the electronic zooming. However, since the control areas are already fixed, the AE and AF controls are not affected by the information on the viewpoint outside the area of electronic zooming, and the object image within the electronic zooming area, which is most desired by the operator, can be controlled at the optimum state.

Also the positional information on the viewpoint, obtained in the viewpoint processing circuit 37 of the viewpoint detecting device T' and supplied to the microcomputer 110 is furnished to the enlargement position display circuit 121 and further to the EVF 122 as the viewpoint position signal for display on the EVF image area 143 together with the image signals, but the information is not displayed on the image area 143 during the execution of the electronic zooming operation, because the AE and AF control areas are fixed at the optimum points within the enlarged area as explained above.

As explained in the foregoing, the image pickup apparatus of the present embodiment enables the operator to easily select the position of execution of the enlargement process, for example by electronic zooming or electronic close-up, on the image area by the electronic image magnification enlarging means, and also allows to achieve exposure control or focusing control, following the enlargement position information input by the enlargement position input means, even for the image enlarged by the electronic image magnification enlarging means. Consequently optimum exposure control and focusing control can be achieved for the object aimed at by the operator, and there can be obtained an image matching the intention of the operator.

In the following there will be explained a tenth embodiment of the present invention, constituting an improvement on the first embodiment shown in FIG. 4 or the second embodiment shown in FIG. 8.

In the first embodiment shown in FIG. 4, the position of execution of the image enlargement is input by the enlargement position input device 20, while the enlargement ratio is input by the enlargement ratio setting device 21, and the image in the anticipated image frame is enlarged by the actuation of the enlargement process execution switch 8.

FIG. 16 shows an example of display on the image area of the EVF 23 in case the position of execution of enlargement is input by the enlargement position input device 20 and the enlargement ratio is input by the enlargement ratio setting device 21. In FIG. 16 there are shown the EVF image area 23a, original images 25, 24 and the frame 40 indicating the area to be enlarged.

The operator observes the frame indicating the image area to be enlarged, displayed in the EVF 23 by the signal from the enlargement position display circuit 22, then manipulates the enlargement position input device 20 and the enlargement ratio setting device 21, confirms that the enlarging frame is at a desired position, and actuates the enlargement process execution switch 8 to execute the enlargement process.

Figure 33:
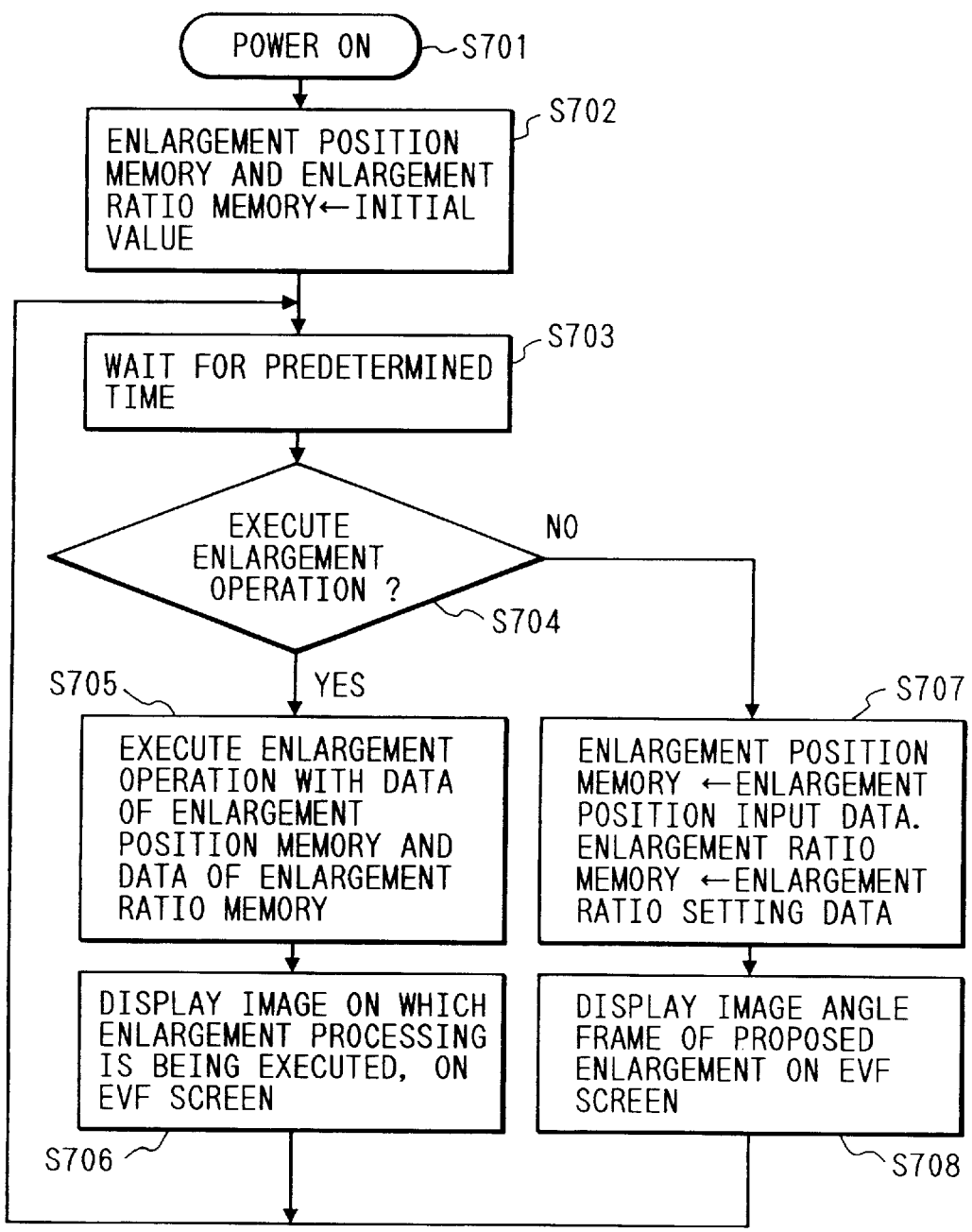
FIG. 33 is a flow chart showing the objective of a tenth embodiment of the present invention.

FIG. 33 is a flow chart showing the control sequence of the microcomputer 9 for executing the actual enlargement process, in response to the above-mentioned operations of the operator.

Referring to FIG. 33, at first a step S701 turns on the power supply to activate the microcomputer 9. Then a step S702 stores initial data of predetermined enlargement position in the enlargement position memory and the enlargement ratio memory of the microcomputer 9, and a step S703 waits for a predetermined time. After the lapse of a predetermined waiting time, a step S704 discriminates whether a signal for executing the enlargement process has been input from the enlargement process execution switch 8, and the sequence proceeds to a step S705 or S707 respectively if the signal has been input or not.

The step S705 provides the enlargement process circuit 5 with the enlargement position information and the enlargement ratio information, respectively stored in the enlargement position memory and the enlargement ratio memory in the foregoing step S702. A next step S706 displays the image in the course of execution of enlargement process, in continuous manner in time, on the EVF image area 23a, and the sequence then returns to the step S703. An example of display on the EVF image area 23a in this state is shown in FIGS. 17A to 17C, wherein FIG. 17A shows the initial state of enlargement, FIG. 17B shows the display of the original images 27, 28 in the course of enlargement, and FIG. 17C shows the end state of enlargement.

On the other hand, the step S707 prepares enlargement position data and enlargement ratio data, based on the signals input from the enlargement position input device 20 and the enlargement ratio setting device 21, and stores the data respectively in the enlargement position memory and the enlargement ratio memory. A next step S708 prepares an image frame signal indicating the image area to be enlarged (anticipated enlargement frame signal) based on the enlargement position data and the enlargement ratio data, stored respectively in the enlargement position memory and the enlargement ratio memory, and provides the enlargement position display circuit 21 with the signal for displaying the anticipated enlargement frame 40 on the EVF image area 23a as shown in FIG. 16, and the sequence then returns to the step S703.

Thus enlarged image signals can be obtained by the linear interpolation explained above.

In the above-explained example, however, the exposure control and the focusing control do not follow the change of the frame of image enlargement. Consequently the exposure level and the focus position may become inappropriate in the image after the enlargement process, so that the image may give unpleasant impression.

The present embodiment, attained in consideration of the above-mentioned drawback of the foregoing technology, is to provide an image pickup apparatus and an image pickup method capable of executing the electronic zooming function and the electronic close-up function and enabling the exposure control and focusing control to follow such functions in the course of execution thereof, thereby providing an appropriate output image.

The above-mentioned object can be attained, according to the present embodiment, by an image pickup apparatus provided with focusing means for adjusting the focus state of a lens; an image pickup deice for outputting image signals of an object image focused through thus focused lens; magnification varying information input means for inputting magnification varying information; image signal process means for varying the magnification of the output image signals, based on the input magnification varying information; and monitor means for displaying the image signals subjected to the variation of magnification, comprising focus control means for controlling the adjusted focus state in combination with the magnification varying process.

Also according to the present embodiment, there is provided an image pickup apparatus provided with an image pickup device for outputting the image signals of a focused object image; exposure regulating means for regulating the exposure amount of the object image; magnification varying information input means for inputting magnification varying information; image signal process means for effecting a variation of the magnification, based on the input magnification varying information; and monitor means for displaying the image signals subjected to the variation of magnification, comprising exposure control means for controlling the exposure amount in combination with the variation of magnification.

Also according to the present embodiment, the image signal process means comprises executing position selecting means for selecting the position of execution of the variation of magnification; interpolation coefficient determining means for determining the interpolation coefficient according to the selection; and interpolation means for interpolating the image signals, utilizing the determined interpolation coefficient.

Also according to the present embodiment, the executing position selecting means is viewpoint detecting means for detecting the position of the viewpoint of the operator.

Also according to the present embodiment, there is provided a method of adjusting the focus state of a lens; outputting the image signals an object image, formed through thus focused lens, from an image pickup device; inputting magnification varying information; effecting variation in magnification of the output image signals based on the magnification varying information; and displaying the image signals subjected to the variation in magnification, wherein the method comprises controlling the adjusted focus state in combination with the variation in magnification.

Also according to the present embodiment, there is provided a method of adjusting the focus state of a lens by focusing means; outputting image signals of an object image, formed through the focused lens, from an image pickup device; inputting magnification varying information by magnification varying information input means; effecting variation in magnification of the output image signals by image signal process means, based on the input magnification varying information; and displaying, by monitor means, the image signals subjected to the variation in magnification, wherein the method comprises controlling the adjusted focus state by focus control means in combination with the variation in magnification.

Also according to the present embodiment, there is provided a method of outputting image signals of a focused object image by an image pickup device; regulating the exposure amount of the object image by exposure regulating means; inputting magnification varying information by magnification varying information input means; effecting variation in magnification by image signal process means, based on the input magnification varying information; and displaying, by monitor means, the image signals subjected to the variation in magnification, wherein the method comprises controlling the exposure amount by exposure control means in combination with the variation in magnification.

Also according to the present embodiment, there is provided a method of selecting the position of execution of the variation in magnification by executing position selecting means provided in the image signal process means; determining an interpolation coefficient, by interpolation coefficient determining means, according to the selection; and interpolating the image signals with the determined interpolation coefficient, by interpolating means.

Also according to the present embodiment, the position of the viewpoint of the operator is detected, at the phototaking operation, by viewpoint detecting means, which serves as the execution position selecting means.

Now the tenth embodiment of the present invention will be explained in detail with reference to FIGS. 34 and 35.

Figure 34:
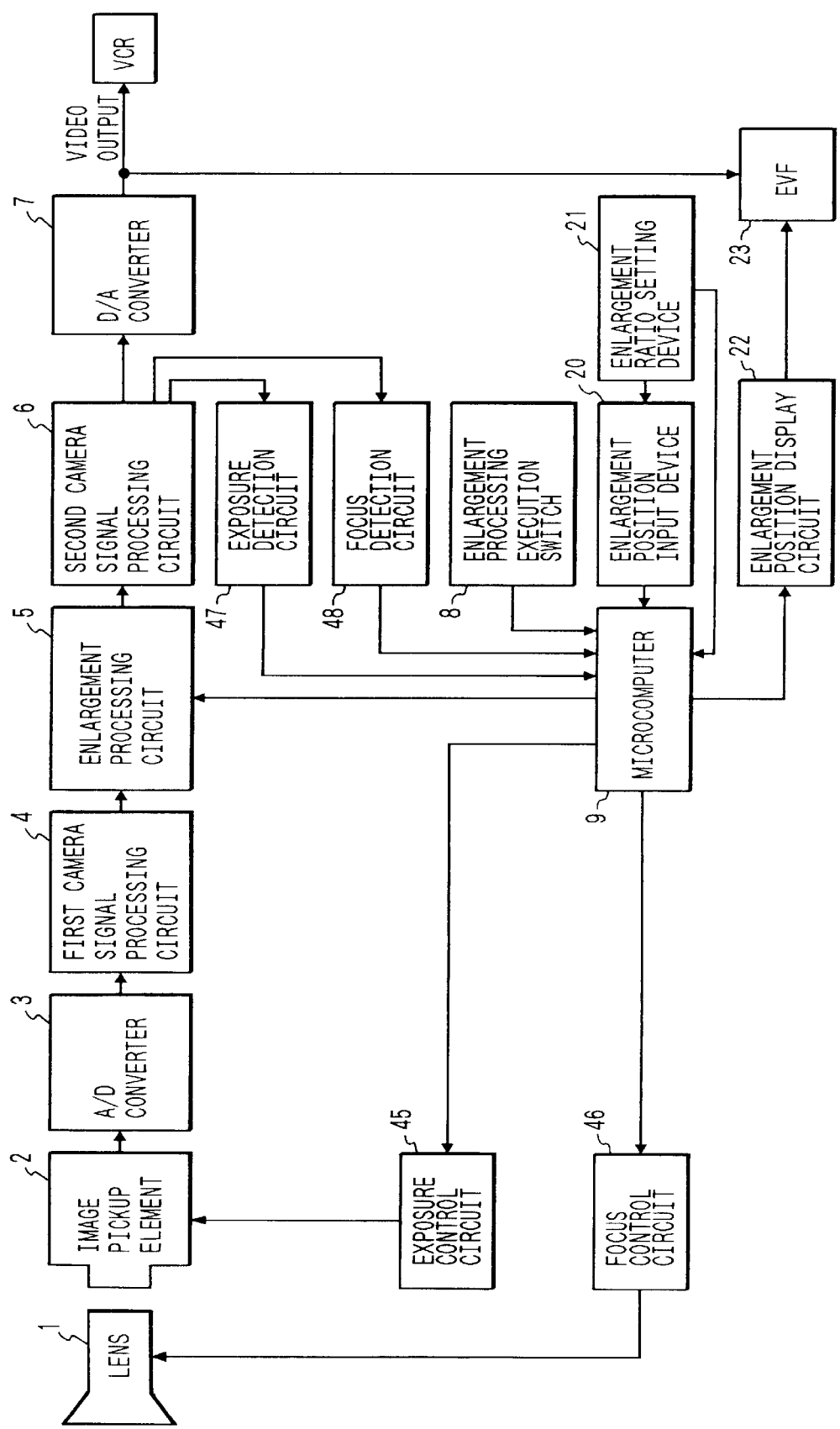
FIG. 34 is a block diagram of the tenth embodiment of the present invention.

FIG. 34 is a block diagram of an image pickup apparatus constituting the tenth embodiment of the present embodiment wherein components same as those in FIGS. 4 and 8 are represented by same numbers. The configuration in FIG. 34 is provided, in addition to the configurations shown in FIGS. 4 and 8, with an exposure control circuit 45 for exposure control; a focus control circuit 46 for focusing control; an exposure detection circuit 47 for detecting the exposure level after enlargement process; and a focus detection circuit 48 for detecting the focus state after enlargement process.

An object image input into the image pickup system through the lens 1 is converted into digital signals by the A/D converter 3, then transmitted by the first camera signal process circuit 4 and enlarged by the enlargement process circuit 5. The image signals after enlargement are transmitted by the second camera signal process circuit 6 and, in one part, converted by the D/A converter into analog signals for output as the output image signals and to the EVF 23, and, in the other part, subjected to the detection of exposure level and focus state after the enlargement respectively by the exposure detection circuit 47 and the focus detection circuit 48, wherein the results of detections are supplied to the microcomputer 9.

According to the exposure level and the focus state of the image signals after enlargement, the microcomputer 9 controls the exposure level and the focus state respectively by the exposure control circuit 45 and the focus control circuit 46. Also based on the information from the enlargement position input device 20 and the enlargement ratio setting device 21 set by the operator, the microcomputer 9 determines the enlargement frame in the input image and effects enlargement process by the enlargement process circuit 5.

Figure 35:
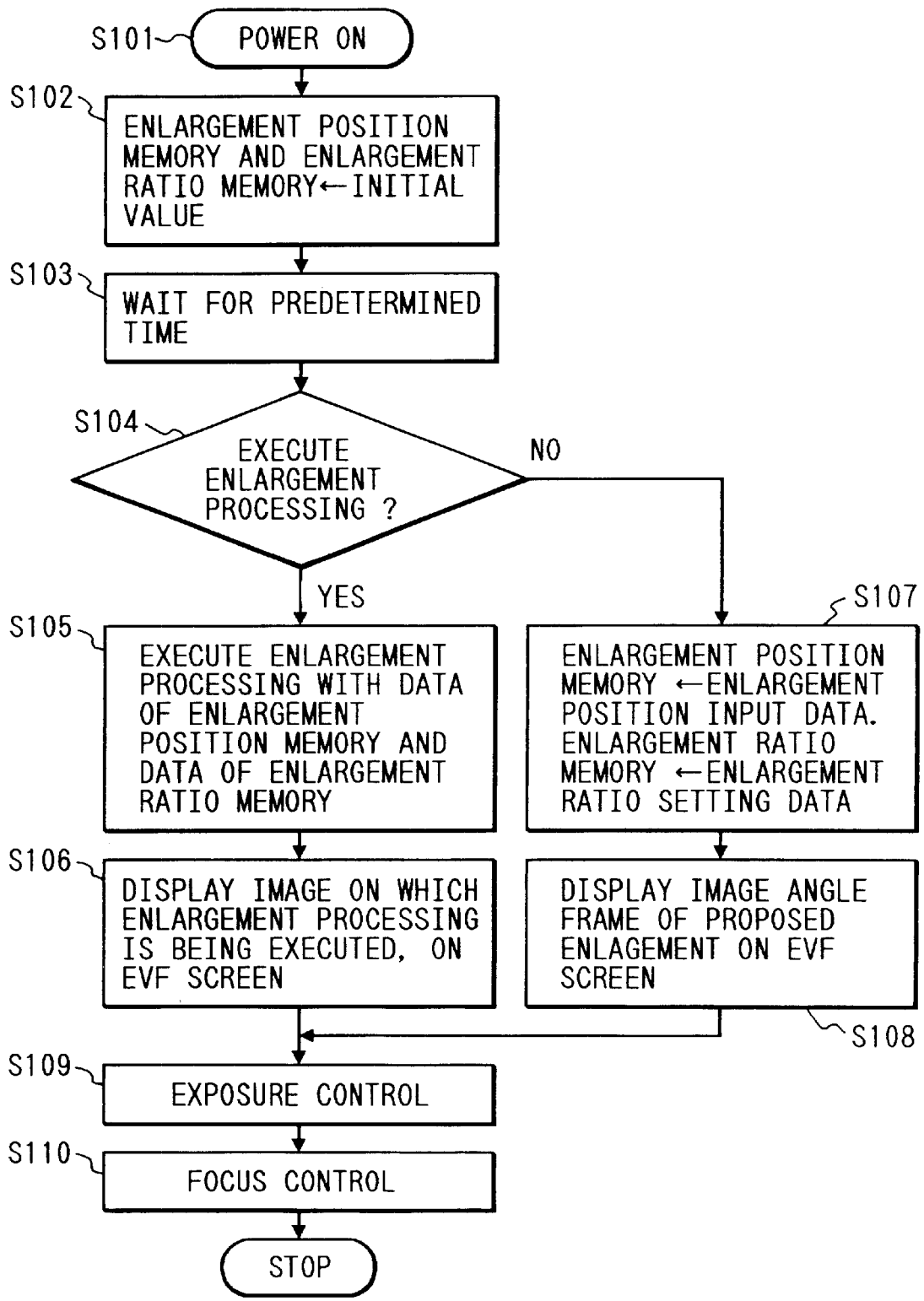
FIG. 35 is a flow chart showing the function of the tenth embodiment of the present invention.

FIG. 35 is a flow chart showing the control sequence of the microcomputer in the image pickup apparatus of the tenth embodiment. A step S801 turns on the power supply to activate the microcomputer 9. Then a step S802 stores initial data of a predetermined enlargement position in the enlargement position memory and the enlargement ratio memory of the microcomputer 9, and a step S803 waits for a predetermined time. After the lapse of a predetermined waiting time, a step S804 discriminates whether a signal for executing the enlargement process has been input from the enlargement process execution switch 8, and the sequence proceeds to a step S805 or S807, respectively if the signal has been input or not.

The step S805 provides the enlargement process circuit 5 with the enlargement position information and the enlargement ratio information, stored respectively in the enlargement position memory and the enlargement ratio memory in the foregoing step S802. A next step S806 displays the image in the course of execution of the enlargement process, in continuous manner in time, on the EVF image area 23a. A step S809 provides the exposure control circuit 45 with exposure control data, based on the level detected by the exposure detection circuit 47. A step S810 provides the focus control circuit 46 with focus control data, based on the focus state detected by the focus detection circuit 48.

On the other hand, the step S807 prepares enlargement position data and enlargement ratio data, based on the signals input from the enlargement position input device 20 and the enlargement ratio setting device 21, and stores the data in the enlargement position memory and the enlargement ratio memory. A step S808 prepares an anticipated enlargement frame, based on the data in the enlargement position memory and the enlargement ratio memory, and sends the frame signal to the enlargement position display circuit 22 for display of the anticipated enlargement frame on the EVF 23 (cf. FIG. 16).

In the image pickup apparatus of the present embodiment, as explained in the foregoing, the exposure control and the focusing control can follow the image enlargement frame, so that an appropriate image can be obtained even in the course of the image enlargement operation.

In the following there will be explained, with reference to FIG. 36, an eleventh embodiment of the present invention, which utilizes, as the enlargement position input device 21 in the foregoing first embodiment, detection of the viewpoint of the operator in observing the EVF 23 at the phototaking operation, and the signal obtained by the detection as the enlargement position input information. In the present embodiment, a parallel light beam is projected onto the frontal part of the eye of the operator, and the visual axis of the eye is determined from the focus position of the pupil and the corneal reflected image, obtained from the reflected light from the cornea. Such viewpoint detecting method is same as already explained in the foregoing with reference to FIGS. 11 to 14, andwill not, therefore, be explained further.

Figure 36:
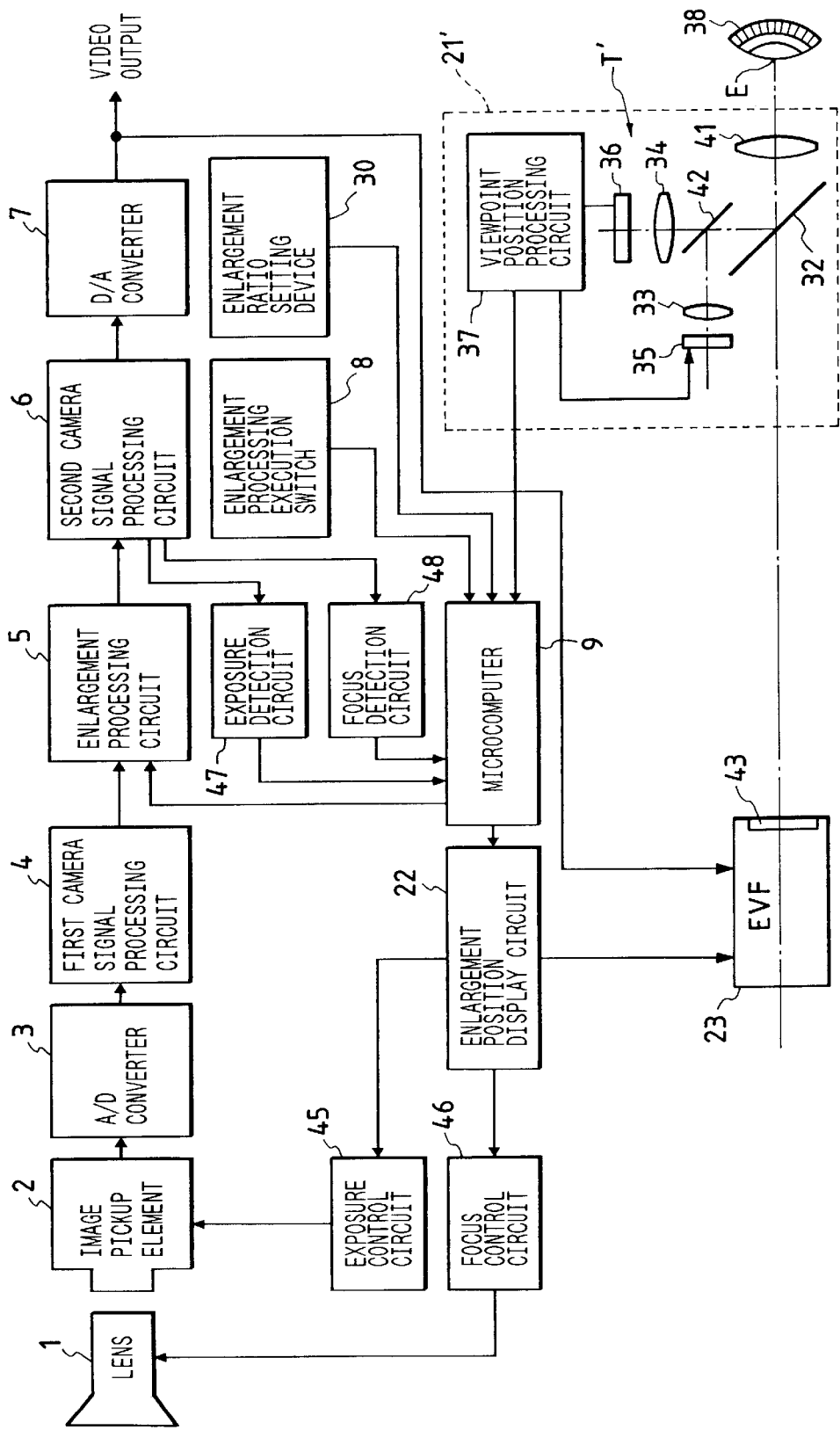
FIG. 36 is a block diagram of an eleventh embodiment of the present invention.

FIG. 36 is a block diagram of an image pickup apparatus employing the aforementioned viewpoint detecting device T as the enlargement position input device, wherein components same as those in the foregoing tenth embodiment shown in FIG. 34 are represented by same numbers. The configuration in FIG. 36 is different, from that in FIG. 34, in the structure of the enlargement position input device. The enlargement position input device 21' of the present embodiment consists of a viewpoint detecting device T' which is formed by adding an eyepiece lens 41 and an infrared light projecting second half mirror 42 to the optical system of the viewpoint detecting device T shown in FIG. 11. In FIG. 36 there is also shown an EVF image area 43. Other parts of the enlargement position input device 21' of the present embodiment, being same as those in the optical system of the viewpoint detecting device T shown in FIG. 11, are represented by corresponding numbers and will not be explained further.

Referring to FIG. 36, the infrared light emitted from the light source 35 is transmitted by the light projecting lens 33, then reflected by the second half mirror 42 and the first half mirror 32, and reaches the eyeball 38. The reflected light from the eyeball 38 is reflected by the first half mirror 32 and reaches the photosensor array 36 through the light receiving lens 34. On the other hand, the phototaken image displayed on the EVF image area 43 reaches the eyeball 38 through the first half mirror 32 and the eyepiece lens 41. Thus the viewpoint position is detected while the operator confirms the image on the EVF image area 43. The viewpoint process circuit 37 processes the output signal from the photosensor array 36 according to the viewpoint detecting method mentioned above, and provides the microcomputer 9 with an input signal indicating the enlargement position desired by the operator. The microcomputer 9 effects control in a similar manner as in the foregoing first embodiment, thereby enabling enlargement of the image at a position desired by the operator on the image area. In FIG. 36, E indicates the optical axis.

According to the present embodiment, as explained in the foregoing, in a method of adjusting the focus state of a lens by focusing means; outputting, by an image pickup device, image signals of an object image formed through the focused lens; inputting magnification varying information by magnification varying information input means; effecting a variation in magnification of the output image signals by image signal process means, based on the input magnification varying information; and displaying, by monitor means, the image signals subjected to the variation in magnification, the adjusted focus state is controlled by focus control means in combination with the variation in magnification, so that the focus state can be controlled even in the course of execution of variation in magnification and an appropriate image can thus be obtained.

Also according to the present embodiment, in a method of outputting, by an image pickup device, image signals of an object image; regulating the exposure amount of the object image by exposure amount regulating means; inputting magnification varying information by magnification varying information input means; effecting a variation in magnification by image signal process means, based on the input magnification varying information; and displaying, by monitor means, the image signals subjected to the variation in magnification, the exposure amount is controlled by exposure amount control means in combination with the variation in magnification, so that the exposure can be controlled even in the course of execution of the variation in magnification and an appropriate image can thus be obtained.

Also according to the present embodiment, the position of execution of the variation in magnification is selected by executing position selecting means provided in the image signal process means, then an interpolation coefficient is determined by interpolation coefficient determining means according to the selection, and the image signals are interpolated by interpolating means, utilizing thus determined interpolation coefficient, so that the variation in magnification can be executed in simple manner by the selection of position of execution of the variation in magnification.

Also according to the present embodiment, the position of the viewpoint of the operator is detected at the phototaking operation by the viewpoint detecting means serving as the executing position selecting means, so that the operator can set the position of execution of the magnification varying process while watching the display image area, without any other cumbersome operation. Thus the freedom of phototaking is improved and extremely satisfactory operability can be attained.

Also according to the present embodiment, in a method of adjusting the focus state of a lens; outputting, from an image pickup device, image signals of an object image formed through the focused lens; inputting magnification varying information; effecting a variation in magnification of the image signals based on the input magnification varying information; and displaying the image signals subjected to the variation in magnification, the adjusted focus state is controlled in combination with the variation in magnification, so that the focus state can be controlled even in the course of execution of the variation in magnification and an appropriate image can be obtained.

In the following there will be explained a twelfth embodiment of the present invention.

In the field of image pickup apparatus for consumer use, such as the video camcorder, there have been employed various functions for obtaining the image of higher quality in simpler manner. The auto focusing and the auto exposure control, which have become standard functions in such equipment, are designed to exclude the cumbersome adjustment of exposure or focus at each phototaking operation, and are appropriate examples of functions for obtaining good images in simpler manner.

However, such auto focusing (AF) or auto exposure control (AE) is a function in which the image pickup apparatus "independently" identifies the situation of phototaking and adjusts the lens position or the iris state to a state that is assumed to match such situation, so that there may result a case where the intention of the operator is not reflected on the obtained image. For example if an object at a longer distance and an object at a shorter distance are both present within the phototaking image area, the AF operation based on the information on the entire phototaking image area may achieve focusing to one of such plural objects, but the image pickup apparatus cannot identify whether such object is the main object which the operator wishes to focus on.

Also in case of phototaking a main object in front of a lighter background such as sky, the AE operation based on the information of the entire image area results in an underexposure of the main object, because the iris is regulated according to the luminance of the sky.

In order to avoid such situation as far as possible, there is ordinarily employed a method of effecting distance and light measurements principally on an object at the input of the phototaking image area and conducting the AF and AE operations based on thus obtained results. Such method is based on a fact that the main object is most commonly placed at the center of the image area in the phototaking operation. This method, however, has a drawback of inability to suitably adjust the exposure and the focus state for the main object, in case it is not positioned at the center of the image area. For avoiding the failure resulting from such drawback, the areas for distance and light measurements were often displayed in the image area of the view finder, but such display has recently become unpopular because the image area of the view finder becomes complicated and the image to be taken becomes difficult to observe.

On the other hand, the present applicant has proposed, in the Japanese Patent Application No. 4-154165, an image pickup apparatus which enables the operator to select the main object by the visual axis (line of sight) thereof watching the view finder, in order that optimum exposure and focusing can be attained for the main object regardless of its position within the image area.

Such visual axis detecting method has already been explained with reference to FIGS. 11 to 14, and will not, therefore, be explained further.

Such image pickup apparatus with visual axis detection can arbitrarily change the position of the main object, while limiting the areas for distance and light measurements. The position designating means, for selecting the main object, is not limited to the visual axis detecting means but can also be means capable of determining the direction and position of movement by synthesizing moving amounts on two axes, such as a mouse or a joy stick.

In such case, the image pickup apparatus detects the position of the visual axis of the operator and moves the distance/light measuring areas corresponding to the detected position. It will be more accurate and more convenient for the operator if the image pickup apparatus informs the operator of the result of detection of the visual axis and the accordingly moved distance/light measuring areas, in order to enable confirmation by the operator. Therefore the present applicant has proposed, in the Japanese Patent Application No. 3-218574, a video camera having means for superimposing the result of detection of the visual axis on the view finder image area.

On the other hand, in the optical system of the image pickup apparatus such as video camera, there is commonly employed the zoom lens capable of varying the magnification of the projected object image, and the zoom ratio, or the amount of variation, of such zoom lens tends to become larger year after year. However, since a zoom lens with a larger zoom ratio is heavier and more expensive, there is recently conceived so-called electronic zoom system which electronically enlarges a part of the phototaken image. Such system is detailedly described, for example, in the U.S. Pat. No. 4,774,581 assigned to S. Shiratsuchi.

In such electronic zoom system, however, since the size of the object image actually projected on the image pickup device remains constant, the amount of information obtained from the device does not vary, so that the resolving power becomes deteriorated with the increase of the image size.

For this reason, most of the current video cameras employ a system of effecting the image enlargement by an optical zoom lens to a certain zoom ratio and by electronic zooming beyond the zoom ratio.

Figure 37:
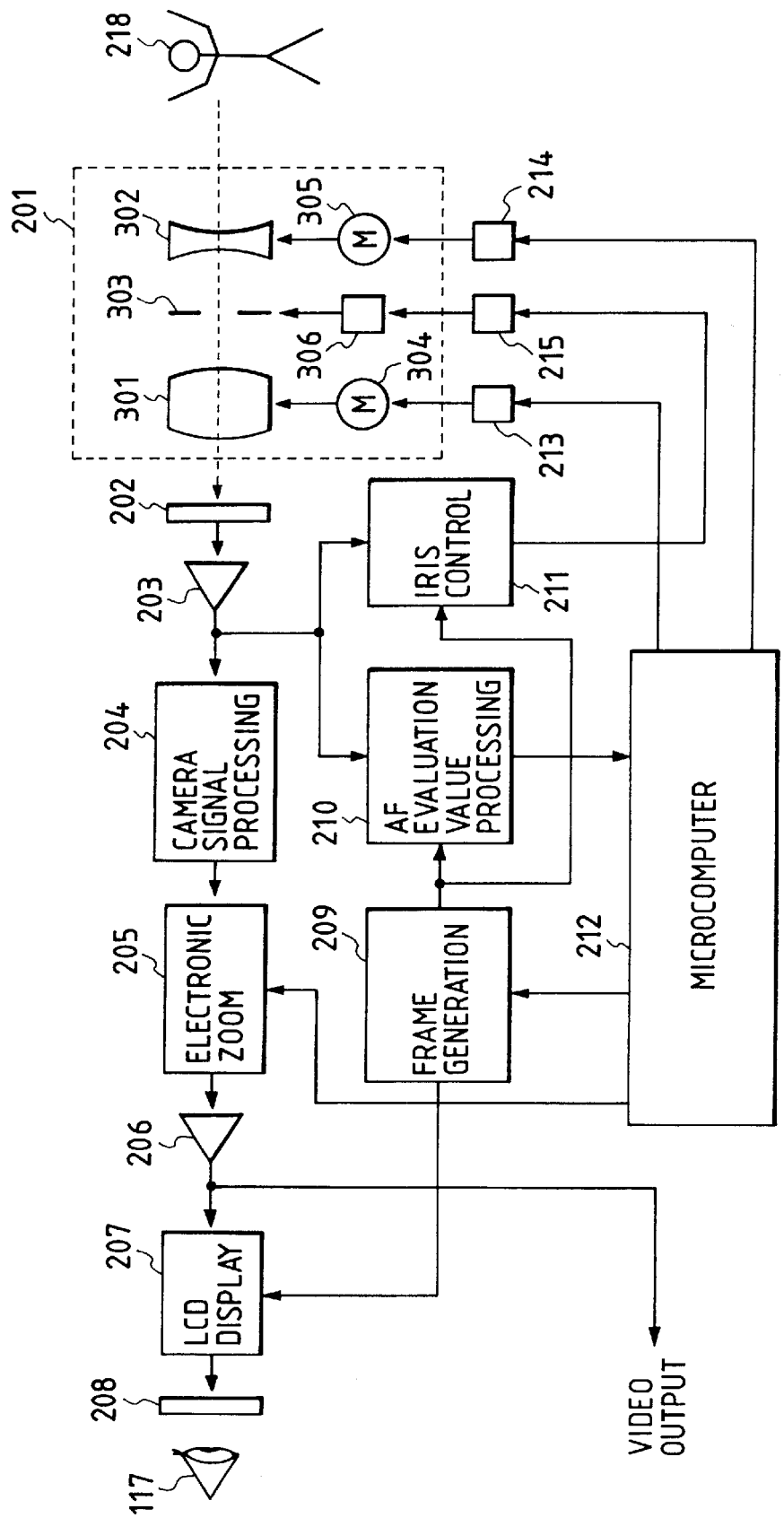
FIG. 37 is a block diagram showing a prior art, for explaining a twelfth embodiment of the present invention.

FIG. 37 shows an example of the video camera of such configuration, which will be explained in the following.

In FIG. 37 there are shown a lens unit 201; an image pickup device 202; a pre-amplifier 203; a camera signal process circuit 204; an electronic zooming circuit 205; an amplifier 206; a liquid crystal display circuit 207; an LCD device 208 in the view finder; a frame generation circuit 209; an AF evaluation value process circuit 210; an iris control circuit 211; a calculation control unit (microcomputer) 212; motor drivers 213, 214; an IG meter driver 215; an eye 217 of the operator looking into the view finder; and an object 218.

In the lens unit 201 there are provided a focusing lens group (hereinafter called focusing lens) 301; a zooming lens group (hereinafter called zooming lens) 302; an iris 303; lens driving motors 304, 305; and an iris driving IG motor 306.

The function of this video camera will be explained in the following.

The image of the object 218, projected by the lens unit 201, is converted by the image pickup device 202 into electric signals, which are amplified to an appropriate level by the pre-amplifier 203. The signals are converted by the camera signal process circuit 204 into formatted image signals, which are then amplified to an appropriate level by the amplifier 206 and output as the image signals and also displayed by the liquid crystal display circuit 207 on the LCD device 208 of the view finder.

On the other hand, the output signal of the pre-amplifier is converted, by the AF evaluation value process circuit 210, into a signal indicating the focus level of the image projected on the light-receiving face of the image pickup device 202 (the signal being hereinafter called focus value), and the signal is supplied to the microcomputer 212. The output signal of the pre-amplifier 203 is also supplied to the iris control circuit 211 for driving the IG meter 306 through the IG meter driver 215, whereby the iris 303 is so controlled that the output level of the pre-amplifier 203 assumes a predetermined value.

The AF evaluation value process circuit 210 and iris control circuit 211 receive, from the frame generation circuit 209, a gate signal for limiting the distance/light measuring areas on the phototaken image area, and effect respective processes in such areas. The frame generation circuit 209 also sends the frame information to the liquid crystal display circuit 207, which displays the frame on the LCD device 208, in superimposed manner with the image signals. The frame generation circuit 209 generates the frame information and the gate signal, based on the position and size of the frame determined by the microcomputer 212.

The microcomputer 212 drives the motor 304 through the motor driver 213, thereby adjusting the position of the focusing lens 301, so as to maximize the focus value of the AF evaluation value process circuit 210. It also drives the motor 305 through the motor driver 214, according to the information for example from an external zoom switch, thereby regulating the position of the zooming lens 302. If, after the zooming position reaches the maximum focal length obtainable by the optical system of the lens unit 201 (hereinafter called telephoto end), an instruction toward the longer focal length (hereinafter called telephoto side) continues to be given for example by the zoom switch, the microcomputer 212 sends an enlargement command to the electronic zoom circuit 205, which in response enlarges the image electronically and sends the enlarged image to the amplifier 206.

In case the aforementioned selecting means for the main object by the visual axis of the operator is employed in the configuration shown in FIG. 37, however, if the image is enlarged by electronic zooming, the frame generation for setting the distance/light measuring areas is conducted according to the visual axis of the operator looking at the enlarged image, while the AF evaluation value processing for distance measurement and the iris control for light metering are based on the image signals prior to enlargement by electronic zooming.

For this reason the image area where the AF evaluation value processing and the iris control are conducted becomes different, in size and position, from the area actually selected by the visual axis of the operator. As a result, the AF and/or AE operation is executed on an object different from the object on which the operator wishes to effect the AF and/or AE operation.

The present embodiment, intended to avoid such drawback, is to provide an image pickup apparatus providing, in detecting the visual axis of the operator on the view finder image area and determining the position and size of a frame for extracting the image signals for AE/AF operations according to the result of the detection, a frame for the actual AE/AF operations substantially equivalent to the frame on the image enlarged by electronic zooming in the view finder.

The above-mentioned object can be attained, according to the present embodiment, by an image pickup apparatus effecting the focus adjustment of an optical system or the adjustment of the incident light amount therethrough based on image signals in a limited area in the image signals, the apparatus comprising electronic zooming means; detection means for detecting the visual axis of the operator; and control means for calculating the display position of the limited area on the view finder image area and the position on the image signals for the adjustments, based on the result of detection of the visual axis, wherein the calculation is so conducted that the positions become mutually different according to the enlargement ratio of the electronic zooming means.

Also according to the present embodiment, there is provided an image pickup apparatus effecting the focus adjustment of an optical system or the adjustment of the incident light amount therethrough based on image signals in a limited area in the image signals, the apparatus comprising electronic zooming means; detection means for detecting the visual axis of the operator; and control means for calculating the display position and size of the limited area on the view finder image area and the position and size on the image signals for the adjustments, based on the result of detection of the visual axis, wherein the calculation is so conducted that the positions and sizes become mutually different according to the enlargement ratio of the electronic zooming means.

Also according to the present embodiment, there is provided an image processing apparatus adapted to output an input image as image signals, also to display the input image on an image area, also to limit a defined area in the image signals and to extract the image signals in the defined area, comprising electronic zooming means for electrically enlarging a part of the image signals for output and for display on the image area; display means for displaying the defined area on the image area in superposition with the image signals; setting means for setting the position of the defined area in the image area; and control means for determining the display position of the defined area by the display means and determining the position of the defined area on the image signals, based on the result of the setting means, wherein the position information indicating the display position of the defined area on the image area and the position information indicating the position of the defined area are made mutually different by a predetermined calculation based on the enlargement ratio of the electronic zooming means.

Also according to the present embodiment, the setting means includes visual axis detecting means for detecting the viewpoint of the operator on the image area, wherein the defined area is set at the viewpoint detected by the visual axis detecting means.

Also according to the present embodiment, the control means is adapted to calculate the size as well as the position of display of the defined area.

According to the present embodiment, the position information of the frame to be superimposed on the view finder image area and the position information of the frame defining the area for the AF evaluation value processing and the iris control are made mutually different according to the enlargement ratio of the electronic zooming. Consequently even in case the image area is enlarged by the electronic zooming, an area equivalent to that selected by the visual axis of the operator is selected for the AF evaluation value processing and for the iris control, so that the AF and AE operations can be achieved for the object intended by the operator. Also the frame displayed in the view finder is converted into the frame for the AF and AE operations with respect to the frame position but the frame size remains unchanged, so that there can be prevented the inconvenience in the AF/AE operations encountered in case the frame is excessively small.

Also according to the present embodiment, the information indicating the position and size of the frame to be superimposed on the view finder image area and the information indicating the position and size of the frame defining the area for the AF evaluation value processing and the iris control are made mutually different according to the enlargement ratio of the electronic zooming. Consequently, even in case the image area is enlarged by the electronic zooming, an area equivalent to that selected by the visual axis of the operator is selected for the AF evaluation value processing and for the iris control, so that the AF and AE operations can be achieved for the object intended by the operator.

Figure 38:
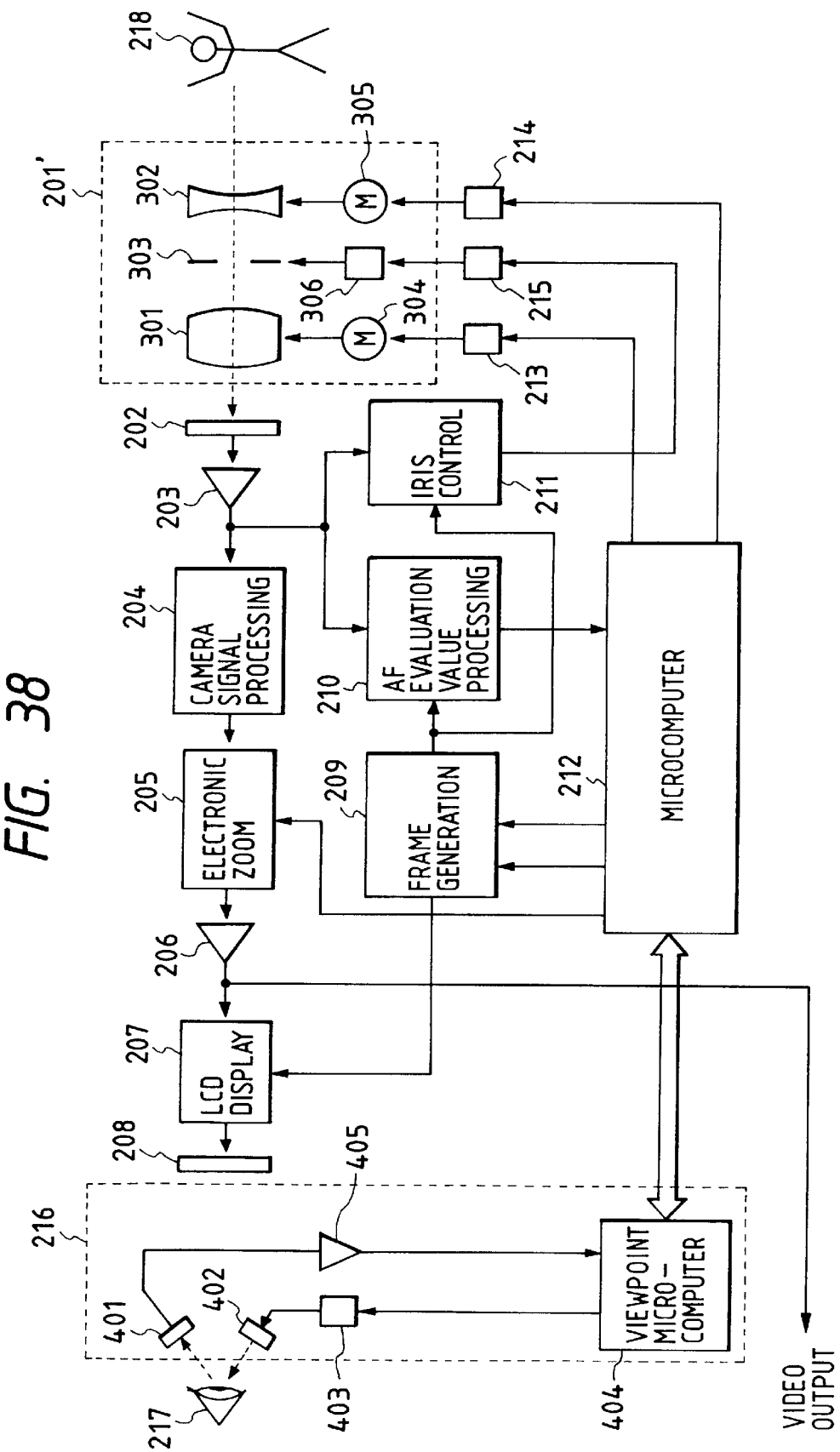
FIG. 38 is a block diagram of the twelfth embodiment of the present invention.

Now the twelfth embodiment will be explained with reference to FIGS. 38, 39A, 39B, 40A and 40B. FIG. 38 is a block diagram of a video camera wherein components 201 to 215 and 301 to 306 are same as those shown in FIG. 37, while 216 is a visual axis detecting unit.

In the visual axis detecting unit 216, there are provided an infrared sensor 401; an infrared light-emitting diode (LED)

402; an LED driver 403; a visual axis detecting unit (visual axis microcomputer) 404; and an amplifier 405.

The above-explained configuration functions in the following manner.

The process from the conversion of the projected image of the object 218 into the image signals to the display thereon on the LCD device 8 of the view finder, and that of detection of the visual axis of the operator are same as explained before, and will not, therefore, be explained further.

The calculation required in the visual axis detection is conducted in the visual axis microcomputer 404.

The frame information sent from the frame generation circuit 209 to the liquid crystal display circuit 207 is assumed to have a central coordinate $X_E$, $Y_E$ in the frame with respect to the image area, and that to the AF evaluation value process circuit 210 and the iris control circuit 211 has a central coordinate X, Y in the frame with respect to the image area.

Figure 39A:
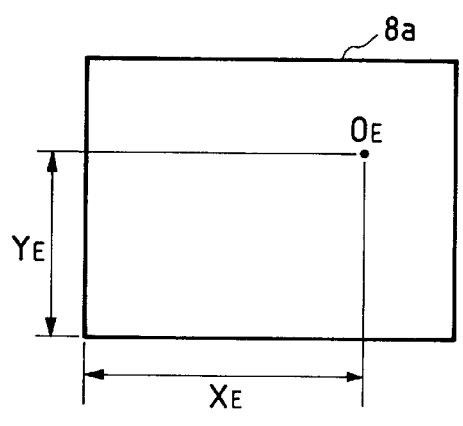
Figure 39B:
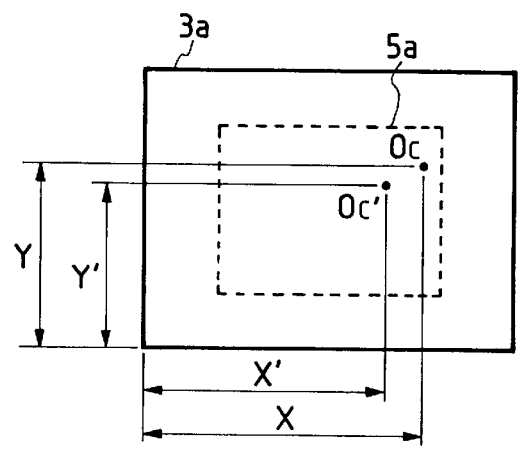

FIGS. 39A and 39B illustrate thus defined frame positions. More specifically, FIG. 39A shows the central coordinate $O_E$ of the frame on the liquid crystal display image area 208a of the view finder, and FIG. 39B shows the central coordinate oc of the frame on the output image area 203a of the pre-amplifier 203.

While the zooming lens 302 of the lens unit 201, driven by the microcomputer 212 under the instruction of the external zoom switch, does not reach the telephoto end, the size of the display image area 208a shown in FIG. 39A is same as that of the output image area 203a of the pre-amplifier 203.

In such state, therefore, the microcomputer 212 outputs the data in such a manner that the frame position information to the liquid crystal display circuit 7 and that to the AF evaluation value process circuit 210 and the iris control circuit 211 have a same frame position. Based on the data, the frame generation circuit 209 generates the frame information.

Consequently, in FIGS. 39A and 39B, there stand:

$$X_E=X;\ Y_E=Y \quad (4)$$

When the optical system of the lens unit 201 reaches the telephoto end and an instruction toward the telephoto side is further given from the external zoom switch to the microcomputer 212, the electronic zooming circuit 5 is driven by the microcomputer 212 to electrically enlarge the image. An image area 205a in FIG. 39B shows an example of the image area enlarged by the electronic zooming circuit 205. The image area 205a is enlarged to occupy the entire display image area 208a and the entire image signals.

It is assumed that the visual axis detected by the visual axis detecting unit 216 is positioned at $O_E$ in FIG. 39A. The microcomputer 212 receives these data from the visual axis microcomputer 404, and provides the frame generation circuit 209 with the frame position information for the liquid crystal display circuit 207 so as to form the frame around the point $O_E$. On the other hand, the frame position information for the AF evaluation value process circuit 210 and the iris control circuit 211 is sent to the frame generation circuit 209, based on the following calculations:

$$X=X_C/2+[(X_E-X_C/2)/E]$$
$$Y=Y_C/2+[(Y_E-Y_C/2)/E] \quad (5)$$

wherein $X_C$ and $Y_C$ are horizontal and vertical lengths of the entire image area output from the pre-amplifier 203, and E is the enlargement ratio of the electronic zooming.

Based on these data, the frame generation circuit 209 sends the information of the frame center position $O_E$ in FIG. 39A and O' in FIG. 39B, respectively to the liquid crystal display circuit 207 and to the AF evaluation value process circuit 210 and the iris control circuit 211.

The frame is represented by the center position thereof and a certain area around the center, and data of horizontal and vertical lengths representing the area are sent, together with the position information, from the microcomputer 212 to the frame generation circuit 209. The frame generated by the frame generation circuit 209 for the liquid crystal display circuit 207 is assumed to have a horizontal length $W_{EX}$ and a vertical length $W_{EY}$, and that generated for the AF evaluation value process circuit 210 and the iris control circuit 211 is assumed to have a horizontal length $W_{CX}$ and a vertical length $W_{CY}$.

Figure 40A:
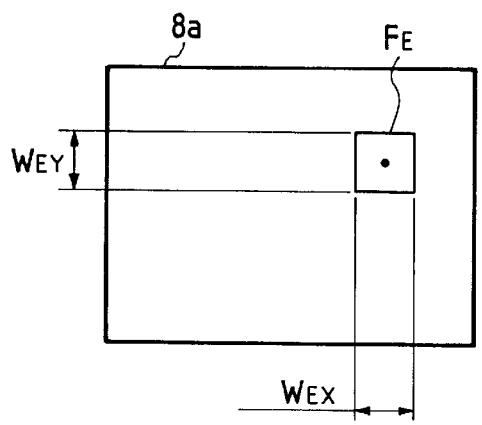
Figure 40B:
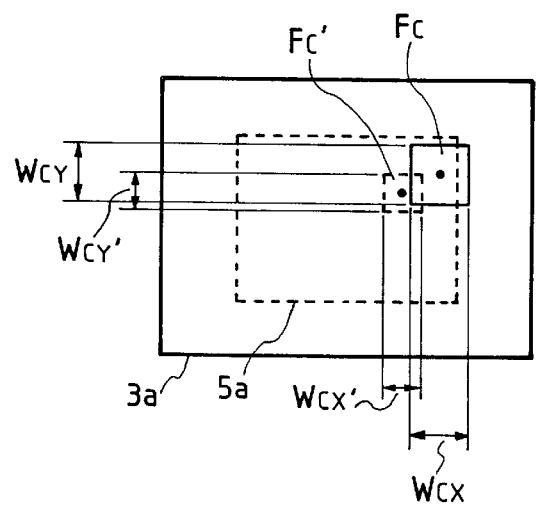

FIGS. 40A and 40B illustrate the sizes of thus defined frames. FIG. 40A shows the frame size on the liquid crystal display image area 208a in the view finder, and FIG. 40B shows the frame size on the output image area 203a of the pre-amplifier 203.

While the optical system of the lens unit 201 in FIG. 38 has not reached the telephoto end, the microcomputer 212 provides the frame generation circuit 209 with data in such a manner that the frame size information for the liquid crystal display circuit 207 and that for the AF evaluation value process circuit 210 and the iris control circuit 211 become mutually equal. Thus:

$$W_{EX}=W_{CX};\ W_{EY}=W_{CY} \quad (6)$$

On the other hand, following operations are conducted when the electronic zooming circuit 205 is activated by the microcomputer 212. The image area 205a in FIG. 40B is an example of the image area enlarged by the electronic zooming circuit 205. In case the microcomputer 212 provides the frame generation circuit 209 with the frame size information, for the liquid crystal display circuit 207, corresponding to $F_E$ in FIG. 40A, the frame information for the AF evaluation value process circuit 210 and the iris control circuit 211 is sent to the frame generation circuit 209 according to the following calculations:

$$W_{CX}'=W_{EX}/E$$
$$W_{CY}'=W_{EY}/E \quad (7)$$

$F_C'$ in FIG. 40B indicates the size of thus formed frame. As the center of the frame $F_C'$ coincides with the position $O_C'$ in FIG. 39B, the area of the frame $F_C'$ becomes equal, on the image signals, to the area of the frame $F_E$ in FIG. 40A.

In the foregoing embodiment, the position and size of the frame for AF and AE operations are both obtained by calculation, but an excessively small area may hinder the AE and/or AF operation. For example, in the AF operation, a smaller area allows easier determination of the AF evaluation value of the object, but increases the probability that an edge portion of the object does not exist in the frame.

Also in the AE operation, a high or low luminance portion of the object may occupy the entire frame area, so that the obtained image may become extremely bright or dark.

In such case the frame displayed in the view finder may be converted into the frame for AE/AF operation only with respect to its position, but not converted in size.

According to the present embodiment, the display position of the defined area on the view finder image area and the position on the image signals for executing the aforementioned adjustments are calculated according to the result of detection of the visual axis, and the calculation is conducted in such a manner that the positional information become mutually different according to the enlargement ratio of the electronic zooming. Thus, even in case the image is enlarged by electronic zooming, an area equivalent to the area selected by the visual axis of the operator is selected for the AF/AE operations, so that the AF/AE operations can be achieved in appropriate manner for the object intended by the operator. Also by converting the frame area, displayed in the view finder, into the frame for the AF/AE operations only with respect to its position, while not varying the size of the frame, there can be prevented the drawbacks such as that the edge portion of the object is not contained in the frame, in the AF operation, or that the entire image becomes extremely bright or dark in the AE operation, encountered in case the frame is excessively small.

Also according to the present embodiment, there are calculated the displayed position and size of the defined area on the view finder image area and the position and size on the image signals for the aforementioned adjustment, according to the result of detection of the visual axis, and the calculation is so conducted that the information indicating the positions and sizes becomes mutually different according to the enlargement ratio of the electronic zooming means. Consequently, an area equivalent to the area selected by the visual axis of the operator is selected for the AE/AF operations, so that the AF/AE operations can be achieved in appropriate manner for the object intended by the operator.

What is claimed is:

1. An image pickup apparatus provided with enlargement process means for enlarging image signals output from an image pickup device, comprising:
   execution position pointing means for pointing to and moving a center portion of an area to be subjected to an enlargement process for an image signal by said enlargement process means; and
   display means for displaying on a monitor a predetermined area corresponding to the area automatically formed around the center portion moved by said execution position pointing means and for displaying on the monitor the image signal corresponding to the predetermined area enlarged by the enlargement process.

2. An image pickup apparatus according to claim 1, wherein said execution position pointing means is a track ball.

3. An image pickup apparatus according to claim 1, wherein said execution position pointing means is a joy stick.

4. An image pickup apparatus according to claim 1, wherein said execution position pointing means is a touch panel.

5. An apparatus according to claim 1, wherein said image pickup apparatus is a video camera, and said monitor is a view finder.

6. An apparatus according to claim 1, wherein said display means displays the area to be subjected to the enlargement process, pointed by said execution position pointing means, before the enlargement process is executed.

7. An image pickup apparatus provided with enlargement process means for enlarging image signals output from an image pickup device, comprising:
   execution position pointing means for pointing to and moving a center portion of an area to be subjected to an enlargement process for an image signal by said enlargement process means; and
   display means for displaying on a monitor a predetermined area corresponding to the area automatically formed around the center portion moved by said execution position pointing means in response to an instruction for an execution of the enlargement process and then displaying on the monitor the image signal enlarged by the enlargement process.

8. An image pickup apparatus according to claim 6, wherein said execution position pointing means is a track ball.

9. An image pickup apparatus according to claim 6, wherein said execution position pointing means is a joy stick.

10. An image pickup apparatus according to claim 6, wherein said execution position pointing means is a touch panel.

11. An apparatus according to claim 7, wherein said image pickup apparatus is a video camera, and said monitor is a viewfinder.

12. An apparatus according to claim 7, wherein said display means displays the area to be subjected to the enlargement process, pointed by said execution position pointing means, before the enlargement process is executed.

13. An image processing apparatus comprising:
   electronic zooming means for electronically enlarging an image signal;
   display means for displaying the image signal;
   position pointing means for pointing to and moving a center portion of a region which is set automatically around a single point for which an enlargement process is to be executed on the image signal by said electronic zooming means; and
   control means for causing said display means to display the region around the center portion moved by said position pointing means, before execution of the enlargement process in response to an instruction for execution of the enlargement process, then causing said electronic zooming means to electronically enlarge the image signal and causing said display means to display the image signal enlarged by the enlargement process.

14. An apparatus according to claim 13, wherein said position pointing means comprises a track ball.

15. An apparatus according to claim 13, wherein said position pointing means comprises a joy stick.

16. An apparatus according to claim 13, wherein said position pointing means comprises a touch panel.

17. An apparatus according to claim 13, wherein said display means comprises an electronic viewfinder.

18. An apparatus according to claim 13, wherein said electronic zooming means performs thinning-out processing and interpolation processing on the image signal according to a magnification ratio in order to electronically enlarge an image.

19. An apparatus according to claim 13, wherein said control means superimposes an image signal of the region on the image signal to be displayed by said display means.

20. An apparatus according to claim 13, wherein said control means causes said display means to stop displaying the region after the execution of the enlargement process is complete.

21. An apparatus according to claim 13, wherein said image pickup apparatus is a video camera, and said monitor is a viewfinder.

22. An apparatus according to claim 13, wherein said display means displays the area to be subjected to the enlargement process, pointed by said execution position pointing means, before the enlargement process is executed.

23. A method for an image pickup apparatus provided with enlargement process means for enlarging image signals output from an image pickup device, comprising the steps of:
   pointing to a center portion of an area to be subjected to an enlargement process for an image signal by the enlargement process means; and displaying on a monitor a predetermined area corresponding to the area automatically formed around the center portion moved in said pointing step; and displaying on the monitor the image signal corresponding to the predetermined area enlarged by the enlargement process means.

24. A method according to claim 23, wherein a track ball is used to point in said pointing step.

25. A method according to claim 23, wherein a joy stick is used to point in said pointing step.

26. An image pickup method according to claim 23, touch panel is used to point in said pointing step.

27. A method according to claim 23, wherein said image pickup apparatus is a video camera, and said monitor is a viewfinder.

28. A method according to claim 23, wherein said display step includes a step of displaying the area to be subjected to the enlargement process, pointed in said pointing step, before the enlargement process is executed.

29. An image pickup apparatus provided with enlargement process means for enlarging image signals output from an image pickup device, comprising:

execution position pointing means for pointing a single point within an area to be subjected to an enlargement process for an image signal by said enlargement process means, wherein said single point is not on an edge or a corner of the area to be subjected to the enlargement process; and display means for movably displaying on a monitor a predetermined area corresponding to the area automatically formed around and extending in all directions from the single point pointed by said execution position pointing means and for displaying on the monitor the image signal corresponding to the predetermined area enlarged by the enlargement process.

30. An apparatus according to claim 29, wherein said execution position pointing means includes a viewpoint detection unit, a joystick, a track ball or the like.

31. An apparatus according to claim 29, wherein said image pickup apparatus is a video camera, and said monitor is a viewfinder.

32. An apparatus according to claim 29, wherein said display means displays the area to be subjected to the enlargement process, pointed by said execution position pointing means, before the enlargement process is executed.

* * * * *

UNITED STATES PATENT AND TRADEMARK OFFICE
CERTIFICATE OF CORRECTION

PATENT NO. : 6,476,868 B1
APPLICATION NO. : 08/419241
DATED : November 5, 2002
INVENTOR(S) : Toshio Kaji et al.

It is certified that error appears in the above-identified patent and that said Letters Patent is hereby corrected as shown below:

ON TITLE PAGE

Insert: --(65)    Notice of Publication of Application

U.S. 2002/0018136-A1  Feb. 14, 2002.--.

Insert: --(74)    Attorney, Agent or Firm

Fitzpatrick, Cella, Harper & Scinto--.

COLUMN 3

Line 52, "sid" should read --said--.

COLUMN 13

Line 51, "CCD." should read --CCD,--.

COLUMN 15

Line 12, "th" should read --the--.

COLUMN 17

Line 36, "overflow" should read --overflows--.

COLUMN 19

Line 61, "eing" should read --being--.

COLUMN 22

Line 2, "same," should read --the same,--.

UNITED STATES PATENT AND TRADEMARK OFFICE
CERTIFICATE OF CORRECTION

PATENT NO. : 6,476,868 B1
APPLICATION NO. : 08/419241
DATED : November 5, 2002
INVENTOR(S) : Toshio Kaji et al.

It is certified that error appears in the above-identified patent and that said Letters Patent is hereby corrected as shown below:

COLUMN 36

Line 3, "claim 6," should read --claim 7,--;
Line 6, "claim 6," should read --claim 7,--; and
Line 8, "claim 6," should read --claim 7,--.

COLUMN 37

Line 11, "claim 23," should read --claim 23, wherein a--.

Signed and Sealed this

Twenty-second Day of January, 2008

JON W. DUDAS
*Director of the United States Patent and Trademark Office*